United States Patent
Christensen et al.

(10) Patent No.: US 12,336,066 B2
(45) Date of Patent: Jun. 17, 2025

(54) INTEGRATED UNDERWATER LED LIGHT ASSEMBLY

(71) Applicant: LIQUID LUMENS, LLC, Murray, UT (US)

(72) Inventors: Robert D. Christensen, Salt Lake City, UT (US); Martin Johnson, Draper, UT (US); Jonathan Jensen, Pocatello, ID (US); Eric Nofsinger, North Salt Lake, UT (US)

(73) Assignee: LIQUID LUMENS, LLC, Murray, UT (US)

( * ) Notice: Subject to any disclaimer, the term of this patent is extended or adjusted under 35 U.S.C. 154(b) by 0 days.

(21) Appl. No.: 17/958,099

(22) Filed: Sep. 30, 2022

(65) Prior Publication Data

US 2023/0105448 A1   Apr. 6, 2023

Related U.S. Application Data

(60) Provisional application No. 63/251,134, filed on Oct. 1, 2021.

(51) Int. Cl.
*H05B 45/20*   (2020.01)
*F21S 4/20*   (2016.01)
*F21V 23/00*   (2015.01)
*F21V 31/00*   (2006.01)
*H05B 45/325*   (2020.01)
(Continued)

(52) U.S. Cl.
CPC ............... *H05B 45/20* (2020.01); *F21S 4/20* (2016.01); *F21V 23/003* (2013.01); *F21V 31/00* (2013.01); *H05B 45/325* (2020.01); *F21Y 2103/10* (2016.08); *F21Y 2115/10* (2016.08)

(58) Field of Classification Search
None
See application file for complete search history.

(56) References Cited

U.S. PATENT DOCUMENTS

| | | | |
|---|---|---|---|
| 2006/0226795 A1 | 10/2006 | Walter et al. | |
| 2007/0236912 A1* | 10/2007 | Porchia | H01J 61/327 362/231 |

(Continued)

OTHER PUBLICATIONS

International Preliminary Report on Patentability received for PCT Patent Application No. PCT/US22/45532, mailed on Apr. 11, 2024, 8 pages.

(Continued)

*Primary Examiner* — Anh Q Tran
(74) *Attorney, Agent, or Firm* — Workman Nydegger

(57) ABSTRACT

Systems and methods for monitoring, detecting, measuring, altering, optimizing, and/or modifying electrical power delivered to a power consuming device. The power consuming device can be a light, speakers, fans, motors, any household electronic appliance, or other power consuming device. Also disclosed are light assemblies including a first plurality of strings of red LED lights, a second plurality of strings of green LED lights, and a third plurality of strings of blue LED lights (e.g., SMD LEDs). The light assembly also includes a driver configured to intermittently supply power from a power source to the red LED lights, green LED lights, and blue LED lights. The light assembly also includes a housing to house the light assembly, the driver, the power source, and a controller.

29 Claims, 52 Drawing Sheets

(51) Int. Cl.
 *F21Y 103/10* (2016.01)
 *F21Y 115/10* (2016.01)

(56) References Cited

U.S. PATENT DOCUMENTS

| | | | |
|---|---|---|---|
| 2013/0063042 A1* | 3/2013 | Bora | H05B 45/20 |
| | | | 315/292 |
| 2016/0356439 A1* | 12/2016 | Inskeep | F21V 21/30 |
| 2016/0366746 A1* | 12/2016 | van de Ven | F21V 5/04 |
| 2017/0093210 A1* | 3/2017 | Recker | H02J 7/34 |
| 2018/0158979 A1 | 6/2018 | Schuele et al. | |
| 2019/0342967 A1* | 11/2019 | Yu | H01R 33/09 |
| 2019/0376675 A1 | 12/2019 | Erdener | |

OTHER PUBLICATIONS

International Search Report and Written Opinion received for PCT Patent Application No. PCT/US22/45532, mailed on Feb. 28, 2023, 10 pages.

* cited by examiner

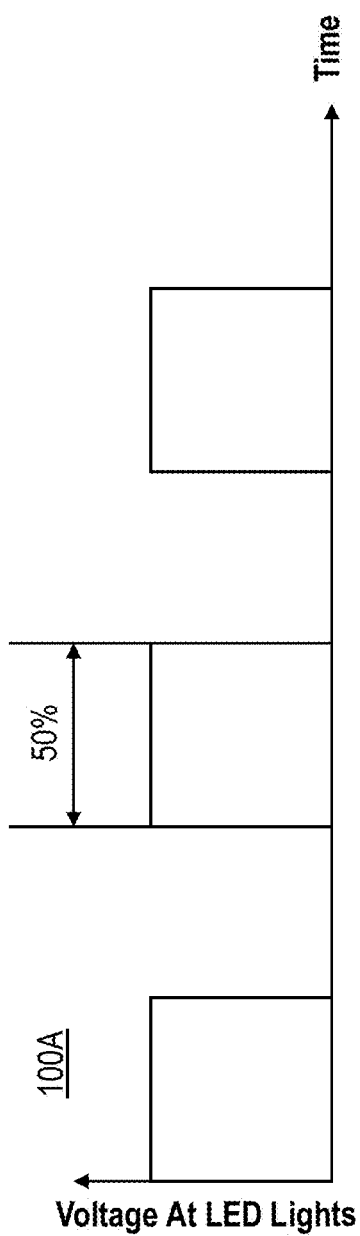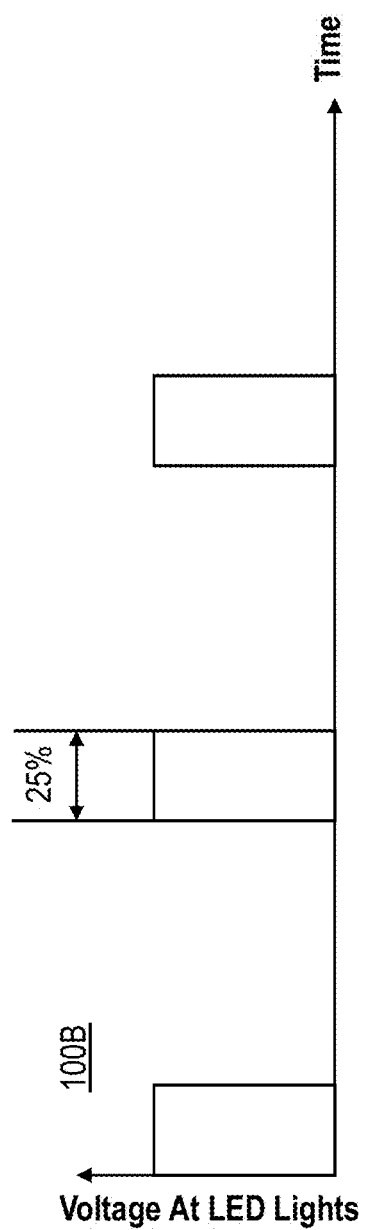

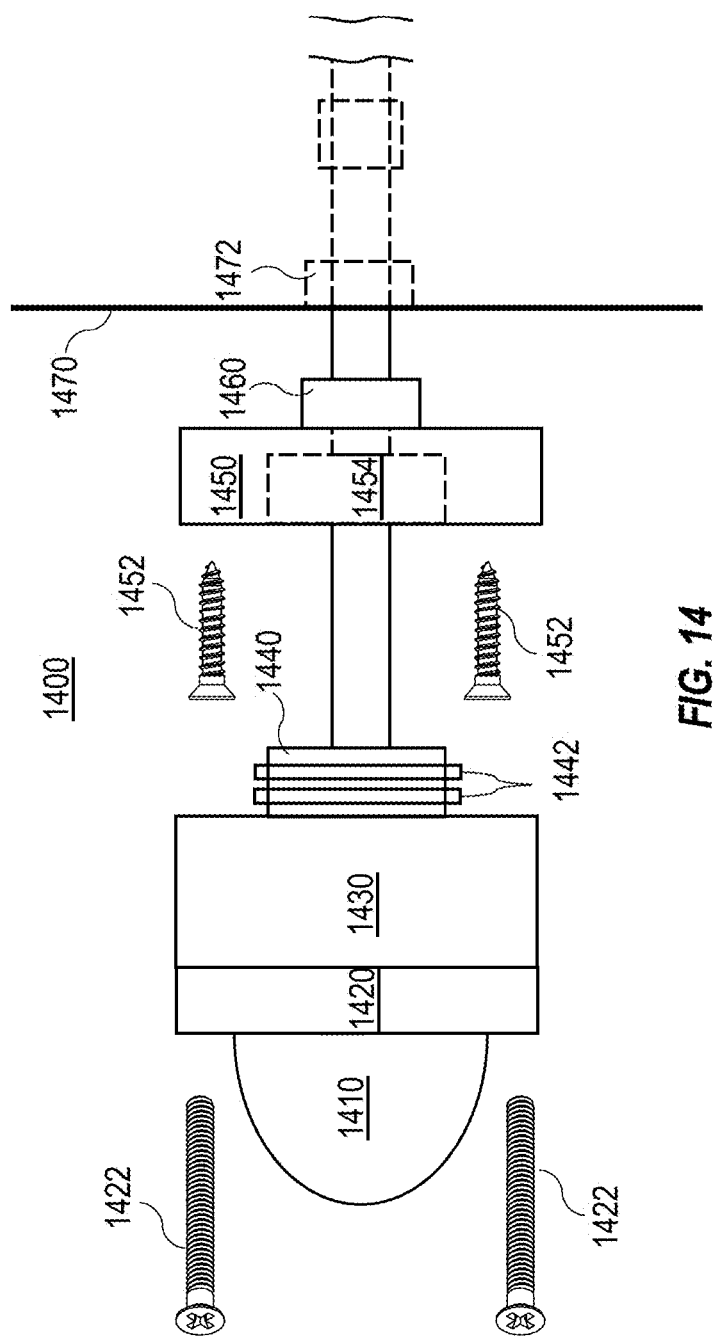

1500

Monitoring a voltage at a location within an architecture of an LED light assembly under test conditions 1510

Compute voltage drop and determine whether voltage drop reaches a first threshold voltage 1520

Reduce a duty cycle of a PWM driver 1530

Compute voltage drop and determine whether voltage drop reaches a second threshold voltage 1540

Turn off the LED light 1550

Compute voltage drop and determine whether voltage drop reaches a third threshold voltage 1560

Turn the LED light back on at less than full brightness 1570

Compute voltage drop and determine whether voltage drop reaches a fourth threshold voltage 1580

Turn the LED light to full brightness 1590

*FIG. 15*

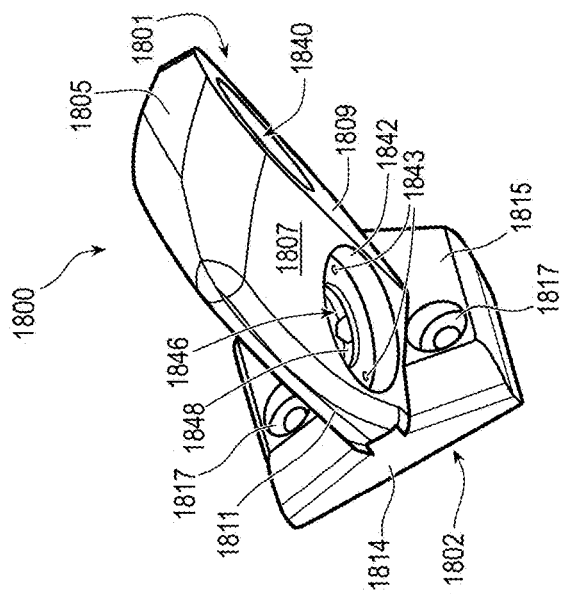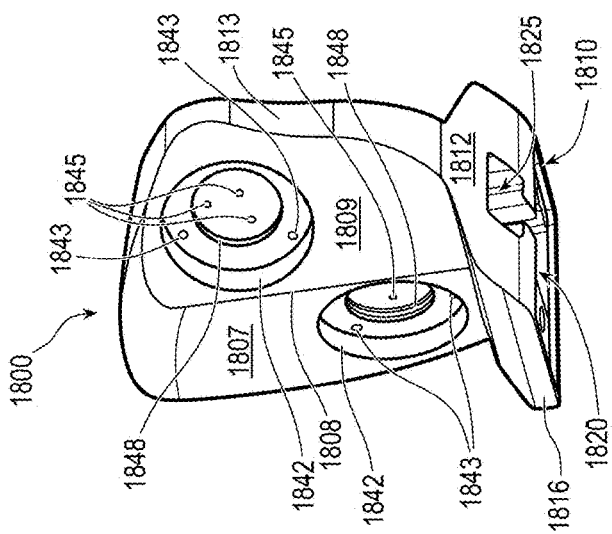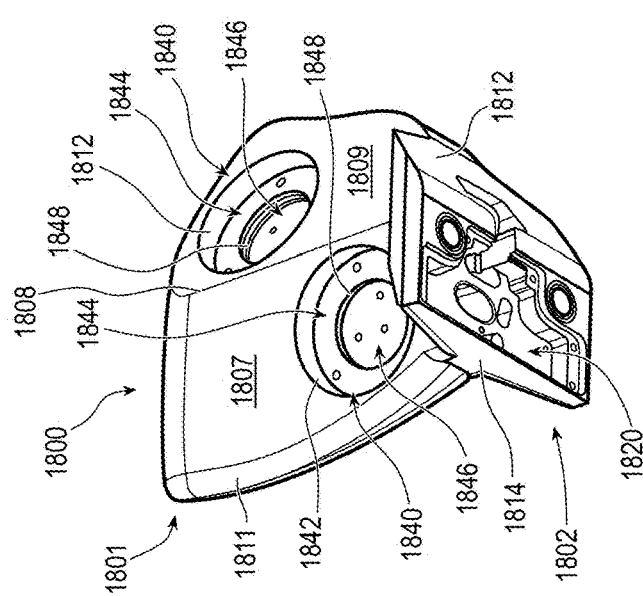

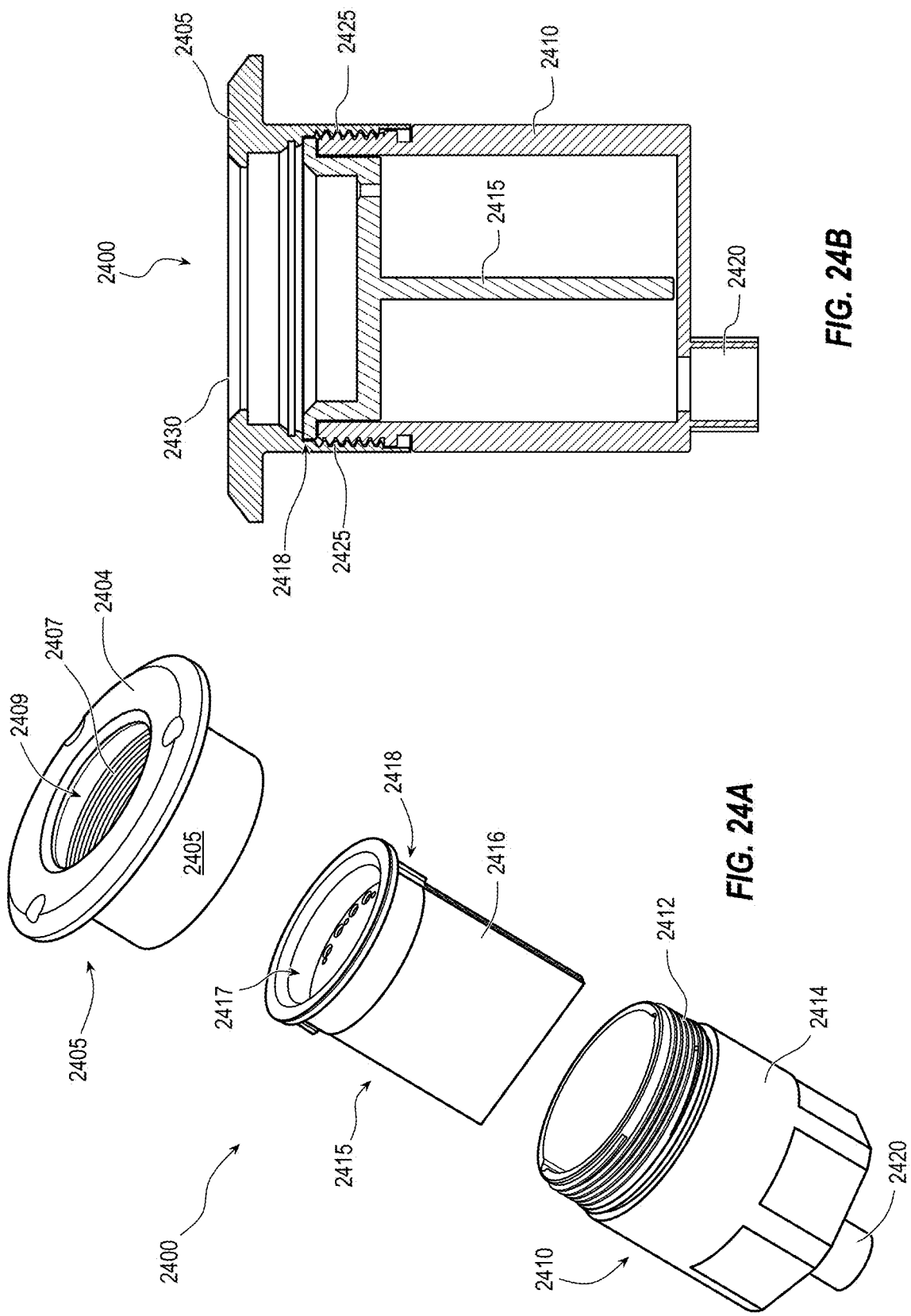

INTEGRATED UNDERWATER LED LIGHT ASSEMBLY

CROSS-REFERENCE TO RELATED APPLICATIONS

This Application claims the benefit of U.S. Provisional Application No. 63/251,134, filed Oct. 1, 2021, which is incorporated by reference in its entirety.

BACKGROUND

Underwater boat lights may be installed on boats to serve various purposes. For example, when mounted under a swim deck or step, the underwater boat light can improve safety when guests step on or off the boat. They can provide safety and light during use of the boat while dark, dusk, or early morning, such as while water skiing, wake boarding, or wake surfing.

As another example, certain colored underwater lights can attract plankton and insects, which in turn may attract baitfish, which in turn may attract big fishes. As such, such colored underwater lights may be used in night fishing adventures. Lights are also used to illuminate the water for swimming, scuba diving, or other submersible activities after dark. Further, lights are used on larger vessels such as house boats, cabin cruisers, and yachts to create ambiance and view of the water while relaxing on the boat after dark.

An example of an underwater light for watercraft is disclosed in U.S. Pat. No. 10,612,765, which discloses lighting devices that incorporate a chip-on-board (COB) light emitting diode (LED). A COB LED is a simplified array of bare LED chips mounted directly to a single substrate. In contrast, surface mount technology (SMT) includes a single LED chip mounted on a dedicated, customized substrate, forming a surface mount device (SMD) LED.

The stated advance of COB LEDs over SMT and SMD LEDs are that COB LEDs are extremely bright for their size and can deliver high intensity light from a small light source. A disadvantage is they provide poor color selection, poor uniformity of brightness, poor uniformity of brightness across different colors of light, generate highly concentrated heat, have high defect rates, and are difficult to repair if some chips in the array fail. Therefore, COB LEDs have serious limitations that can be improved upon by a new type of LED design.

Many modern boats and other marine vessels include wiring to deliver electrical power to lights, outlets, motors, and other devices. Boats and other marine vessels use some of these devices (e.g., lights) to signal their position in the water to other boats or marine vessels. Lights can also be used to signal a direction of travel. Lights may additionally play a role in signaling the speed at which a boat or other marine vessel is moving.

As boats use lights for a variety of communications, it is critical that these lights provide sufficient luminosity to be seen by other boats and marine vessels while on the open water. The National Marine Electronics Association (NMEA) promulgates regulations pertaining to the use of lights, their proper orientation and color, and their proper luminosity during operation of a boat (e.g., while a boat is "under way"). For example, boats must have a green light and a red light positioned near the front of the boat to signal their direction of travel. The red light indicates a vessel's port (left) side, and the green light indicates a vessel's starboard (right) side. Thus, "red, right, return" is a classic marine pneumonic to remind boat owners that, regarding navigation lights, the red light will appear to be on the right side of the boat from the vantage point of the observer when the boat is returning to the harbor or dock.

The NMEA also provides regulations or guidelines concerning power and circuity for power consuming devices on boats or other marine vessels. For example, NMEA has set a voltage drop limit of approximately 10%. That is, for any load inside a boat (i.e., for any power consuming device), when the load is drawing power through a circuit or wiring, there cannot be a voltage drop across the circuit or wiring that exceeds 10% of the supply voltage. If there is a voltage drop in excess of 10% when a load device is drawing current, the circuitry or wiring (and the load device) are unacceptable. This excessive drop in voltage across the circuitry or wiring may be due to any number of factors or variables.

One factor in ensuring that boat lights are operating efficiently and safely is to ensure each light is receiving adequate and sufficient power. When a light receives inadequate or insufficient power, the light may not provide a sufficient luminosity to be seen by other boats or marine vessels. This problem may be exacerbated near dawn or dusk, when the visibility provided by natural light (e.g., sunlight) is notoriously poor/low.

The effectiveness of navigation lights is measured in Candela. Lumens are a popular measure of light output, but are irrelevant in measuring the effectiveness of navigation lights as lumens only measure total light output of a light source—think power. If lighting a room, lumens are important, if there is a need for a light to be seen from a given point and distance then candela, or brightness, at that point/distance is important. Chromaticity is the visible color of a light source. There are specified values for the chromaticity output of navigation lights. Navigation light design takes three factors into consideration, brightness, angle and color. For a navigation light to comply with regulations it must emit the correct color, in the right direction, at the correct intensity. This is achieved by selecting the correct LED for color and output, and directing the beam through carefully designed optics to achieve both focus and directional cutoffs.

Often, when lights such as LEDs receive insufficient power or current, the lights may flicker or react undesirably to the small (but insufficient) amount of power. Because so much signaling and communication happens through the use of boat lights, particularly navigation lights, any undesired or unintended flickering/reactivity from the light may interfere with the accuracy and efficiency of such signaling. This problem may be compounded as boats and other marine vessels begin to incorporate more efficient bulbs, like LEDs, that require a low current/amperage to properly operate.

Inconsistent, or poor quality, power delivery may also impact the health of lights and other power consuming devices. For example, batteries that power electric vehicles require a consistent and sufficient supply of power to properly charge and operate. If a battery or other power consuming device is supplied with an inconsistent or insufficient supply of power, the health of the battery or other power consuming device will degrade. If electrical power is delivered in spikes, rather than at a consistent rate, this may damage the internal and operational circuitry of a light, battery or other power consuming device.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

The embodiments described herein are related to a light emitting diode (LED) light assembly, an LED lighting system that includes a power source, and a method for controlling the LED light assembly. The LED light assembly includes an array of a plurality of LED lights. The plurality of LED lights includes, at least, a first plurality of red LED lights, a second plurality of green LED lights, a third plurality of blue LED lights, and optionally a plurality of LED lights of one or more other colors (e.g., white). The light assembly further includes a driver and a controller. The driver is configured to intermittently supply power received from the power source to the first plurality of red LED lights, the second plurality of green LED lights, the third plurality of blue LED lights, and/or any additional pluralities of LED lights. The user interface is configured to receive a user input, selecting one of a plurality of more than three colors. The controller is configured to control the driver based on the user input, causing the plurality of LED lights to appear as one of the plurality of more than three colors selected by the user input.

In some embodiments, the driver is a pulse width modulation (PWM) driver configured to adjust a first duty cycle of the first plurality of red LED lights, a second duty cycle of the second plurality of green LED lights, a third duty cycle of the third plurality of blue LED lights, and/or any additional duty cycles corresponding to additional pluralities of any other color LED (e.g., white LEDs). Though reference is made to three duty cycles throughout the disclosure, it is to be understood that additional duty cycles corresponding to additional pluralities of LEDs are also encompassed by the present disclosure. The controller is configured to compute each of the first duty cycle, the second duty cycle, and/or the third duty cycle based on one of the plurality of more than three colors selected by the user input.

In some embodiments, the plurality of LED lights includes a plurality of light strings, such as surface mount device (SMD) LEDs, each of which includes a plurality of same-colored LED lights connected in series, and the plurality of light strings is connected to each other in parallel. The plurality of same-colored LED lights includes one or more first strings of red LED lights, one or more second strings of green LED lights, and one or more third strings of blue LED lights. One or more strings of another color can be included. In some embodiments, the plurality of LED lights includes a plurality of light strings of only one color (e.g., red LEDs or blue LEDs or green LEDs or white LEDs). For example, the plurality of LED lights can include a plurality of strings of red LED lights, resulting in a light that produces only red light. The manner in which the LEDs are wired together both in series and in parallel, how they are positioned within the light device, and how they are controlled provides a substantial improvement over existing COB LED technology relative to controlling color emission and/or light intensity. By arranging the LEDs in an intermingled pattern within the light device, the disclosed devices also provide substantial improvements in color blending. In contrast, COB LED technology concentrates LED groupings by specific color, resulting in poor color blending, intensity, and/or controlled color emission.

In some embodiments, each of the one or more first strings of red LED lights includes a first number of red LED lights, each of the one or more second strings of green LED lights includes a second number of green LED lights, and each of the one or more third strings of green LED lights includes a third number of blue LED lights. In some embodiments, the first number, the second number, and the third number are selected based on a forward voltage drop of different colored strings of LED lights, such that a first forward voltage drop of each first string, a second forward voltage drop of each second string, and a third forward voltage drop of each third string is substantially the same. The first number, the second number, and the third number can be different to account for differences in LED output intensity for the different colors.

In some embodiments, the one or more first strings consist of a first number of first strings, the one or more second strings consist of a second number of strings, and the one or more third strings consist of a third number of strings. The first number, the second number, and the third number can be different. In some embodiments, the first number, the second number, and the third number are selected based on full brightness of each colored LED light such that full brightness of the first plurality of red LED lights, full brightness of the second plurality of green LED lights, and full brightness of the third plurality of blue LED lights are perceived, by human eyes, to be substantially same.

In some embodiments, when the plurality of LED lights is turned on, the controller controls the PWM driver, causing the PWM driver to gradually increase each of the first duty cycle, the second duty cycle, and/or the third duty cycle, which in turn causes brightness of the plurality of LED lights to increase gradually to full brightness over a period of time, such as over a period of more than 1 second.

In some embodiments, the controller is further configured to monitor a level of the rechargeable battery, or other power source, to detect abnormalities of wiring of the light assembly when the plurality of LED lights is turned on. The controller is also configured control a brightness of the plurality of LED lights based on the level of the rechargeable battery, other power source, and/or detected abnormalities of wiring. In some embodiments, monitoring the level of the rechargeable battery, other power source, and/or detecting abnormalities of wiring includes monitoring a voltage at the rechargeable battery, an alternator, and/or another power source. Though a rechargeable battery is referred to throughout the disclosure, it is to be understood that other power sources (e.g., alternator, wired power source, etc.) are encompassed within the scope of the disclosure.

In some embodiments, detecting abnormalities of wiring includes monitoring a drop of a voltage at the rechargeable battery, or other power source, around a time the plurality of LED lights is turned on. When the drop of the voltage is greater than a voltage drop threshold, the controller causes the plurality of LED lights to blink at a predetermined pattern as a warning, indicating an abnormality of wiring, or insufficient power being supplied by the rechargeable battery, or other power source, to the LED lights. In some embodiments, when the drop of the voltage is greater than the voltage drop threshold, the controller further causes the PWM driver to reduce each of the first duty cycle, the second duty cycle, and/or the third duty cycle, which in turn causes brightness of the plurality of LED lights to reduce brightness. As mentioned, additional duty cycles corresponding to additional pluralities of LED lights can be controlled by the controller and PWM driver.

In some embodiments, monitoring a level of the rechargeable battery (or other power source) includes when the voltage at the rechargeable battery is dropped to a first low voltage threshold, the controller is configured to cause the PWM driver to reduce each of the first duty cycle, the second duty cycle, and/or the third duty cycle, which in turn causes the brightness of the plurality of LED lights to be reduced until the plurality of LED lights can continue operating, at a reduced brightness, above the low voltage threshold. When the voltage at the rechargeable battery (or other power source) is dropped to a second low voltage threshold that is lower than the first low voltage threshold, the controller is configured to turn off the plurality of LED lights.

In some embodiments, when the voltage at the rechargeable battery is increased to a first operating voltage threshold that is greater than the first low voltage threshold due to charging, the controller is configured to cause the plurality of LED lights to be turned back on and set each of the first duty cycle, the second duty cycle, and/or the third duty cycle at a particular level, causing the plurality of LED lights not to be at full brightness. When the voltage at the rechargeable battery is increased to a second operating voltage threshold that is greater than the first operating voltage threshold due to continuous charging, the controller is configured to increase each of the first duty cycle, the second duty cycle, and/or the third duty cycle, causing or at least permitting the plurality of LED lights to be at full brightness if desired.

Embodiments of the present disclosure are also directed toward housings to house one or more of the disclosed LED light assemblies. In some embodiments, a housing includes a top portion having side surfaces that define one or more pockets. The one or more pockets are each configured to receive an LED light assembly. In some embodiments, the housing also includes a bottom portion configured to house electrical components of the LED light assemblies and configured to mount the housing to a boat or marine vehicle. In some embodiments, the orientation of the side surfaces imparts a diamond shape or footprint to the top portion of the housing. The housing may be configured for attachment to a keel, skeg or hull of a boat or other marine vehicle.

In some embodiments, a housing includes a top portion having a top surface flanked by opposing lateral surfaces. The top surface and each opposing lateral surface include a pocket configured to receive an LED light assembly. In some embodiments, the pocket is configured to house electrical components of the LED light assemblies. The housing also includes a bottom portion having a bottom recess that, additionally and/or alternatively, is configured to house the electrical components of the LED light assemblies.

Additional features and advantages will be set forth in the description which follows, and in part, will be obvious from the description or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and details through the use of the accompanying drawings in which:

FIG. 1A graphically illustrates an example of a control signal of a PWM with a duty cycle equal to 50%;

FIG. 1B graphically illustrates an example of a control signal of a PWM with a duty cycle equal to 25%;

FIG. 14 schematically illustrates a side view of an example of an underwater LED light assembly configured to be installed on a transom or hull of a boat;

FIG. 15 illustrates a flowchart of an example of a method for controlling an LED light assembly having at least one LED light via a PWM driver;

FIGS. 18A-18C illustrate perspective views of one embodiment of a housing for an underwater LED light assembly;

FIGS. 24A-24B illustrate perspective views of another embodiment of an underwater LED light assembly;

DETAILED DESCRIPTION

I. LED Light Assemblies and Systems

Figure 1C:
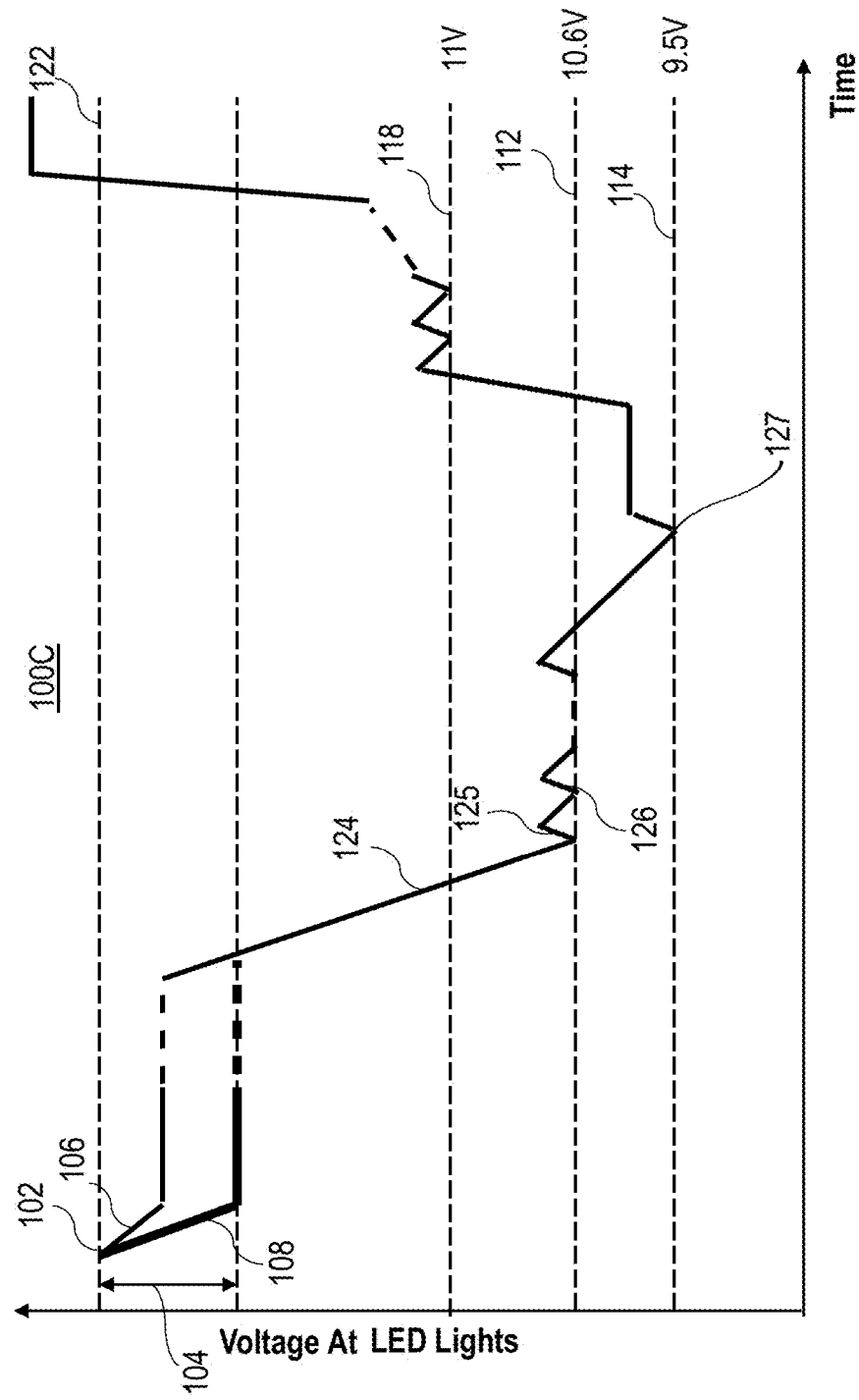
FIG. 1C illustrates a chart of voltage at an LED luminaire showing how it changes over time and under various conditions.

The embodiments described herein are related to a light emitting diode (LED) light assembly, an LED lighting system that includes a power source, and a method for controlling the LED light assembly. The LED light assembly includes an array of a plurality of LED lights, such as a first plurality of red LED lights, a second plurality of green LED lights, a third plurality of blue LED lights, and optionally a plurality of LED lights of one or more other colors (e.g., white). A driver supplies power from the power source to one or more pluralities of LED lights of one or more colors. A user interface receives a user input to select color. A controller controls the driver based on user input.

In some embodiments, the disclosure relates to controlling an LED light assembly comprising at least one LED light (also referred to as the LED light(s)) powered by a rechargeable battery via a pulse width modulation (PWM) driver. In a first aspect, when the LED light(s) is turned on, the PWM driver is configured to cause the PWM driver to gradually increase a duty cycle, which in turn causes the brightness of the LED light assembly to increase gradually to full brightness over a period of more than 1 second. In another aspect, the amount of power delivered to the LED light(s) can be modified in response to detected changes in voltage.

A PWM driver is a type of driver that is configured to use a control signal to control the DC power supplied to the LED light(s) intermittently. A duty cycle is a ratio of the operating time (during which the power is supplied to the LED light(s)) to the total time for a given time.

FIG. 1A schematically illustrates an example of a control signal of the PWM driver that has a 50% duty cycle. When the duty cycle is set at 50%, the DC power is supplied to the LED light(s) 50% of the time.

FIG. 1B schematically illustrates an example of a control signal of the PWM driver that has a 25% duty cycle. When the duty cycle is set at 25%, the DC power is supplied to the LED light(s) 25% of the time. As long as a frequency of the PWM driver is greater than a frequency that the human eye can distinguish, the fast-blinking LED lights are perceived as being continuously on; and the greater the duty cycle, the brighter the LED lights are perceived. As such, the brightness of the LED light(s) with the duty cycle set at 50% is greater than the brightness of the LED light(s) with the duty cycle set at 25%.

In some embodiments, when the LED light assembly is turned on, a voltage and/or a current at the power source is monitored. In some embodiments, a drop of a voltage and/or at the LED light(s) around the time when the LED light(s) is turned on is monitored. In some embodiments, just before the LED light assembly (e.g., the luminaire) is turned on, a voltage at the LED light assembly is monitored. The voltage at the same location is then monitored just after the LED light assembly is turned on. Thus, in some embodiments, a drop of voltage at the LED light assembly around the time when the LED light assembly is turned on is monitored. When a drop in voltage and/or current is greater than a drop threshold, it is determined that an abnormality of wiring is present, and at least one LED light is caused to blink at a predetermined pattern as a warning.

FIG. 1C illustrates a chart 100C of voltage at an LED light (or luminaire) and how the voltage changes over time and under various conditions. A power source (e.g., a rechargeable battery, an alternator, etc.) supplies varying power to an LED light assembly in response to detected voltage changes over time. The chart 100A illustrates an example of an embodiment for controlling the LED light assembly. Point 102 represents a time immediately prior to turning the LED light(s) turned on. Once the LED light(s)s is turned on (at point 102), the PWM driver is configured to gradually increase a duty cycle, which in turn causes the brightness of the LED light assembly to increase gradually to full brightness over a period of more than one (1) second. The time could be more than or less than one (1) second without departing from the spirit of the invention.

Further, as illustrated, when the LED light(s) is turned on, the voltage at the at the luminaire will drop. As illustrated by lines 106 and 108, in different cases, the voltage drops may be different. If the drop in voltage (e.g., shown as line 106) is less than a voltage drop threshold 104, no abnormality is detected. On the other hand, if the drop of the voltage (e.g., shown as line 108) is equal to or greater than a voltage drop threshold 104, it is determined that an abnormality of wiring is present, such as if a wire connecting the rechargeable battery and the LED light(s) is undersized or damaged or there is a poor connection (i.e., high resistance). In some embodiments, when an abnormality of wiring is detected, the LED light(s) is caused to blink at a predetermined pattern as a warning. In some embodiments, when an abnormality of wiring is detected, the PWM driver is further caused to reduce the duty cycle, which in turn causes the LED light(s) to reduce brightness.

Further, if the level of the rechargeable battery is reduced, the voltage at the LED light(s) can be reduced. Specifically, as the rechargeable battery discharges, its voltage decreases, leading to a decrease in voltage at the LED light(s). This is represented by line 124. In some embodiments, when the level of the rechargeable battery has dropped to a first low voltage threshold (represented by dotted line 112), e.g., 10.6

Volts, the PWM driver is caused to reduce the duty cycle, which in turn causes the LED light(s) to reduce in perceived brightness (and current consumption), which in turn causes the battery voltage to rebound slightly. This is represented by line 125. The value of voltage thresholds are not fixed at, e.g., 9.5, 10.6 and 11, and other values may be used for the appropriate load device, LED light(s), and/or application.

As the battery continues to discharge, the voltage will eventually reduce to line 112 for a second time (represented by point 126). At point 126, the duty cycle is again reduced, and that cycle is repeated. In some embodiments, when the level of the rechargeable battery has further dropped to a second low voltage threshold (represented by dotted line 114), e.g., 9.5 Volts, the LED light(s) is caused to be turned off at point 127.

On the other hand, when the level of the rechargeable battery is increased due to charging, the voltage at the LED light(s) can be increased. In some embodiments, when the level of the rechargeable battery has increased to a first operating voltage threshold (represented by dotted line 118), e.g., 11V, the LED light(s) is caused to be turned on. In some embodiments, when the LED light is turned on, the duty cycle of the PWM driver is set at a particular level, causing the LED light(s) to be not at full brightness. In some embodiments, when the level of the rechargeable battery has increased to a second operating voltage threshold (represented by dotted line 122), the duty cycle of the PWM driver is increased, such that the LED light(s) is or can be at full brightness if desired.

The embodiments described herein are also related to an LED light assembly configured to be connected to a power source and a method for controlling the LED light assembly. The LED light assembly includes an array of a plurality of LED lights. The plurality of LED lights includes a first plurality of red LED lights, a second plurality of green LED lights, and a third plurality of blue LED lights. The light assembly further includes a driver and a controller. The driver is configured to supply a current to the first plurality of red LED lights, and/or to the second plurality of green LED lights, and/or to the third plurality of blue LED lights. The user interface is configured to receive a user input, selecting a subset or combination of the three colors, to produce a desired color (which can be a color selected from but not limited to 8 colors, 16 colors, 32 colors, or 64 colors), which is perceived to be a color having a wavelength that is the same or different than the wavelength of any of the red LEDs, the green LEDs, or the blue LEDs alone. The controller is configured to control the driver based on the user input, causing the plurality of LED lights to produce a color and intensity selected by the user input.

In some embodiments, the controller is configured to compute a first duty cycle for the first plurality of red LED lights, a second duty cycle of the second plurality of red LED lights, and a third duty cycle of the third plurality of blue LED lights, causing the PWM driver to supply power with the corresponding duty cycles to the different colored lights. The first duty cycle, the second duty cycle, and the third duty cycle are computed to cause the red LED lights, the green LED lights, and the blue LED lights to appear as the selected color.

Figure 2:
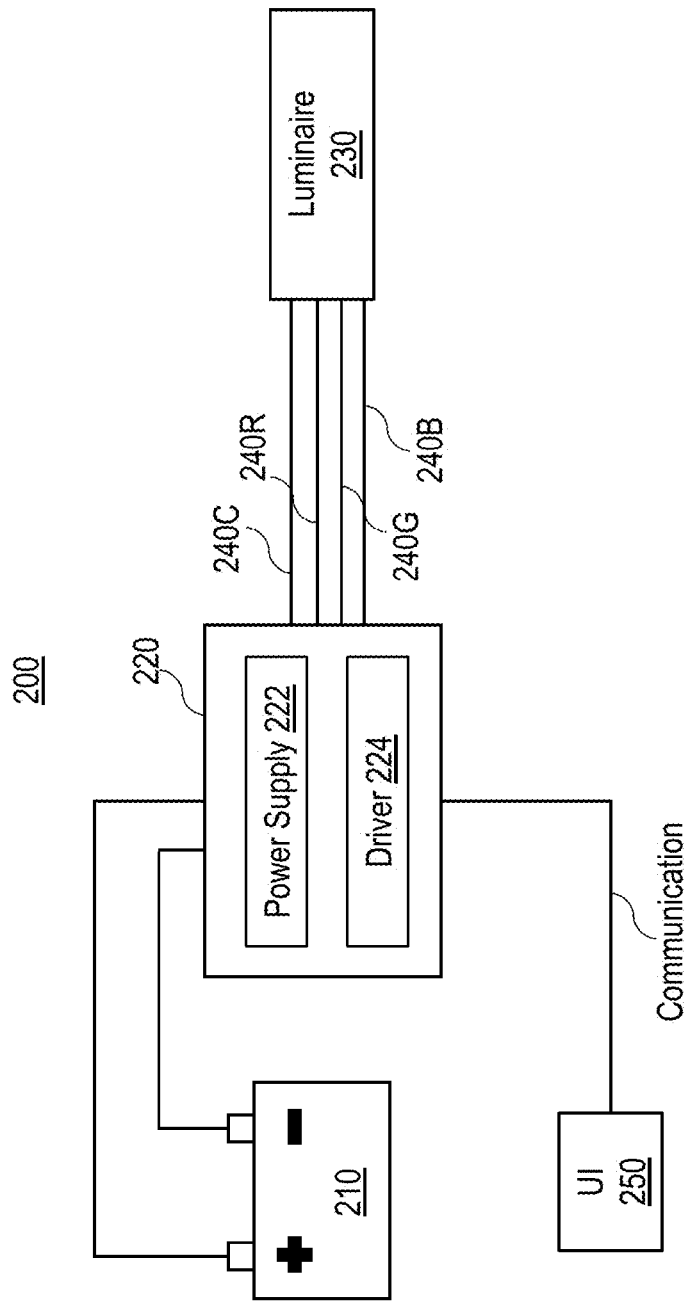
FIGS. 2-6 schematically illustrate different examples of architecture of an LED light assembly and a control mechanism for controlling the LED light assembly.

FIGS. 2-6 illustrate examples of architectures of the LED light assembly. Referring to FIG. 2, the LED light assembly 200 includes a luminaire module 230 and a control module 220. The luminaire module 230 includes a first plurality of red LED lights, a second plurality of red LED lights, a third plurality of blue LED lights, and optionally a plurality of LED lights of one or more other colors (e.g., white). The luminaire module 230 and the control module 220 are connected together via a cable having a sufficient number (e.g., four) of wires 240C, 240R, 240G, and 240B. The wire 240R is a wire configured to connect the first plurality of red LED lights with the control module 220. The wire 240G is a wire configured to connect the second plurality of green lights with the control module 220. The wire 240B is a wire configured to connect the third plurality of blue lights with the control module 220. The wire 240C is a common wire that completes the circuit of any or all of the wires 240R, 240G, and 240B when activated.

The control module 220 includes a power supply module 222 and a driver 224. In some embodiments, the driver 224 is a PWM driver. The PWM driver 224 is configured to adjust a first duty cycle of the first plurality of red LED lights, a second duty cycle of the second plurality of green LED lights, and a third duty cycle of the third plurality of blue LED lights. The controller is configured to compute each of the first duty cycle, the second duty cycle, and/or the third duty cycle based on the combination of selected colors corresponding to a color selected by the user input.

The power supply module 222 is configured to receive power from a power source 210 (e.g., a rechargeable battery). The control module 220 is also configured to be connected to a user interface (UI) module 250. The connection between the control module 220 and the UI module 250 may be wired or wireless for transmitting communication data. In some embodiments, the UI module 250 includes a touch panel or a touch screen configured to receive various user inputs. In some embodiments, the UI module 250 is configured to receive a user input, selecting one of a plurality of more than three colors (e.g., 8 colors, 16 colors, 32 colors, 64 colors). In response to the user input, the control module 220 is configured to cause the driver 224 to control the brightness of the first plurality of red LED lights, and/or the brightness of the second plurality of green LED lights, and/or the brightness of the third plurality of blue LED lights, causing the plurality of LED lights to appear to have the selected color. Further, in some embodiments, the control module 220 is also configured to monitor the voltage of the power source 210 and control the luminaire module 230 based on the voltage or a change of the voltage of the power source 210.

Figure 3:
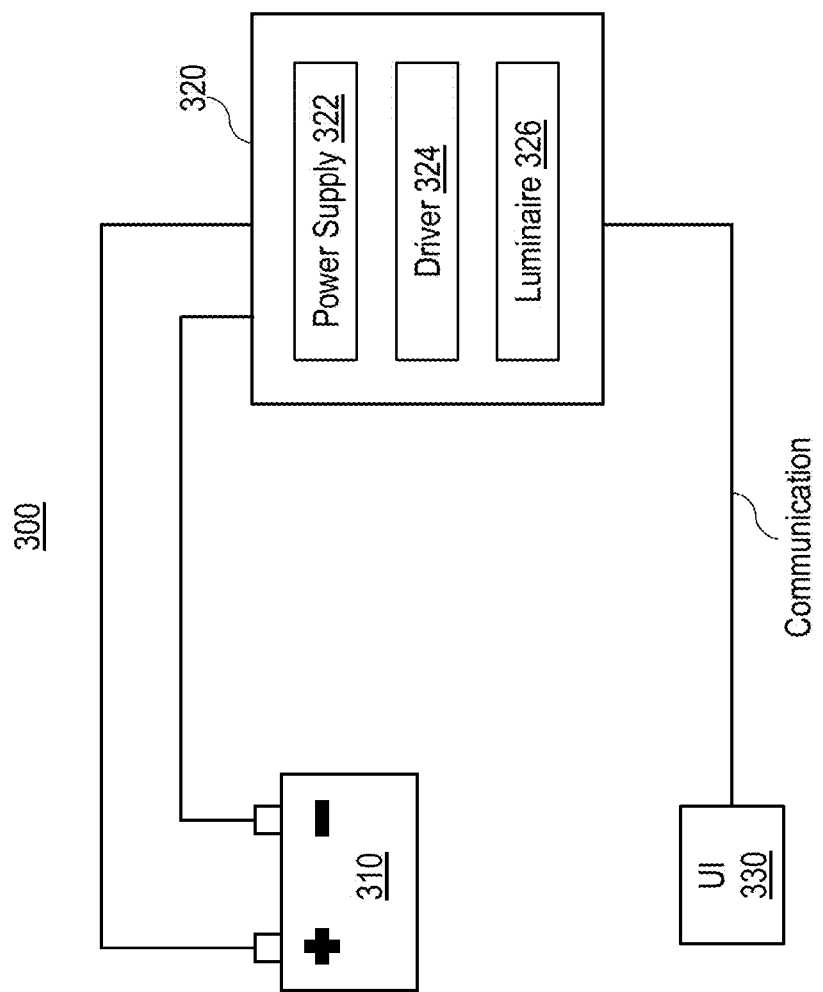

FIG. 3 illustrates another example of an architecture of an LED light assembly 300. The LED light assembly 300 includes an integrated light module 320 configured to be connected to a power source 310 and a UI module 330. The integrated light module 320 includes a power supply module 322 (which corresponds to the power supply module 222), a driver 324 (which corresponds to the driver 224), and a luminaire 326 (which corresponds to the luminaire module 230). The UI module 330 (which corresponds to the UI module 250) is configured to communicate with the integrated module 320 with or without a wire. When the UI module 330 is connected to the UI module 330, the UI module 330 is configured to receive various user inputs for controlling the luminaire 326.

Figure 4:
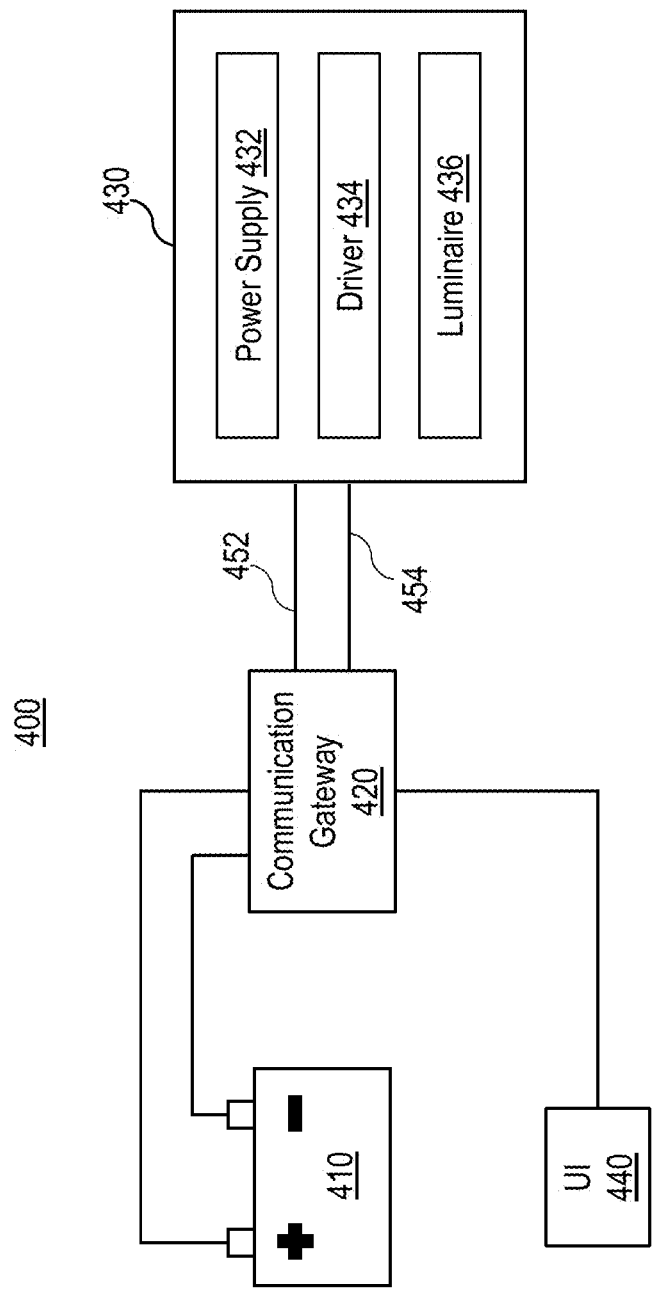

FIG. 4 illustrates another example of an architecture of an LED light assembly 400. The LED light assembly 400 includes an integrated light module 430 (which corresponds to the integrated light module 320) and a communication gateway 420 configured to be connected to a UI module 440 and a power supply 410 (which corresponds to the power source 310). As illustrated, the integrated light module 430 is connected to the communication gateway 420 via two wires 452, 454, which are configured to transmit power and communications signals.

Figure 5:
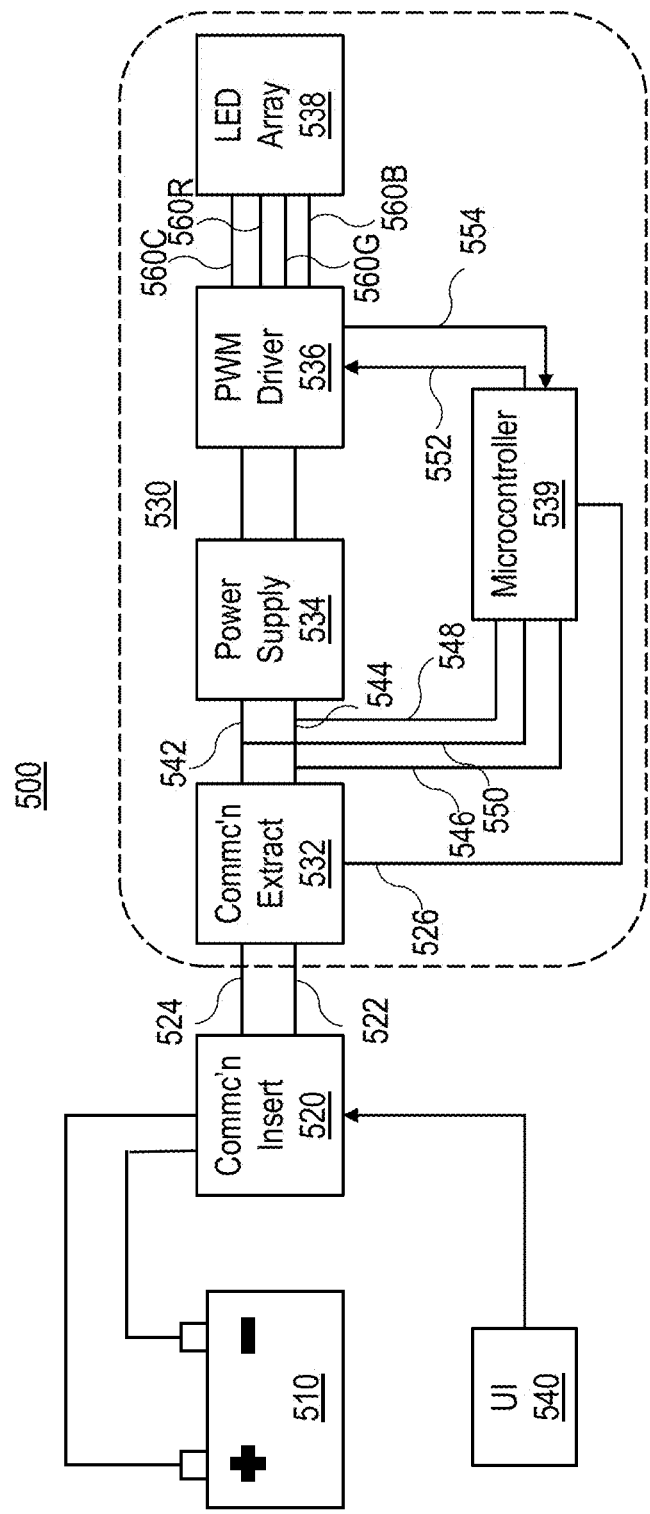

FIG. 5 illustrates another example of an architecture of an LED light assembly 500. The LED light assembly 500 includes an integrated light module 530 and a communication insert module 520. The communication insert module 520 is configured to be connected to a UI module 540 (which corresponds to the UI module 440) and a power supply 510 (which corresponds to power supply 410). The integrated light module 530 includes a communication extract module 532, a power supply module 534, a PWM driver 536, an LED array 538, and a microcontroller 539.

The communication insert module 520 is configured to receive a user input from the UI module 540 and insert a communication signal into the received DC power, such that the two wires 522, 524 are configured to carry a DC power carrying an AC communication signal. Receiving the DC power carrying the AC communication signal, the communication extract module 532 is configured to extract the AC communication signal and send the extracted AC communication signal to the microcontroller 539 via a wire 526. The communication extract module 532 is also configured to pass the DC power to the power supply module 534 via wires 542, 544.

The microcontroller 539 is configured to receive not only the communication signal via wire 526, but also signals related to the DC power supplied to the power supply module 534 via wires 546, 548, 550. In some embodiments, the wire 546 is configured to monitor a current flowing into the power supply module 534, the wire 548 is configured to monitor a voltage of the DC power supplied to the power supply module 534. The power supply module 534 is configured to supply a constant voltage or a constant current to the PWM driver 536. The microcontroller 539 is configured to generate and send control communication(s) to the PWM driver 536 via communication wires 552, 554 based on the communication signal received from the communication extract module 532 and the monitored voltage or current of the DC power supplied to the power supply module 534. Wire 552 may include multiple wires. Wire 554 may include multiple wires and may provide feedback to the microcontroller 539. PWM driver 536 is configured to supply power to the LED array 538 via 4 wires 560C, 560R, 560G, 5606, which corresponds to the 4 wires 240C, 240R, 240G, 2406 of FIG. 2.

Figure 6:
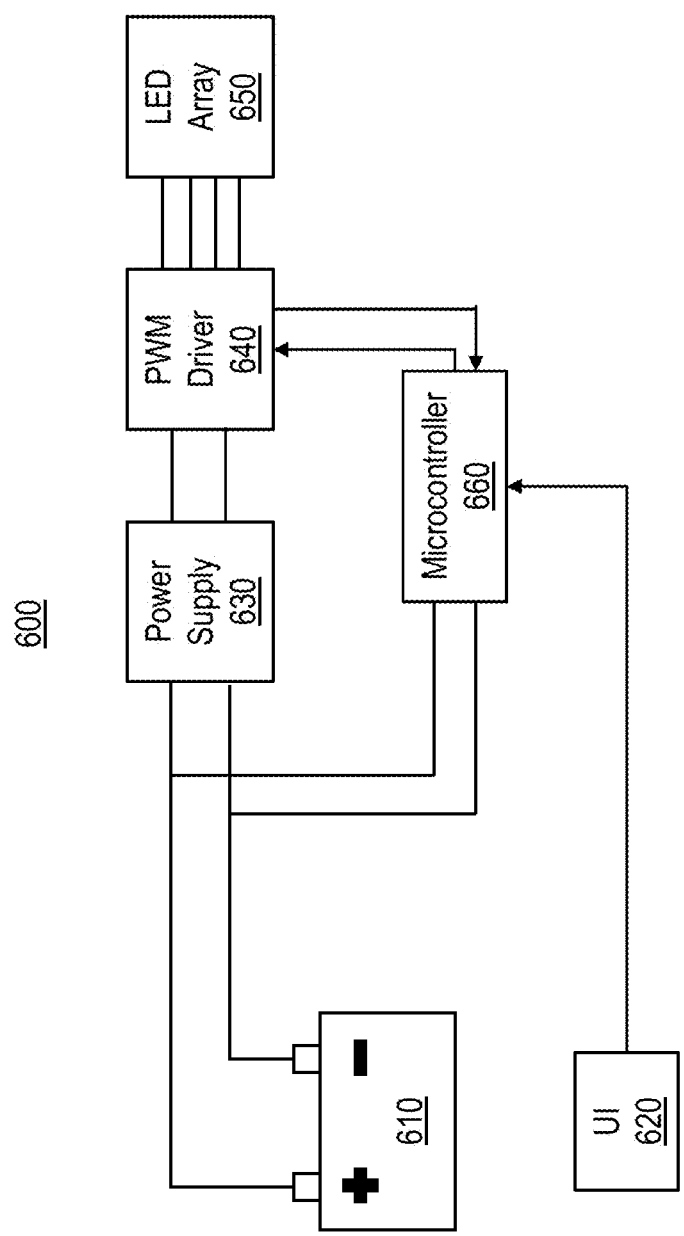

FIG. 6 illustrates another example of an architecture of an LED light assembly 600. The LED light assembly 600 includes a power supply module 630 (which corresponds to the power supply module 534 of FIG. 5), a PWM driver 640 (which corresponds to the PWM driver 536 of FIG. 5), a microcontroller 660 (which corresponds to the microcontroller 539 of FIG. 5), and an LED array 650 (which corresponds to the LED array 538 of FIG. 5). The power supply module 630 is configured to be connected to a power source 610. The microcontroller 660 is configured to receive control communications from a UI module 620 (which corresponds to the UI module 540 of FIG. 5). At the same time, the microcontroller 660 is also configured to monitor the voltage or current of the power source 610, and control the PWM driver 640 based on the control communication received from the UI module 620 and the voltage/current of the power source 610, causing the LED array 650 to generate different colors based on user input or adjust the brightness of the LED array 650 based on the voltage/current of the power source 610.

Figure 7:
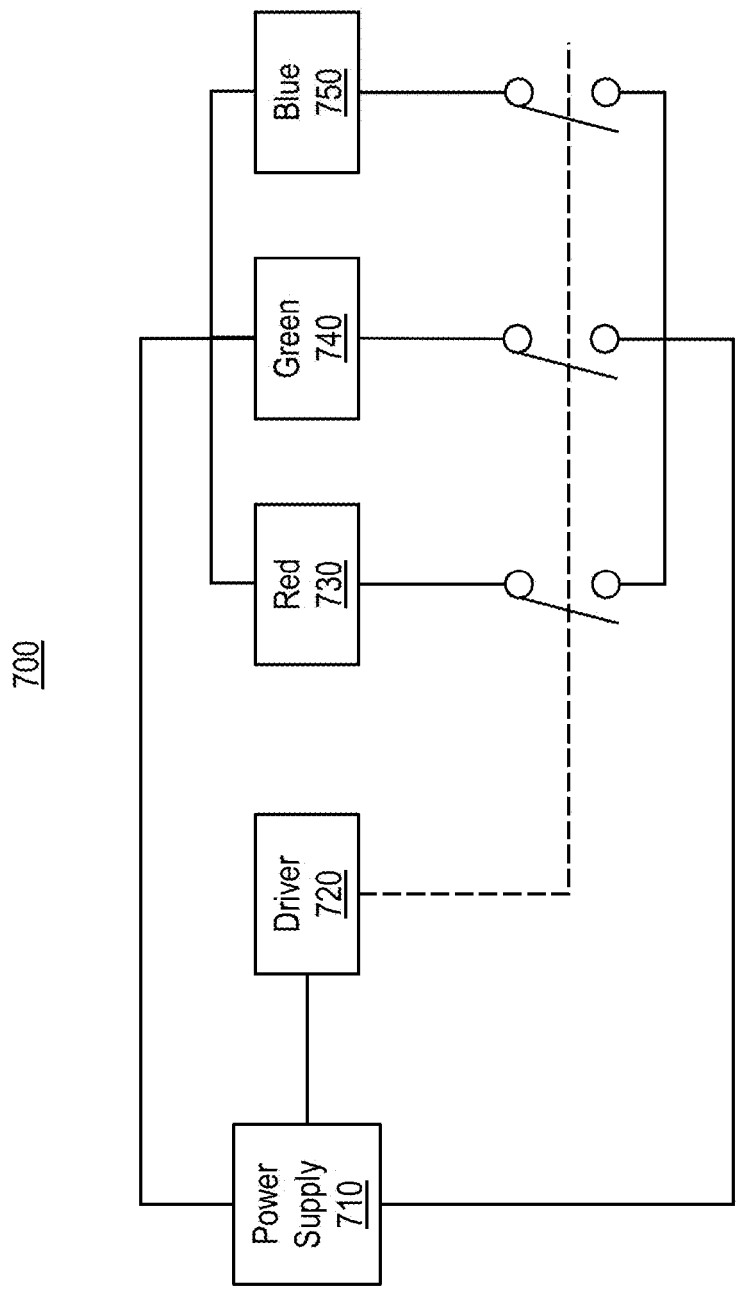
FIG. 7 schematically illustrates a parallel circuit including a first plurality of red LED lights, a second plurality of green LED lights, and a third plurality of blue LED lights connected to each other in parallel.

FIG. 7 illustrates an example of a circuit 700 including a power supply module 710, a driver 720, a first plurality of red LED lights 730, a second plurality of green LED lights 740, and a third plurality of blue LED lights 750. The power supply module 710 corresponds to the power supply module 322 of FIG. 3, 432 of FIG. 4, 534 of FIG. 5, and/or 630 of FIG. 6. The driver 720 corresponds to the driver 324 of FIG. 3, 536 of FIG. 5, and/or 640 of FIG. 6. The first plurality of red LED lights 730, the second plurality of green LED lights 740, and the third plurality of blue LED lights 750 are connected to the power supply module 710 in parallel. The driver 720 is configured to supply power to the first plurality of red LED lights 730, the second plurality of green LED lights 740, and the third plurality of blue LED lights 750 intermittently based on the user input and/or the voltage/current of the power source.

In some embodiments, the first plurality of red LED lights 730 includes one or more first strings of red LED lights; the second plurality of green LED lights 740 includes one or more second strings of green LED lights, and the third plurality of blue LED lights 750 includes one or more third strings of blue LED lights. The LED lights in each string are connected to each other in series, while the one or more first strings, the one or more second strings, and the one or more third strings are or can be connected to each other in parallel.

In some embodiments, each of the one or more first strings of red LED lights includes a first number of red LED lights, each of the one or more second strings of green LED lights includes a second number of green LED lights, and each of the one or more third strings of blue LED lights includes a third number of blue LED lights. Optionally, each of the one or more strings of LED lights of other colors (e.g., white) includes another number of LEDs.

Figure 8:
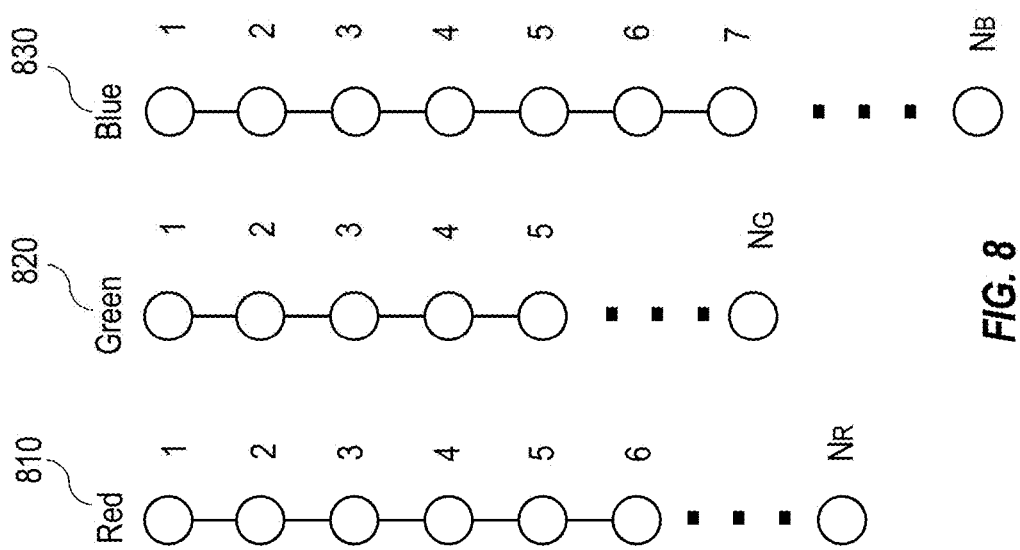
FIG. 8 schematically illustrates an example of a string of red LED lights, a string of green LED lights, and a string of blue LED lights, each of which has a different number of lights.

FIG. 8 illustrates an example of a string 810 of red LED lights including a first number NR of red LED lights, a string 820 of green LED lights including a second number NG of green LED lights, and a string 830 of blue LED lights including a third number NB of blue LED lights. In a preferred embodiment, the strings of LED lights can be SMD LEDs. The first number NR, the second number NG, and the third number NB are typically different. In some embodiments, the first number NR, the second number NG, and the third number NB are selected based on the respective forward voltage drops of different colored LED lights, such that a first forward voltage drop of each first string, a second forward voltage drop of each second string, and a third forward voltage drop of each third string can be substantially the same.

Figure 9:
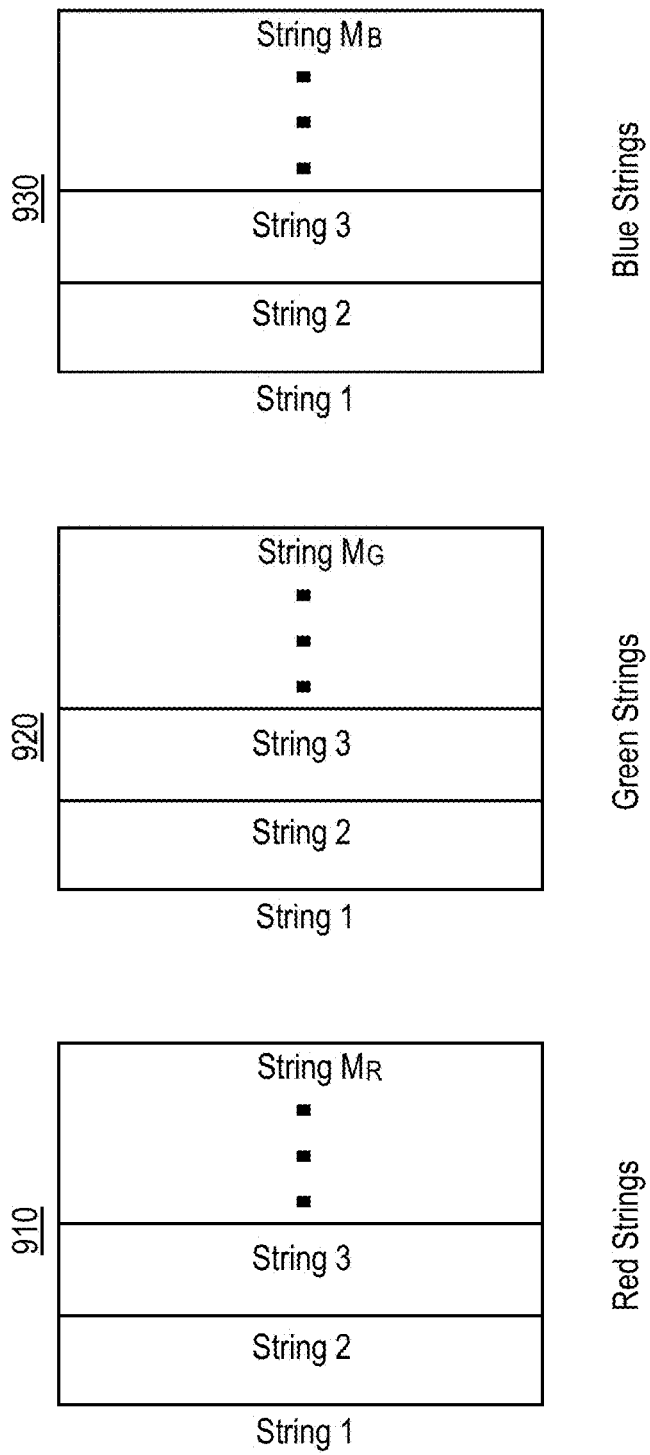
FIG. 9 schematically illustrates an example of a first number of strings of red LED lights, a second number of strings of green LED lights, and a third number of strings of blue LED lights, where the first number, the second number, and the third number are different.

FIG. 9 illustrates an example of one or more first strings 910 consisting of a first number MR of first strings of red LED lights, one or more second strings 920 consisting of a second number MG of second strings of green LED lights, and one or more third strings 930 consisting of a third number of MB of third strings of blue LED lights. The first number MR, the second number MG, and the third number MB are or can be different. In some embodiments, the first number MR, the second number MG, and the third number MB are or can be selected based on full brightness of each colored LED light, such that full brightness of the first plurality of red LED lights, full brightness of the second plurality of green LED lights, and full brightness of the third plurality of green LED lights are perceived, by human eyes, to be substantially the same.

Figure 10:
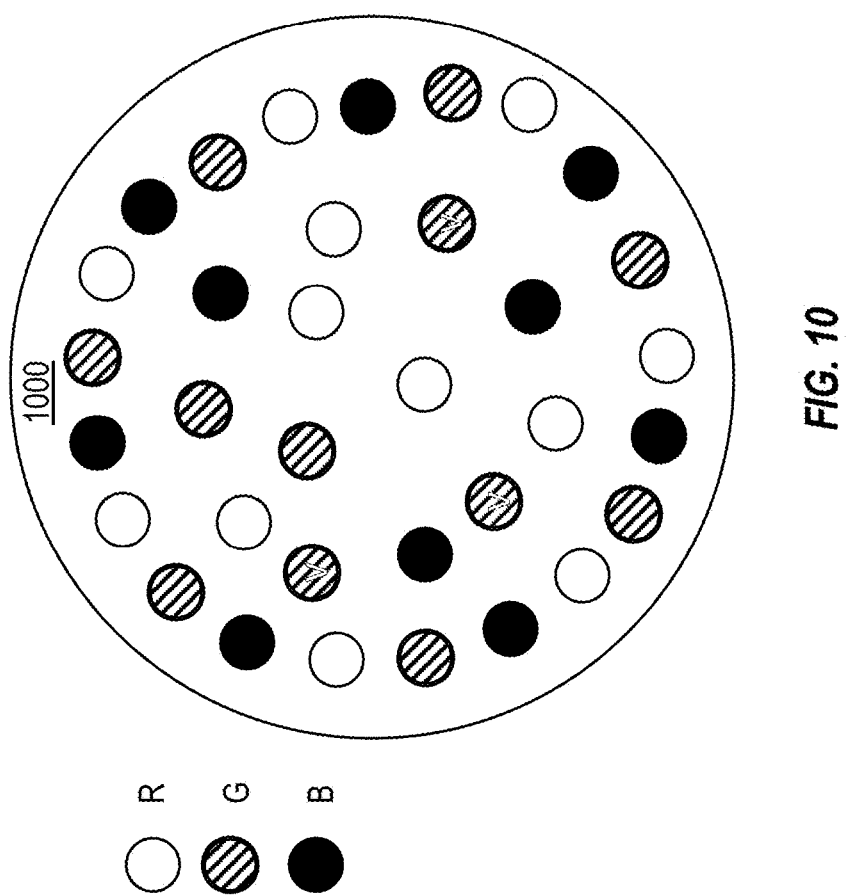
FIG. 10 schematically illustrates an example of an LED array, including a first plurality of red LED lights, a second plurality of green LED lights, and a third plurality of blue LED lights that are arranged in a particular pattern.

FIG. 10 illustrates an example of an LED array 1000 of an LED light assembly, including a first plurality of red LED lights, a second plurality of green LED lights, and a third plurality of blue LED lights that are arranged in a particular pattern. As illustrated, the different colored LED lights are interspersed with each other, such that when all the LED lights are turned on at full brightness, the LED lights collectively appear to be emitting white light. When the brightness of the red LED lights, the brightness of the green LED lights, and the brightness of the blue LED lights are set at certain levels, the interspersed LED lights appear to be collectively emitting a particular-colored light. Note, even though the LED array 1000 is shown as circular-shaped in FIG. 10, in some embodiments, the shape of the LED array 1000 may be any regular or irregular shaped depending on the user's needs and desires.

The manner in which the LEDs are wired together both in series and in parallel (e.g., FIGS. 8 and 9), how they are positioned within the light device (e.g., FIG. 10), and how they are controlled (e.g., FIGS. 3-6 and 8) provides a substantial improvement over existing COB LED technology in several respects, including the ability to fine-tune and control color emission and/or light intensity. For example, the arrangement illustrated in FIG. 10 is not possible using existing COB LED technology.

Figure 11:
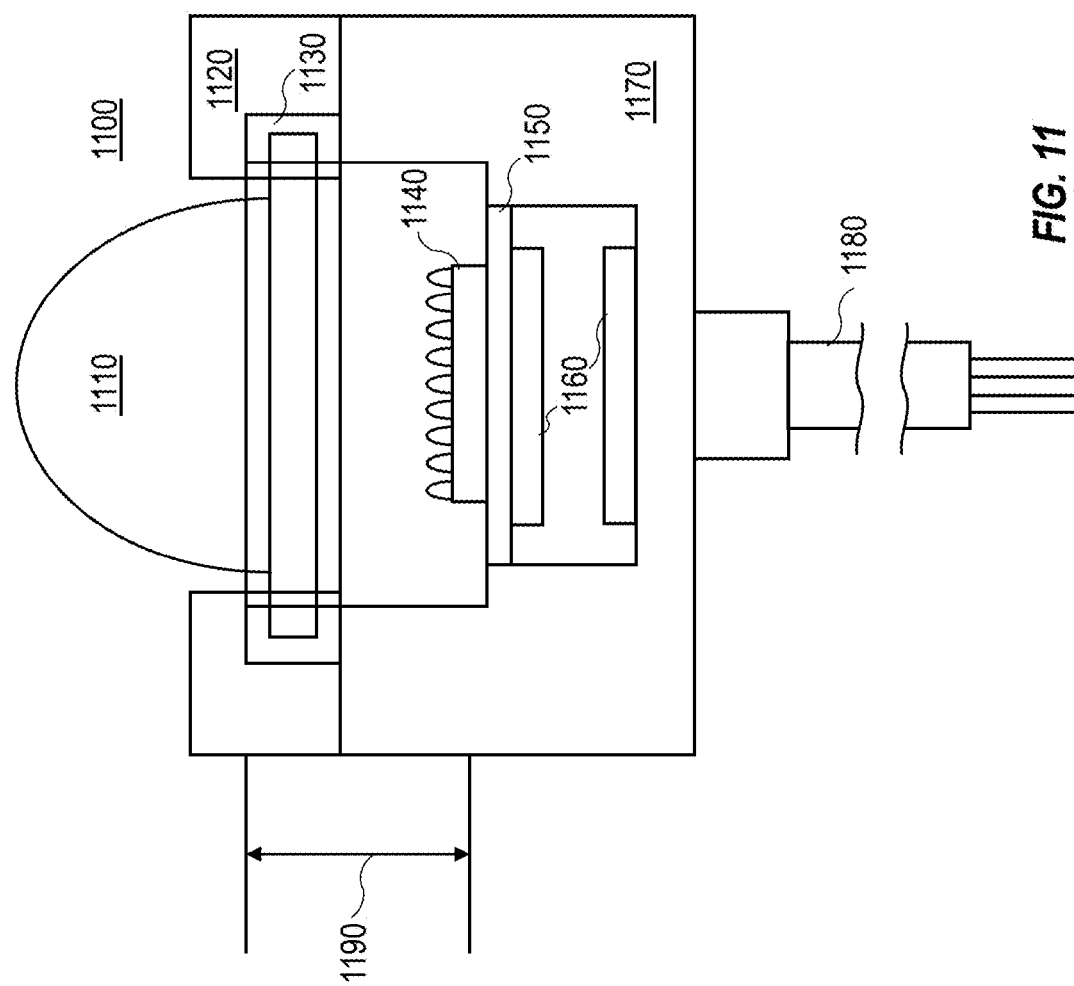
FIG. 11 schematically illustrates a side view of an example of an LED light assembly.

FIG. 11 illustrates a side view of an example of an LED light assembly 1100. As illustrated, the LED light assembly 1100 includes a lens 1110, a mounting ring 1120, and a gasket 1130 disposed on top of an LED array 1140. The LED array 1140 corresponds to the LED array 1000 of FIG. 10. A distance 1190 between the lens 1110 and the LED array 1140 illustrates a proper focal distance of the lens 1110. The LED light assembly 1100 further includes a heat spreader 1150 configured to spread the heat generated by the LED array 1140 and one or more printed circuit boards (PCBs) 1160, which are electronically connected to the LED array 1140. The PCBs 1160 are configured to host the electronic components, including (but not limited to) a power supply module, a PWM driver, a microprocessor, and/or a communications circuitry corresponds to those illustrated in FIGS. 2-6. The LED light assembly 1100 further includes an enclosure 1170, which can also serve as a heat sink, configured to house the LED array 1140, the heat spreader 1150, and the one or more PCBs 1160. A cable 1180 connected to the PCBs 1160 extends out of the enclosure 1170. As illustrated, the cable contains multiple wires which are configured to be connected to a power source (e.g., a rechargeable battery) and/or a UI module.

Figure 12:
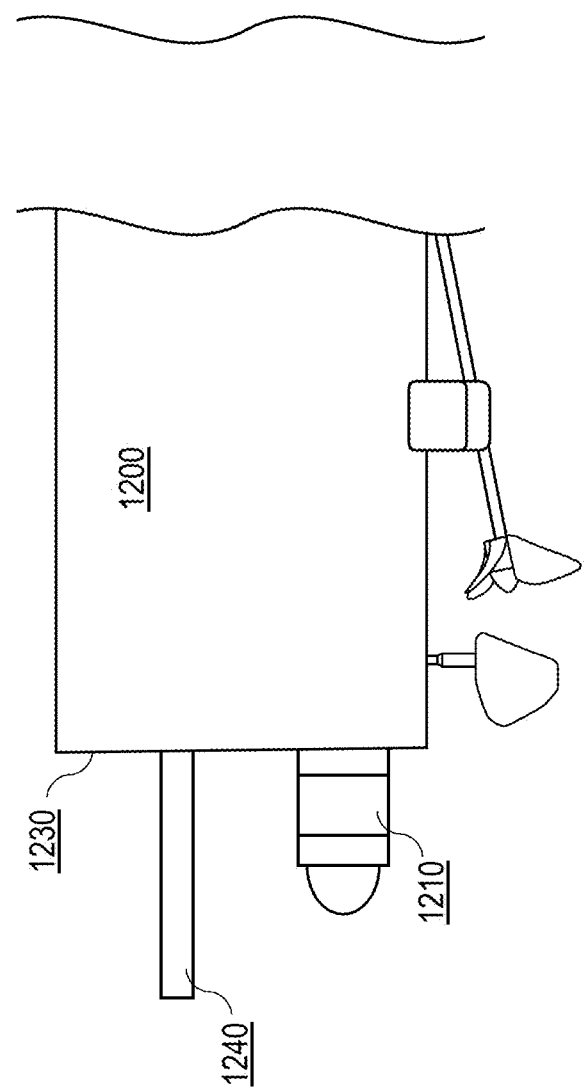
FIG. 12 schematically illustrates a side view of an example of a portion of a boat having an underwater LED light assembly installed thereon.

In some embodiments, the LED light assembly described herein is an underwater boat light. FIG. 12 illustrates a portion of a boat 1200, having installed thereon an LED light assembly 1210 corresponding to the LED light assembly 1100 of FIG. 11. As illustrated the LED light assembly 1210 is installed on a transom 1230 of the boat 1200 below a swim deck 1240. However, the LED light assembly 1210 may be installed elsewhere on the boat.

Figure 13:
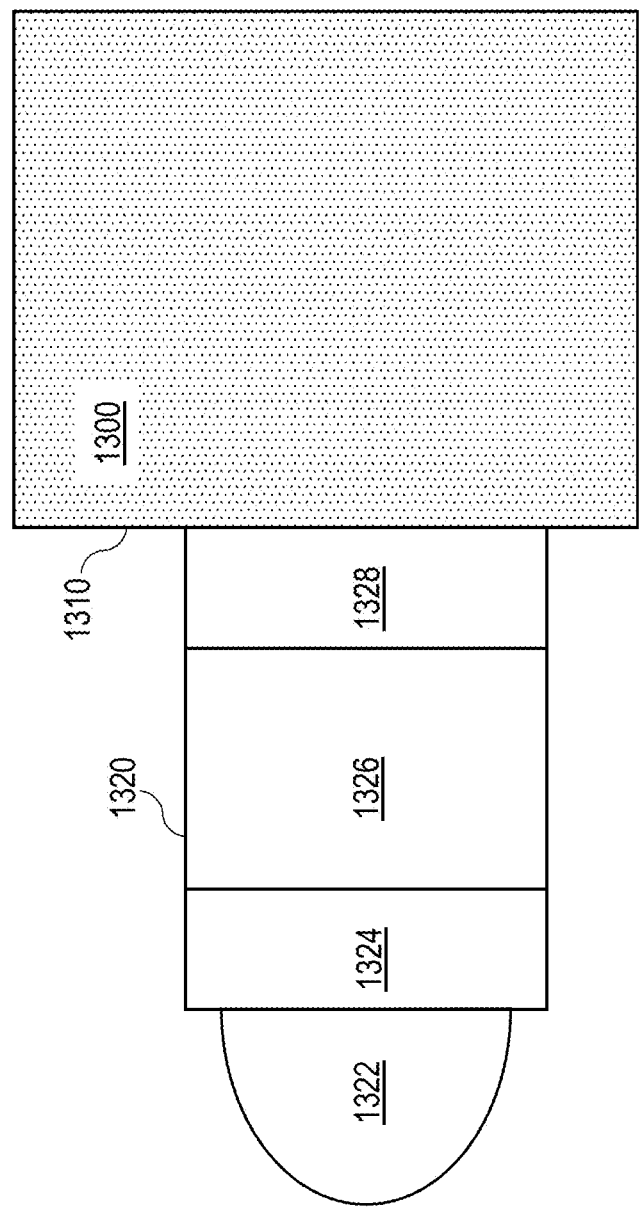
FIG. 13 schematically illustrates a side view of an example of an underwater LED light assembly installed on a boat.

FIG. 13 illustrates an enlarged view of an LED light assembly 1320 (which corresponds to the LED light assembly 1210 of FIG. 12) installed on a transom 1310 of a boat 1300. Though illustrated as installed on the transom 1310, the LED light assembly 1320 can be installed or mounted anywhere on the boat 1300. As illustrated, the LED light assembly 1320 includes a lens 1322, a lens ring 1324, a main housing 1326, and a mounting plate 1328.

FIG. 14 illustrates a side view of an LED light assembly 1400 (which corresponds to the LED light assembly 1320 of FIG. 13) configured to be installed on a transom 1470 of a boat. Though illustrated as installed on the transom 1470, the LED light assembly 1400 can be installed or mounted anywhere on the boat. As illustrated, the LED light assembly includes a lens 1410, a lens ring 1420, and a main housing 1430. The lens ring 1420 is configured to receive a plurality of bolts 1422 configured to secure the lens ring 1420 and the main housing 1430 onto a mounting plate 1450. The main housing 1430 includes a male post 1440 configured to protrude out of the main housing 1430 and be received by a female receptacle 1454 of the mounting plate 1450. The mounting plate 1450 also includes a male post configured to protrude out of the mounting plate 1450 and be received by a female receptacle (e.g., a hole) on the transom 1470 of the boat. In some embodiments, hole 1472 is configured to allow cables to pass through the transom 1470 to the LED light assembly 1400. IN some embodiments, the hole 1472 receives the male post to attach the mounting plate (and, thus, the LED light assembly 1400) to the transom 1470. The mounting plate 1450 also includes protrusion 1460 that is configured to protect any cables or wires from chaffing on the hole 1472. A plurality of screws 1452 are configured to secure the mounting plate 1450 onto the transom 1470 of the boat.

The following discussion now refers to a number of methods and method acts that may be performed. Although the method acts may be discussed in a certain order or illustrated in a flow chart as occurring in a particular order, no particular ordering is required unless specifically stated or required because an act is dependent on another act being completed prior to the act being performed.

FIG. 15 illustrates a flowchart of an example method 1500 for controlling an LED light assembly (e.g., automatically adjusting the brightness) having at least one LED light via a PWM driver. The method is based on the state of charge of the power source (i.e. a rechargeable battery). As the battery naturally discharges, the brightness of the LED light assembly is intentionally and gradually reduced to prolong the time the battery is able to keep the LED light assembly illuminated. As the battery is recharged, the brightness of the LED light assembly is intentionally and gradually increased until the brightness reaches full brightness. Full brightness occurs when the battery is substantially fully charged.

The method 1500 includes monitoring a voltage at a location within an architecture of a light assembly, which is the LED light assembly, under test conditions (act 1510). The method 1500 also includes computation of a voltage drop and determining whether the voltage drop reaches a first voltage threshold (act 1520). If the voltage drop has not reached the first voltage threshold, the test conditions can be altered or conditions can change naturally over a period of time. If the voltage drop has reached the first voltage threshold, then the next step can proceed.

The method 1500 includes reducing a duty cycle of a PWM driver (act 1530). In some embodiments, reducing the duty cycle of the PWN driver causes the brightness of the LED light(s) to be reduced. The method 1500 also includes computation of a voltage drop and determining whether the voltage drop reaches a second voltage threshold (act 1540). In some embodiments, the second voltage threshold is lower than the first voltage threshold. If the voltage drop has not reached the second voltage threshold, the test conditions can be altered or conditions can change naturally over a period of time. If the voltage drop has reached the second voltage threshold, then the next step can proceed.

The method 1500 includes turning the LED light(s) off (act 1550). The method 1500 further includes computation of a voltage drop and determining whether the voltage drop reaches a third voltage threshold (act 1560). In some embodiments, the third voltage threshold is higher than the first and/or second voltage thresholds. If the voltage drop has not reached the third voltage threshold, the test conditions can be altered or conditions can change naturally over a period of time. If the voltage drop has reached the third voltage threshold, then the next step can proceed.

The LED light is turned back on at less than full brightness (act 1570), which may be achieved by setting the duty cycle of the PWM driver at a particular level (e.g., a level less than 100%). The method 1500 further includes computation of a voltage drop and determining whether the voltage drop reaches a fourth voltage threshold (act 1580). In some embodiments, the fourth voltage threshold is higher than the third voltage threshold. If the voltage drop has not reached the fourth voltage threshold, the test conditions can be altered or conditions can change naturally over a period of time. If the voltage drop has reached the fourth voltage threshold, then the next step can proceed. The LED light is turned to full brightness (act 1590), which may be achieved by setting the duty cycle of the PWM driver to a maximum level (e.g., 100%).

Figure 16:
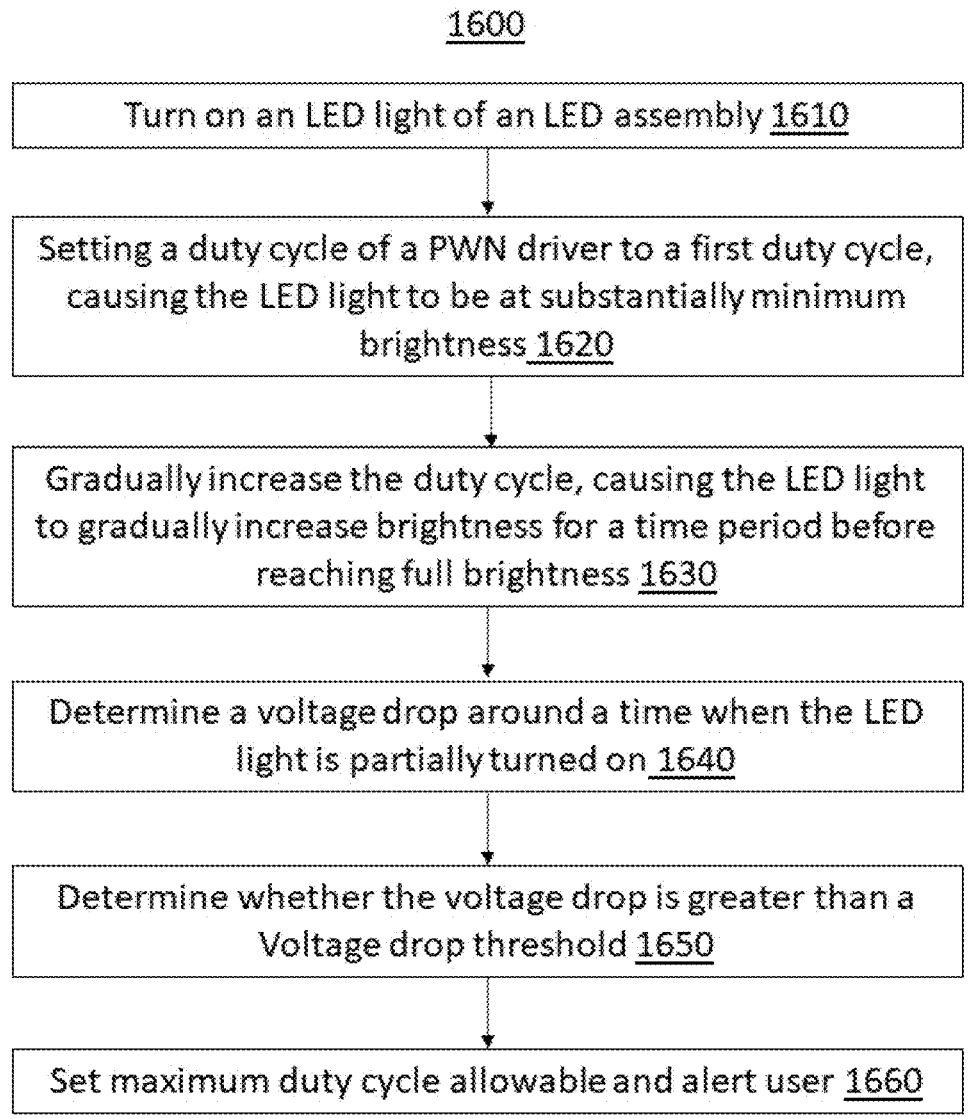
FIG. 16 illustrates a flowchart of an example of a method for detecting an anomaly of wiring of an LED light assembly having at least one LED light and mitigating effect of the anomaly via a PWM driver.

FIG. 16 illustrates a flowchart of an example of a method 1600 for detecting an anomaly of wiring of an LED light assembly having at least one LED light and mitigating effects of the anomaly via a PWM driver. The method detects anomalies in the wiring between the LED light assembly (e.g. 320 in FIG. 3) and the power source (e.g. 310 in FIG. 3). The method 1600 includes turning on LED light(s) of an LED assembly (act 1610). The method 1600 further includes, at the time when the LED light(s) have just been turned on, setting a duty cycle of the PWM driver to a first duty cycle, causing the LED light to not be at a full brightness and be at a substantially minimum brightness (act 1620).

The method 1600 further includes gradually increasing the duty cycle, causing the LED light to gradually increase its brightness for a time period before reaching its full brightness, where the time period can be one (1) second, more than 1 second, or less than 1 second (act 1630). The method 1600 further includes determining a voltage drop around a time when the LED light(s) is partially turned on (act 1640). The method 1600 also includes determining whether the voltage drop is greater than a voltage drop threshold (act 1650). The method 1600 includes setting a maximum duty cycle allowable and alert user (act 1660). In some embodiments, when the voltage drop is greater than a voltage drop threshold, an anomaly is detected, and the duty cycle of the PWM driver is reduced to a second duty cycle, causing the LED light to not be at full brightness.

For the processes and methods disclosed herein, the operations performed in the processes and methods may be implemented in differing order. Furthermore, the outlined operations are only provided as examples, an some of the operations may be optional, combined into fewer steps and operations, supplemented with further operations, or expanded into additional operations without detracting from the essence of the disclosed embodiments.

Figure 17A:
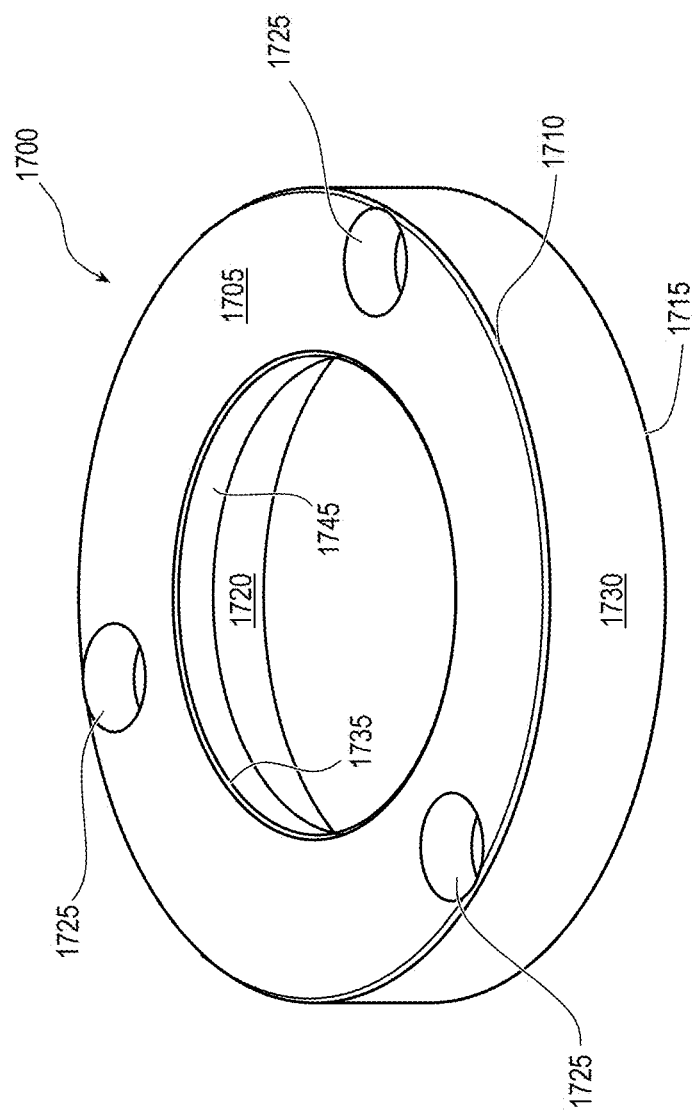
FIGS. 17A-17B illustrate perspective views of one embodiment of a lens ring.
Figure 17B:
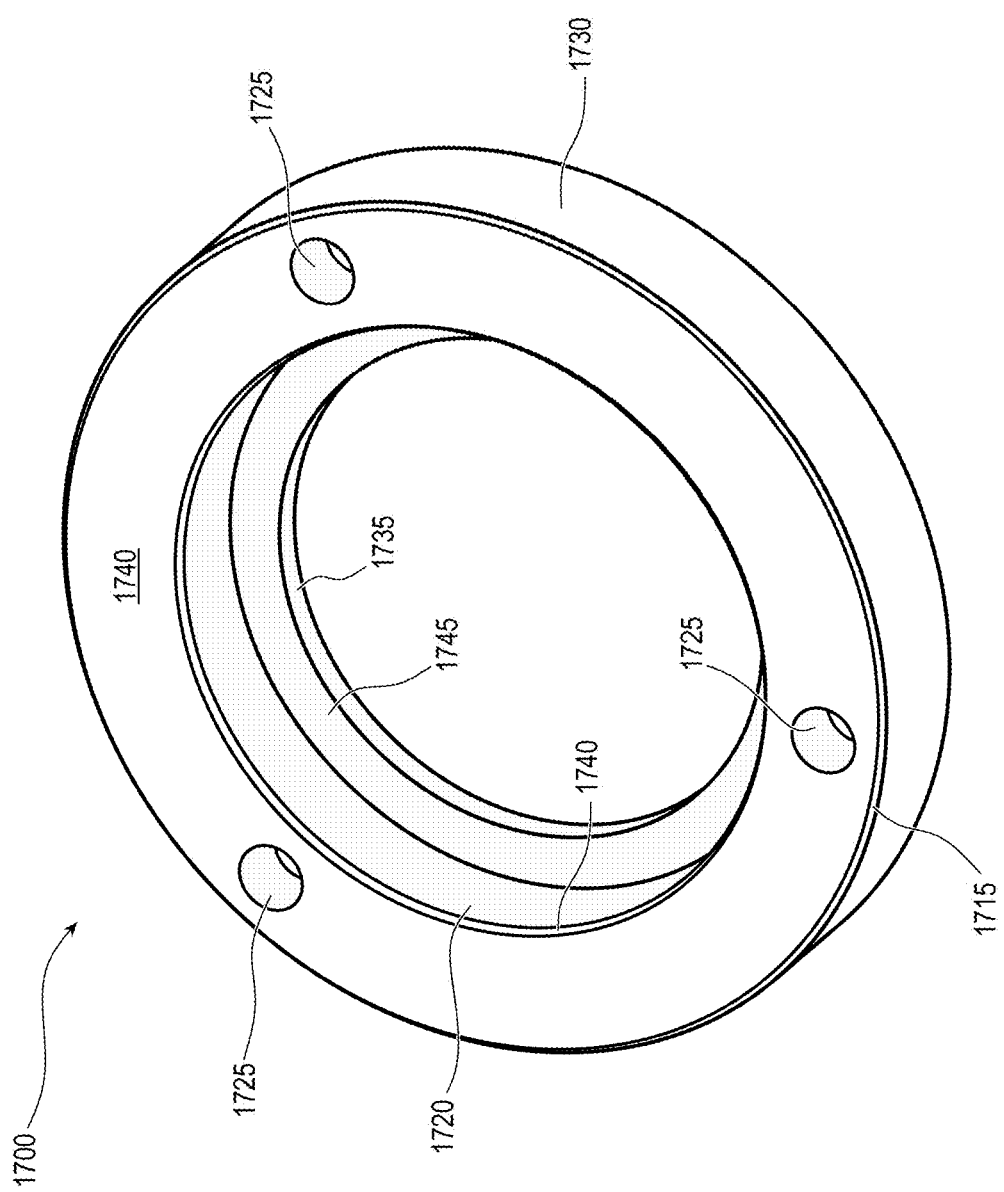

FIGS. 17A-17B illustrate perspective views of one embodiment of a lens ring. The illustrated lens ring 1700 has a top surface 1705, an outside top edge 1710, an inside top edge 1735, a bottom edge 1715 and a side wall 1730. The lens ring 1700 also has a bottom surface 1740, illustrated in FIG. 17B. Extending through the top surface 1705 and bottom surface 1740 are thru holes, or screw holes, 1725; as illustrated, there are three (3) thru holes 1725. The thru holes 1725 are configured to receive screws or other fasteners to attach the lens ring 1700 to a body or housing of a light, such as the lighting assemblies illustrated in FIGS. 11-14.

The lens ring 1700 also includes an inner wall 1720, which defines a cavity or opening configured to accommodate a lens of a light or lighting assembly. Edges 1710, 1715 and 1735 may be chamfered, rounded or beveled. As shown in FIG. 17B, in some embodiments, the top surface 1705 overhangs the inner wall 1720, creating a lip 1745.

FIGS. 18A-18C illustrate perspective views of one embodiment of a housing for an underwater LED light assembly. The housing 1800, generally, includes a top portion 1801 and a bottom portion 1802. The top portion 1801 includes a top surface 1805, a first side surface 1807, a second side surface 1809, a front or anterior edge 1811, and a back or posterior edge 1813. The first side surface 1807 is anterior to the second side surface 1809. Edges 1811 and 1813 together create an essentially sagittal plane that splits the housing 1800 in half, resulting in two opposing lateral sides. The sagittal plane created by the edges 1811, 1813 would represent a midline of the housing 1800.

Though the housing 1800 is illustrated with only one first and second side surface 1807, 1809, it is to be understood that each opposing lateral side of the housing 1800 includes a first side surface 1807 and a second side surface 1809.

The first and second side surfaces 1807, 1809 generally meet or join together at ridge 1808. Again, each opposing lateral side will have a ridge 1808 where the first and second side surfaces 1807, 1809 generally meet or join together. Both the first and second side surfaces 1807, 1809 are angled or biased away from the ridge 1808. The first side surface 1807 is angled or biased toward the front edge 1811; the second side surface 1809 is angled or biased toward the back edge 1813.

As can be seen most clearly in FIG. 18C, the top surface 1805 of the top portion 1801 has a generally diamond footprint or configuration. The diamond configuration is a result of the biasing of the first and second side surfaces 1807, 1809 on each opposing lateral side. That is, because each first side surface 1807 and each second side surface 1809 is biased away from the ridge 1808 and biased towards the front and back edges 1811, 1813, respectively, the top surface 1805 is imparted with a diamond shape.

Each first side surface 1807 and each second side surface 1809 includes one or more pockets 1840. As illustrated, the first and second side surfaces 1807, 1809 each have one pocket 1840. The pockets 1840 are sized, shaped, and configured to receive LED light assemblies, such as those illustrated and described herein.

Each pocket 1840 includes a first pocket recess 1844 having first pocket recess holes 1843 that extend through a bottom 1841 of the first pocket recess 1844; a second pocket recess 1846 having second pocket recess holes 1845 that extend through a bottom 1847 of the second pocket recess 1846; a first inner wall 1842; and a second inner wall 1848. The first pocket recess 1844 is defined by the bottom 1841 and the first inner wall 1842. The bottom 1841 further defines an opening that provides access to the second pocket recess 1846. The second pocket recess 1846 is defined by the bottom 1847 and the second inner wall 1848. In some embodiments, the second inner wall 1848 extends from an edge of the first inner wall 1842 to meet the bottom 1847.

A depth of the first pocket recess 1844 is a function of a height of the first inner wall 1842. Likewise, a depth of the second pocket recess 1846 is a function of a height of the second inner wall 1848. A diameter of the first pocket recess 1844 is a function of a diameter of the bottom 1841. Likewise, a diameter of the second pocket recess 1846 is a function of a diameter of the bottom 1847. The diameter of the second pocket recess 1846 is smaller than the diameter of the first pocket recess 1844.

The housing 1800 also includes a bottom portion 1802. The bottom portion 1802 includes a base 1810, a base recess 1820, and base mounting holes 1817. The base 1810 has a back surface 1812, a front or anterior surface 1814, a top surface 1815 and opposing side surfaces 1816. The back surface 1812 of the base 1810 is angled or biased towards the back edge 1813. In some embodiments, the back edge 1813 and the back surface 1812 merge together. The front edge 1811 merges with the front or anterior surface 1814.

The base recess 1820 is sized, shaped, and configured to receive base plug 1900 (see FIG. 19). The base recess 1820 includes a back surface recess 1825, which partially extends into the back surface 1812. The base mounting holes 1817 extend through the top surface 1815 of the base 1810. The base mounting holes 1817 are configured to receive screws or other fasteners and attach the housing 1800 to a boat or other marine vessel. For example, housing 1800 may be attached on the skeg, keel and/or fin of a boat. In some embodiments, the housing 1800 is attached or mounted to the boat such that a sagittal plane of the housing 1800 is substantially parallel to the primary direction of travel of the vessel. The housing 1800 is configured such that, when LED light assemblies are received in the pockets 1840 and the housing is attached to a boat, the boat will appear as though it is floating on a bed of light.

Figure 19C:
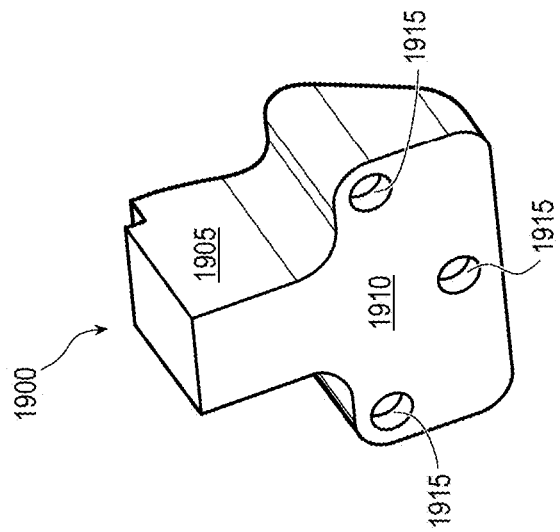
FIGS. 19A-19C illustrate perspective views of one embodiment of a plug to be used with the housing of FIGS. 18A-18C for an underwater LED light assembly.
Figure 19B:
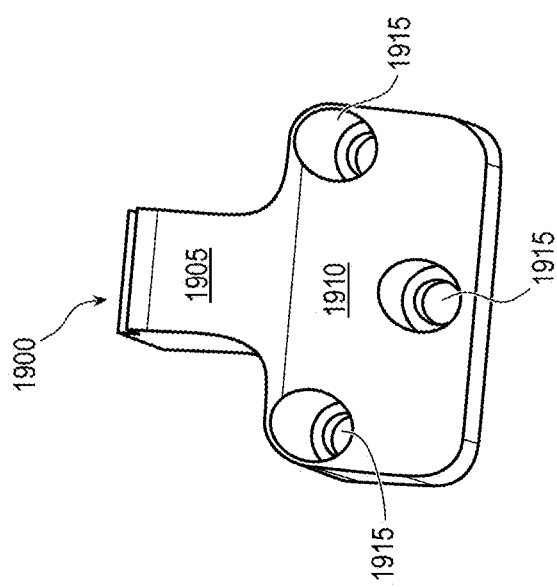
Figure 19A:
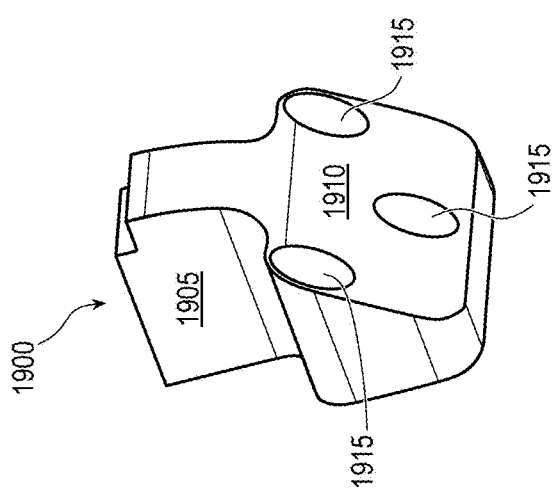

FIGS. 19A-19C illustrate perspective views of one embodiment of a plug to be used with the housing of FIGS. 18A-18C for an underwater LED light assembly. The plug 1900 is configured in size and shape to be received by the back surface recess 1825 illustrated in FIGS. 18A-18C. The plug 1900 includes a body 1910 and a back tab 1905. The back tab 1905 is configured in size and shape to be received by the back surface recess 1825 illustrated in FIGS. 18A-18C. The plug 1900 plugs the base 1810 of the housing 1800 to seal and protect electronic components that may be disposed in the base recess 1820. The plug 1900 also includes plug mounting holes 1915 to secure the plug 1900 to the base recess 1820. In some embodiments, the base surface recess 1825 facilitates an assembly process for the housing. In some embodiments, the base surface recess 1825 forms a wiring channel between the base recess 1820 (which may also be a main circuit cavity) and four wiring holes that carry wires to the pockets 1840 and the pocket recesses 1845, 1846. After assembly, the plug 1900 protect wires within the wiring channel against physical damage. The plug 1900, together with a sealant, also seals the wiring channel against water ingress.

Figure 20:
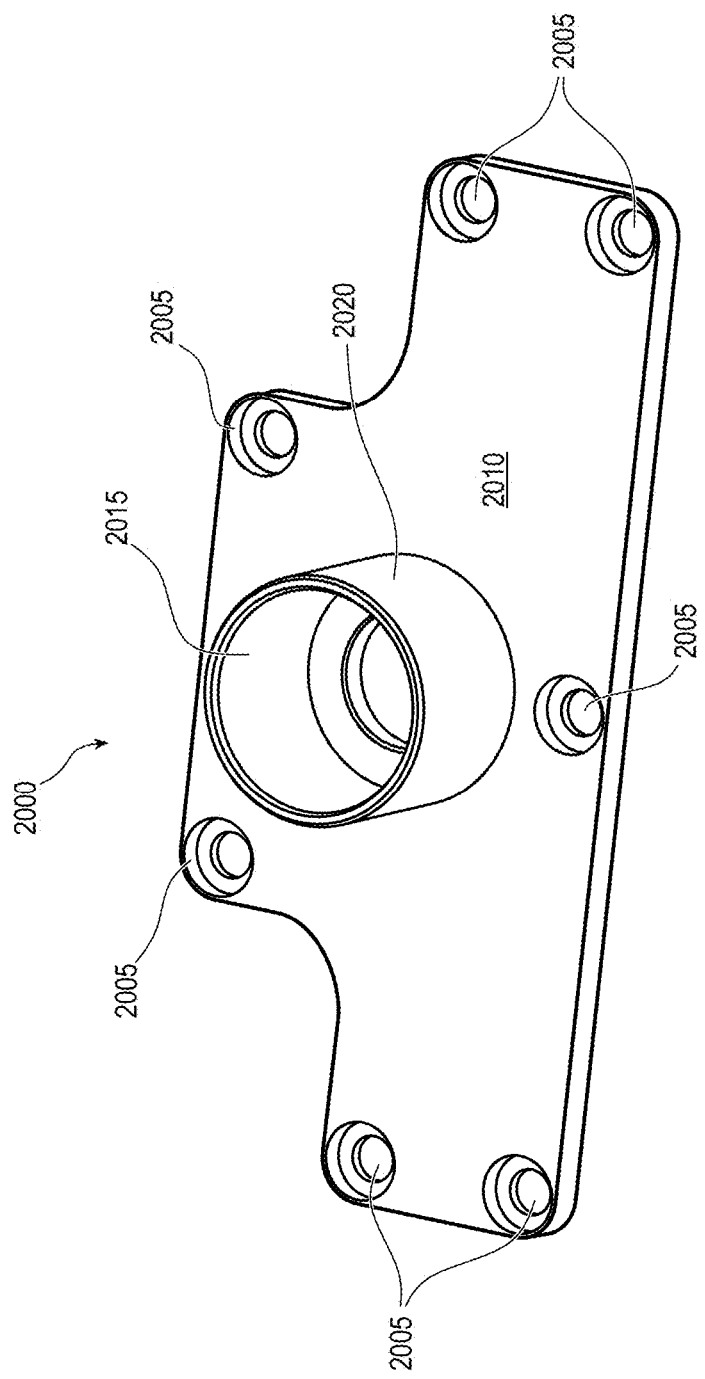
FIG. 20 illustrate a perspective view of one embodiment of a lid to be used with the housing of FIGS. 18A-18C for an underwater LED light assembly.

FIG. 20 illustrates a perspective view of one embodiment of a lid to be used with the housing of FIGS. 18A-18C for an underwater LED light assembly. The lid 2000 includes a body 2010, a plurality of mounting holes 2005, a protrusion 2020, and a cavity 2015. The protrusion 2020 has side walls with an inner surface that defines the cavity 2015. The body 2010 is configured in size and shape to fit within the base recess 1820 of the housing 1800. The plug 1900 can be installed in the housing 1800 prior to attaching the lid 2000. In some embodiments, the plug 1900 includes a small notch on the back tab 1905 into which the lid 2000 fits.

Once both the plug 1900 and the lid 2000 are installed (and the LED rings and lenses are installed), the LED light assemblies received by the housing 1800 are sealed and protected against water ingress.

Figure 21A:
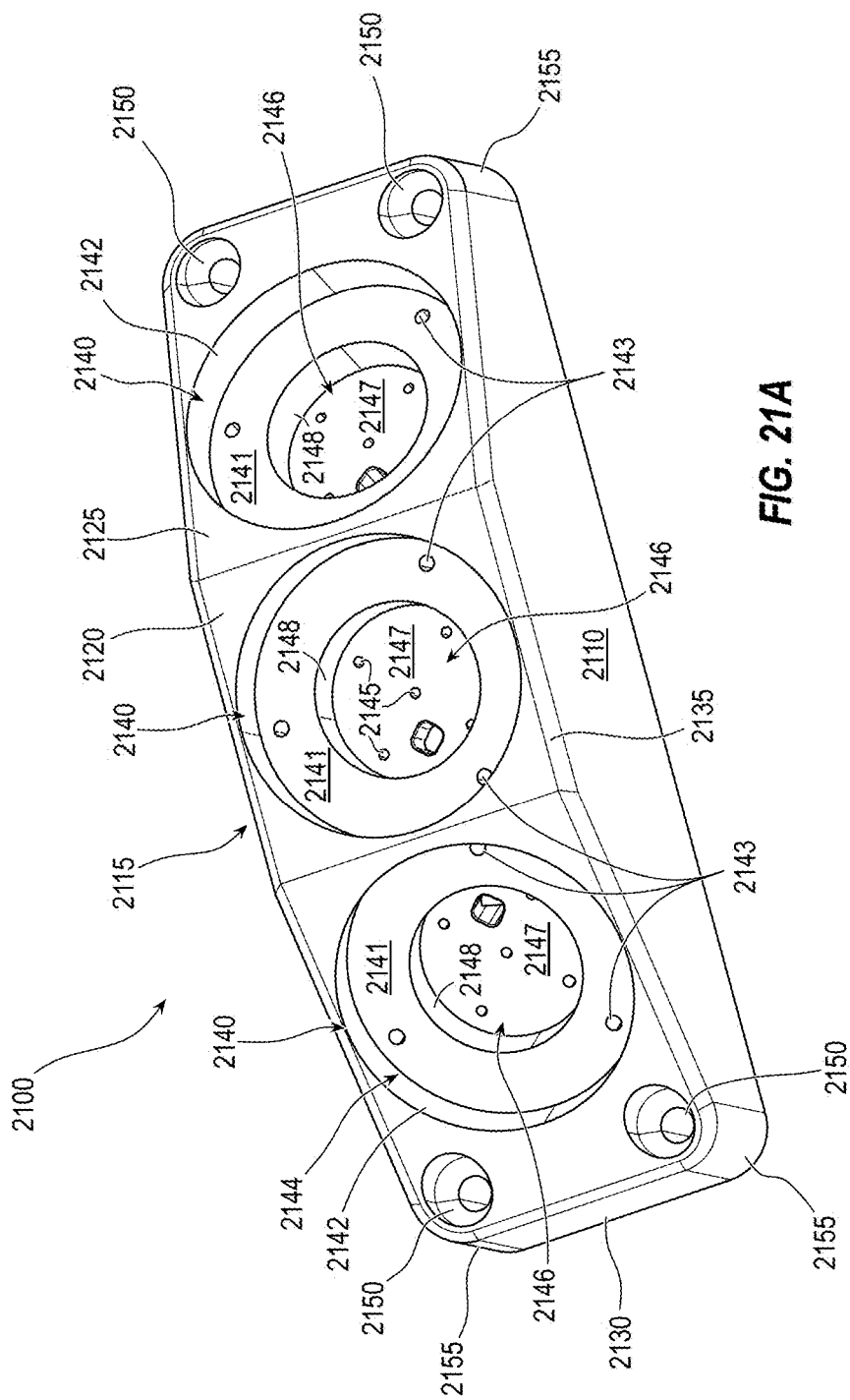
FIGS. 21A-21G illustrate perspective views of another embodiment of a housing for an underwater LED light assembly.
Figure 21B:
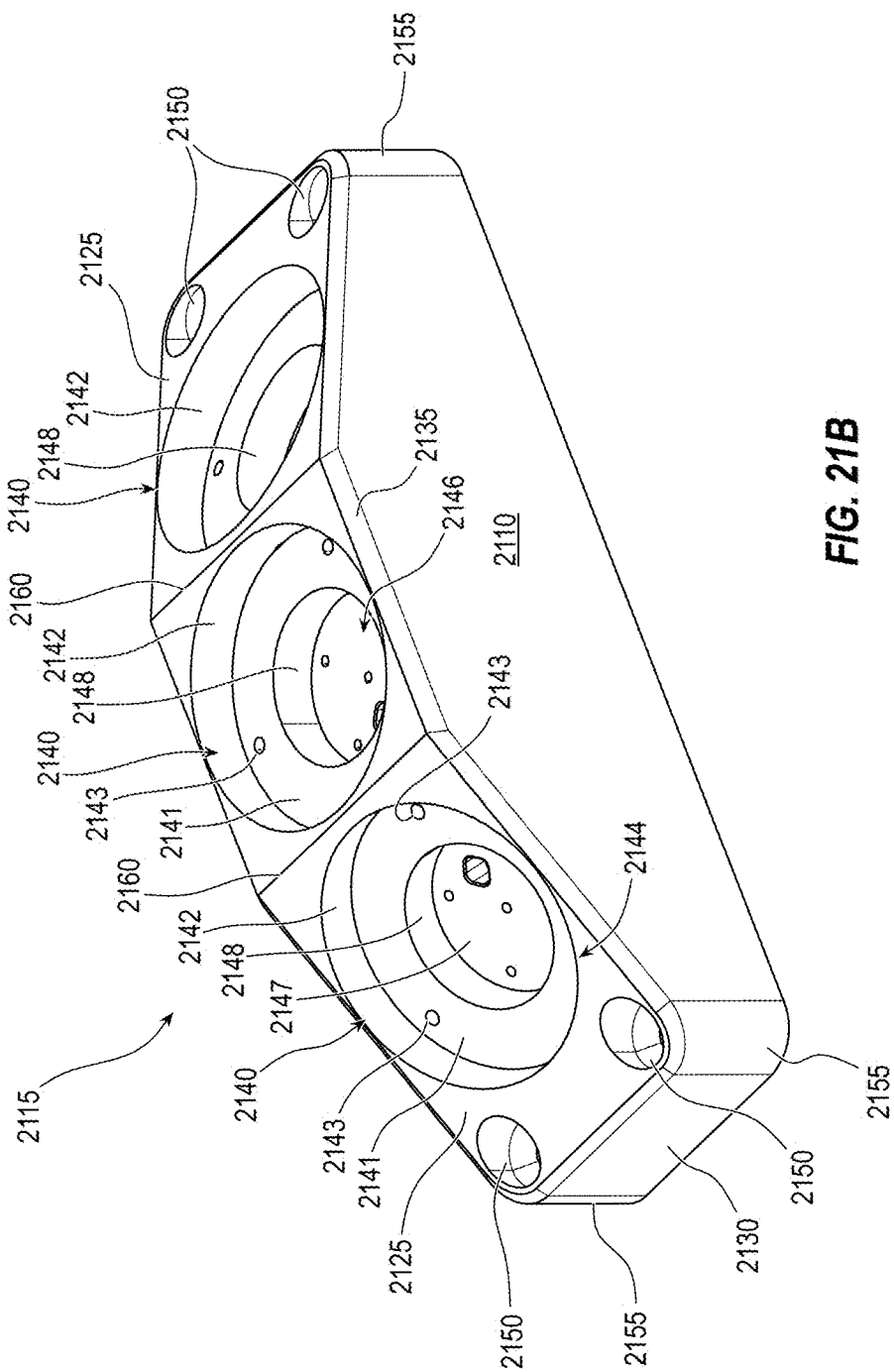
Figure 21C:
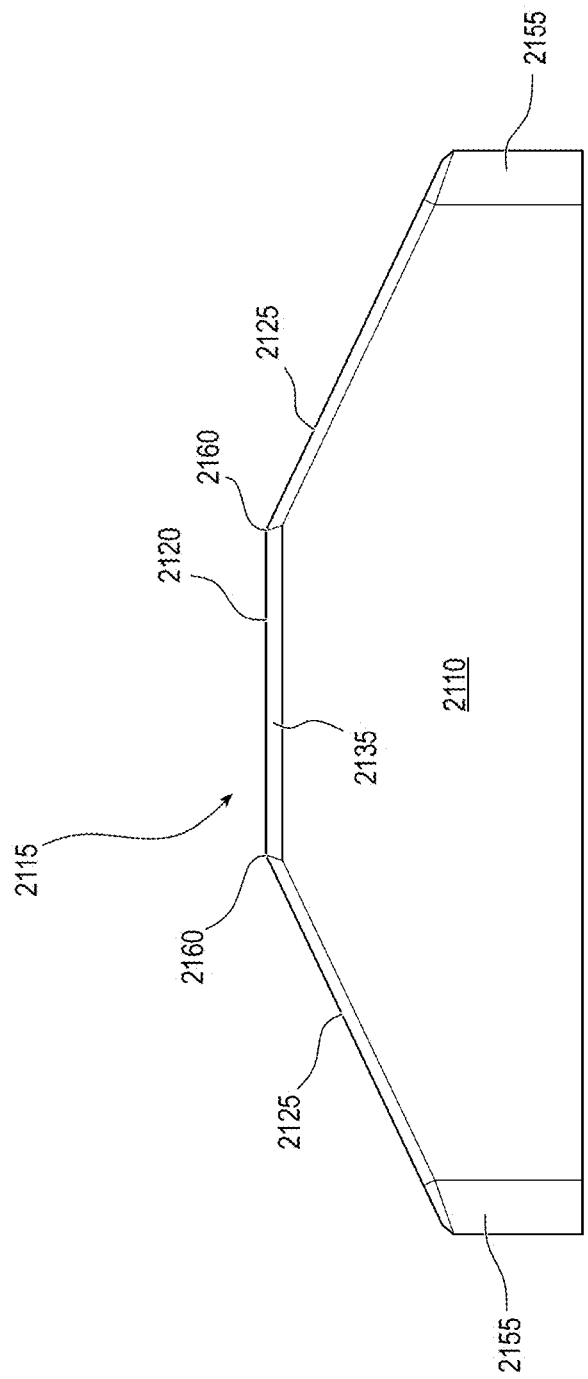
Figure 21D:
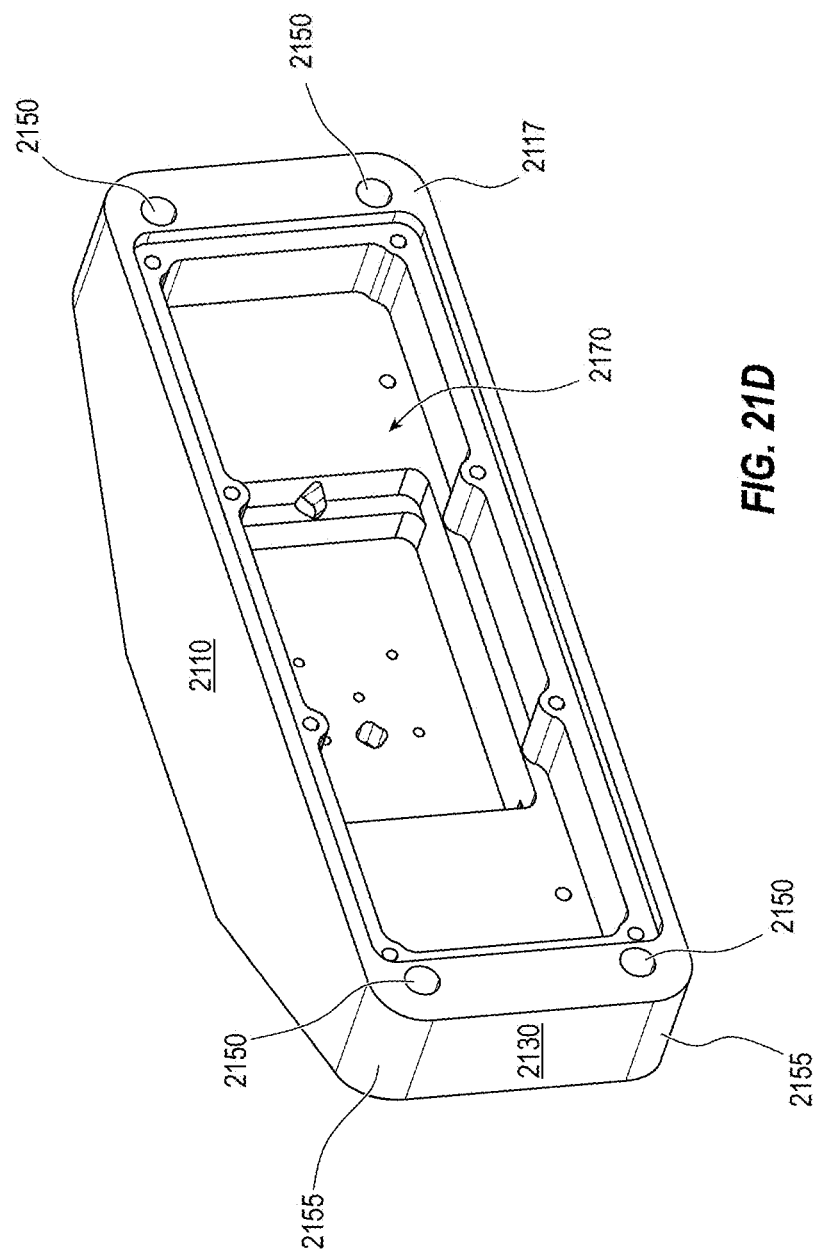
Figure 21E:
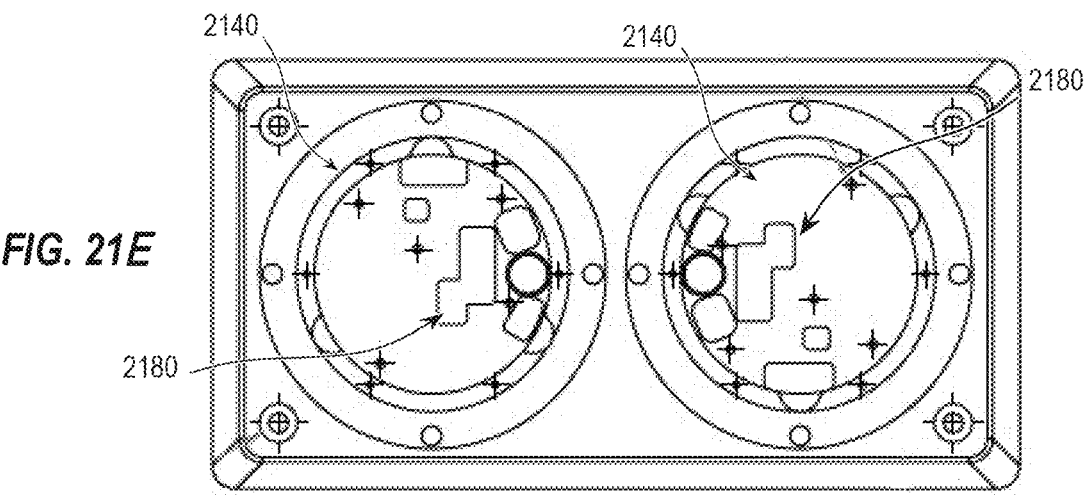
Figure 21F:
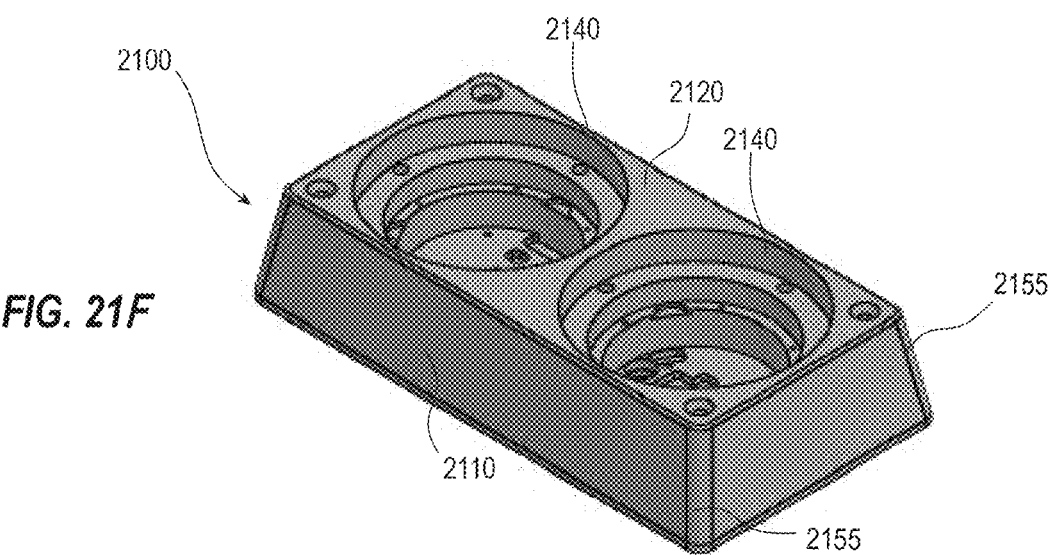
Figure 21G:
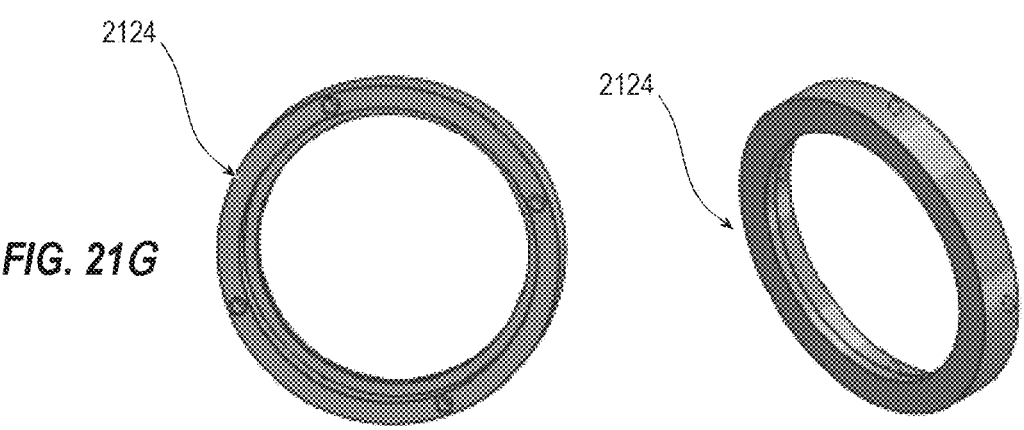

FIGS. 21A-21G illustrate perspective views of additional embodiments of a housing for an underwater LED light assembly. FIGS. 21A-21C illustrate a trapezoidal profile of the housing 2100, while FIG. 21F illustrates a rectangular or cuboid profile of the housing 2100. FIG. 21E illustrates a plan view of the housing 2100 and the electrical components 2180 that may be housed therein. FIG. 21G illustrates one embodiment of a lens ring 2124 that may be used to secure LED light assemblies to the housing 2100 or secure LED light assemblies within pockets 2140 of the housing 2100.

The housing 2100, generally, includes a top 2115 and a bottom 2117. As illustrated in FIGS. 21A-21D, the top 2115 can include a top surface 2120 flanked by opposing, beveled, lateral surfaces 2125. As illustrated in FIGS. 21E-21G, the top 2115 can include a substantially planar top surface 2120. The housing 2100 additionally includes opposing sides 2110, front and back surfaces 2130, a top edge 2135, mounting holes 2150 and corners 2155. In some embodiments, the top edge 2135 is chamfered or beveled. Generally, there are four (4) corners 2155.

Referring to FIGS. 21A-21C, each opposing lateral surface 2125 meets or joins the top surface 2120 at a ridge 2160. The top surface 2120 is generally planar and each opposing lateral surface 2125 is angled or biased away from both the top surface 2120 and their respective ridges 2160. Each opposing lateral surface 2125 is angled or biased toward the front or back surface 2130, as appropriate. The angle of bias toward the front or the back surfaces 2130 may be chosen in order to achieve a desired overall coverage angle for the emitted light. Due to the planarity of the top surface 2120 and the bias of each opposing lateral surface 2125, the sides 2110 have a substantially trapezoidal shape or profile. In some embodiments, the housing 2100 can have a substantially rectangular or cuboid profile, such as that illustrated in FIGS. 21E-21G. In such embodiments, the top 2115 includes a top surface 2120, which may be generally planar. The substantially rectangular profile may not include flanking lateral surface 2125.

The housing 2100 includes one or more pockets 2140 disposed in the top surface 2120 and the opposing lateral surfaces 2125. As illustrated in FIGS. 21A-21C, each surface 2120, 2125 includes one pocket 2140. As illustrated in FIGS. 21F, the surface 2120 includes two pockets 2140. More pockets may be incorporated into the top surfaces 2120 of the housings 2100 as appropriate. The pockets 2140 are similar to pockets 1840 and may be pockets 1840. The pockets 2140 each include a first pocket recess 2144 having first pocket recess holes 2143 that extend through a bottom 2141 of the first pocket recess 2144; a second pocket recess 2146 having second pocket recess holes 2145 that extend through a bottom 2147 of the second pocket recess 2146; a first inner wall 2142; and a second inner wall 2148. The first pocket recess 2144 is defined by the bottom 2141 and the first inner wall 2142.

In some embodiments, the bottom 2141 further defines an opening that provides access to the second pocket recess 2146. The second pocket recess 2146 is defined by the bottom 2147 and the second inner wall 2148. In some embodiments, the second inner wall 2148 extends from an edge of the first inner wall 2142 to meet the bottom 2147. In some embodiments, the edge of the first inner wall 2142 creates a lip or shelf that hangs over a portion of the second inner wall 2148.

A depth of the first pocket recess 2144 is a function of a height of the first inner wall 2142. Likewise, a depth of the second pocket recess 2146 is a function of a height of the second inner wall 2148. A diameter of the first pocket recess 2144 is a function of an outer diameter of the bottom 2141. In embodiments where the bottom 2141 defines an opening that provides access to the second pocket recess 2146, the bottom 2141 will have an inner diameter defining the size of the opening. Likewise, a diameter of the second pocket recess 2146 is a function of a diameter of the bottom 2147. The diameter of the second pocket recess 2146 is smaller than the diameter of the first pocket recess 2144. However, the diameter of the second pocket recess 2146 may or may not be smaller than the opening defined by the bottom 2141.

Each pocket 2140 is configured to receive an LED light assembly, such as the LED light assemblies described herein. Each individual LED light assembly may be sealed off from one another, as well as sealed off from a PCB chamber that may be disposed internally in the housing 2100. This beneficially ensures that, if one light were to be damaged or leak, the other lights would not necessarily be compromised and could still function normally. As described herein, the housing 2100 may house electrical components of the LED light assemblies, such as voltage converts, controllers, etc. Additionally, and/or alternatively, the housing 2100 may house a power supply and driver for the LED light assemblies, such as that shown in FIGS. 3-6.

FIG. 21E illustrates a top, plan view of the housing 2100 and the pockets 2140. In some embodiments, a bottom of one of the first or second pocket recesses is configured to house or facilitate access to electrical components 2180 of the LED light assemblies. For example, the electrical components 2180 can include electrical switches, voltage converters, alternators, thermal switches, ports to access a power supply, and the like.

The angular design of the housing 2100 illustrated in FIGS. 21A-21C produces three (3) diverging beam angles and provides a wider light pattern (e.g., when mounted in a horizontal configuration on the aft of the boat) than a traditional light. As each pocket 2140 is configured to receive an LED light assembly, the light pattern produced still enjoys the enhanced performance of a focusing lens in each individual LED light assembly. The housing 2100 with the LED light assemblies could be installed as a single light fixture, or in sets of multiple fixtures, positioned strategically on a boat or other marine vehicle for maximum performance.

With reference to FIG. 21D, the bottom 2117 of housing 2100 has a bottom recess 2170. In some embodiments, the bottom recess 2170 is configured to house electronic components that power the lighting assemblies received by the pockets 2140.

Figure 22:
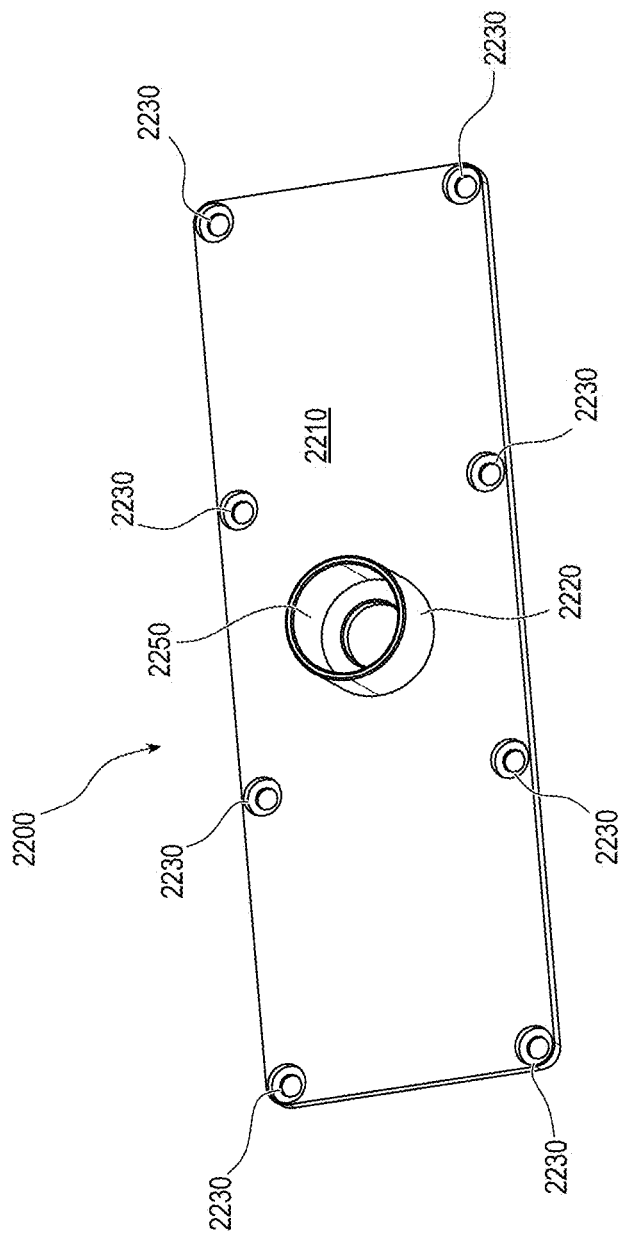
FIG. 22 illustrates a perspective view of another embodiment of a lid to be used with the housing of FIG. 21A-21G.

FIG. 22 illustrates a perspective view of another embodiment of a lid to be used with the housing of FIGS. 21A-21G. The lid 2200 includes a body 2210, a plurality of mounting holes 2230, a protrusion 2220, and a cavity 2225. The protrusion 2220 has side walls with an inner surface that defines the cavity 2225. The body 2210 is configured in size and shape to fit within the base recess 2170 of the housing 2100.

Figure 23:
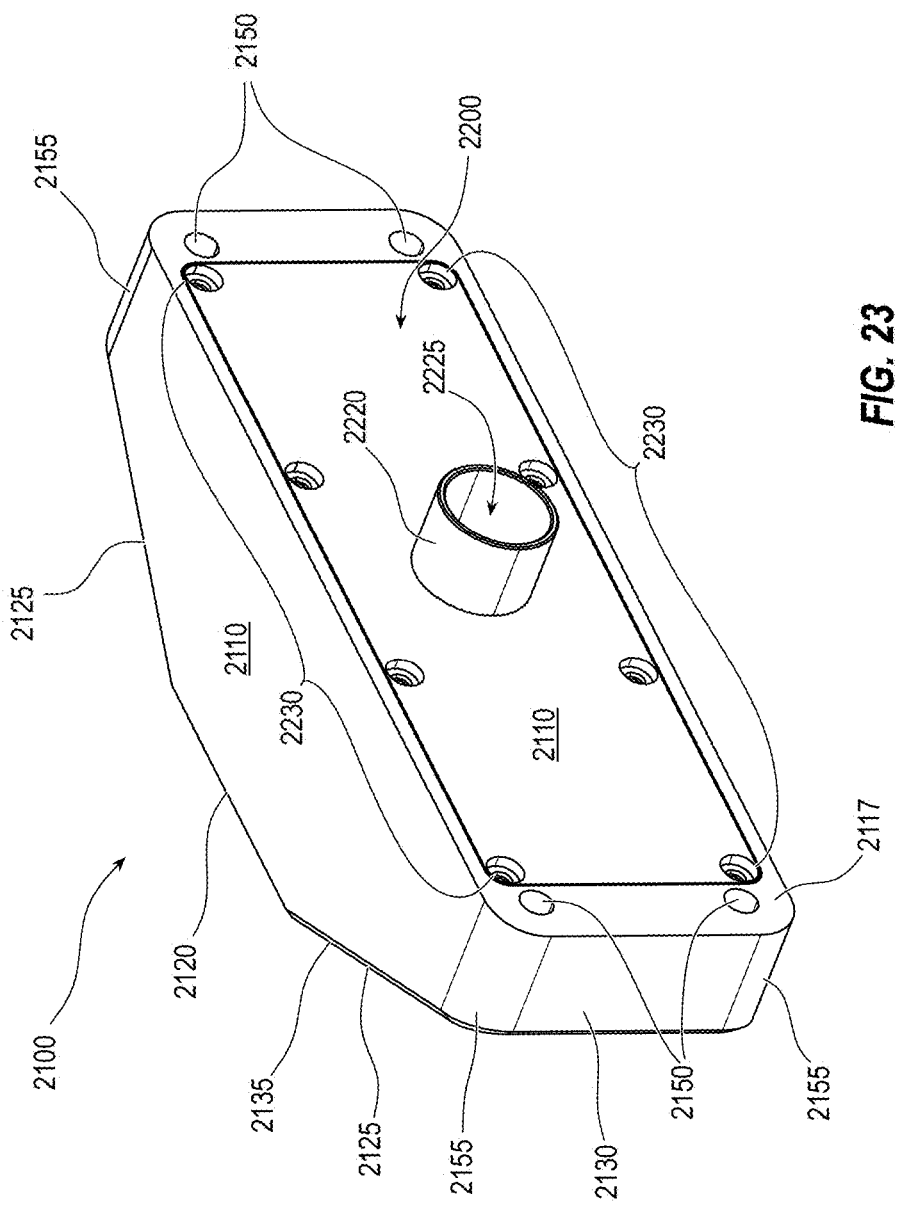
FIG. 23 illustrates a perspective view of the housing of FIGS. 21A-21G having received the lid from FIG. 22.

FIG. 23 illustrates a perspective view of the housing of FIGS. 21A-21D having received the lid from FIG. 22. When the lid 2200 is received by the bottom recess 2170 of the housing 2100, the lid 2200 is flush with the bottom surface 2117 other than where the protrusion 2220 extends outward from the body 2210 of the lid 2200. The plurality of mounting holes 2230 secure the lid 2200 to the housing 2100. The lid 2200 can also be received by housing 2100 illustrated in FIGS. 21E-21G, and will be similarly flush other than where the protrusion 2220 extends from the body 2210 of the lid 2200.

The housing 2100 may be mounted/attached to a boat or other marine vehicle as a rear-facing light, mounted above the waterline, in order to provide aft-facing light on the wave/wake of the boat. The aft-facing light also illuminates a swim platform of the boat for safety at night when it is normally dark. Additionally, and/or alternatively, the housing 2100 may be mounted/attached on the bow of the boat as a forward facing "spotlight," "spreader light," or "docking light."

When mounted on the bow, the housing 2100 may be mounted in a vertical orientation, "stacking" each pocket 2140 and corresponding LED light assembly on top of each other. This mounting position allows for three (3) different angles of light to be projected ahead of the boat or marine vehicle, when a trapezoidal profiled housing is utilized. The "stacking" of each pocket 2140 also occurs with the rectangular or cuboid profiled housing. This is advantageous in comparison to traditional bow lights, in that there is a longer vertical column of light produced, regardless of the angle of the bow, relative to the waterline while underway (i.e., if a boat were at rest, the highest positioned light is likely in a forward-facing position, while the two lower lights are providing light towards the surface of the water).

If the boat were underway at a higher speed of travel (on plane), then it would typically have a slightly bow high riding position, as compared to a boat at rest on the water. This would enable the middle light (corresponding to top surface 2120) to act as a more direct forward-facing light, with the lowest of the lights still projecting slightly downward at the surface of the water. And, while traveling at a slower speed (bow high, not on plane), then the lowest of the three lights would still be at an angle advantageous to lighting the area ahead of the boat, while underway. Traditional bow lights are typically made with a single light angle and are most efficient in only one of these three examples/scenarios; they do not provide adequate light in all three illustrated uses.

FIG. 24A illustrates a perspective view of another embodiment of an underwater LED light assembly. FIG. 24B illustrates an assembled, cross-sectional view of the underwater LED light assembly of FIG. 24A. The LED light assembly 2400 includes a lid 2405, an LED assembly 2415, a base 2410 and a lens 2430. When the LED light assembly 2400 is fully assembled (as in FIG. 24B), the lens 2430 is substantially flush with the lid 2405.

The lid 2405 includes a body 2402 that extends from a top 2404. The top 2404 defines an opening 2409 and contains internal threading 2407. The base 2410 includes a body 2414, an externally threaded head 2412 and a port 2420. In some embodiments, the port 2420 is configured to accept wires, such as wires connecting the power supply and/or the driver of FIGS. 3-6 to the LED light assemblies. The internal threading 2407 and the opening 2409 of the lid 2404 are configured to receive the threaded head 2412 of the base 2410. In some embodiments, the body 2402 of the top 2404 includes external threading 2407 to be received by an internally threaded head 2412 of the base 2410.

The base 2410 is generally cylindrical, hollow, and configured to receive the LED assembly 2415. The LED assembly 2415 includes a body 2416 and an LED recess 2417. In some embodiments, the body 2416 is T-shaped and is configured to accept multiple circuit boards, similar to the PCBs 1160 illustrated in FIG. 11. For example, the body 2416 may receive and accept one PCB on each side of the large, flat surfaces of the T. In some embodiments, the LED recess 2417 is configured to receive the LED array of FIG. 10 (e.g., the LED array of FIG. 10 can be mounted or otherwise disposed within the LED recess 2417). In some embodiments, the LED recess 2417 includes a base that may be a printed circuit board (PCB). In some embodiments, individual diodes may be mounted on and in direct electrical communication with the PCB, similar to the LED light assembly 1100 described in relation to FIG. 11. The body 2416 of the LED assembly 2415 may have a substantially T-shaped profile, as depicted in FIG. 24B.

As shown in FIG. 24B, the LED assembly 2415 is sized and shaped to fit inside the base 2410. A top portion 2418 of the body 2416 forms the LED recess 2417. The top portion 2418 is sized, shaped, and configured to rest on a top edge of the threaded head 2412 of the base 2410. When the top portion 2418 is rested on the top edge of the threaded head 2412, the external threads are still available and accessible to be engaged by internal threading 2407 of the lid 2405. In some embodiments, a lens gasket is disposed between the lid 2405 and the LED recess 2417. The internal threading 2407 joins and engages the externally threaded head 2412 at threaded joint 2425. In some embodiments, an O-ring seal is disposed between the externally threaded head 2412 and the internal threading 2407. When the lid 2405 is screwed onto the base 2410, the LED assembly 2415 is entirely contained within the structure formed by the lid 2405 and the base 2410. In this way, the LED assembly 2415 is sealed and protected from water. As seen in FIG. 24B, the port 2420 at the bottom of the base 2410 is in communication with the interior of the base body 2414. For example, the port 2420 may provide electrical access to the LED assembly 2415 disposed internally in the base body 2414.

Figure 25B:
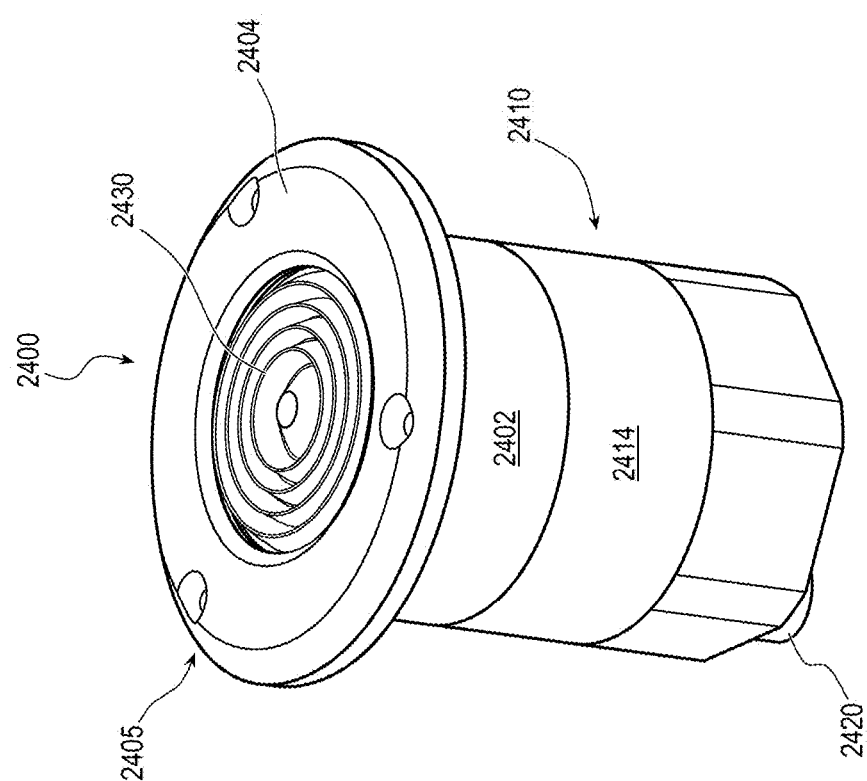
FIGS. 25A-25B illustrate perspective views of the underwater LED light assembly illustrated in FIGS. 24A-24B.
Figure 25A:
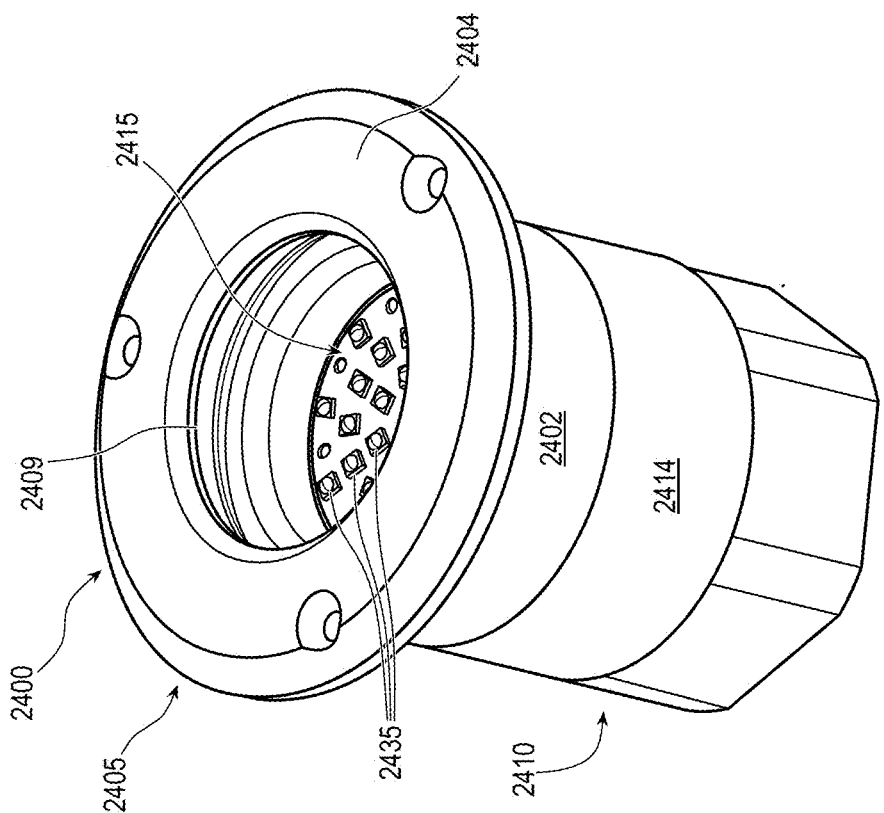

FIGS. 25A-25B illustrate assembled, perspective views of the underwater LED light assembly illustrated in FIGS. 24A-24B. The assembled underwater light assembly 2400 includes the lid 2405 screwed to the base 2410 such that the body 2402 of the lid 2405 abuts the body 2414 of the base 2410. An outer diameter of the body 2402 is substantially the same as an outer diameter of the body 2414. Thus, where the two bodies 2402, 2414 abut each other, an outer surface of the assembled LED light assembly 2400 is smooth and continuous. In some embodiments, a bottom portion of the base 2410 (i.e., the portion of body 2414 which does not contact body 2402) may have a hexagonal or other shaped configuration. Such shaped configuration may enhance attachment of the assembled LED light assembly 2400 to a boat or other marine vehicle. In some embodiments, the hexagonal shape of the assembled LED light assembly 2400 facilitates tightening/loosening of the base 2410 and lid 2405 against each other. A wrench can engage with the hexagonal shape on 2410. In some embodiments, the lid 2405 is bolted to the boat, so it cannot rotate when torque is applied by the wrench against base 2410.

When the lid 2405 and the base 2410 are connected and screwed together, they create a substantially cylindrical structure, where the top 2404 of the lid 2405 overhangs both bodies 2402, 2414. That is, an outer diameter of the top 2404 is greater than the outer diameters of both bodies 2402, 2414. The LED assembly 2415 (upon which a plurality of diodes 2435 have been mounted) can be seen through the opening 2409 of the lid 2405. The assembled LED light assembly 2400 also includes a lens 2430. As illustrated in FIG. 25B, the lens 2430 is a Fresnel lens, though other lens types may be used as appropriate. The port 2420 extends from the bottom portion of the body 2414.

Figure 26A:
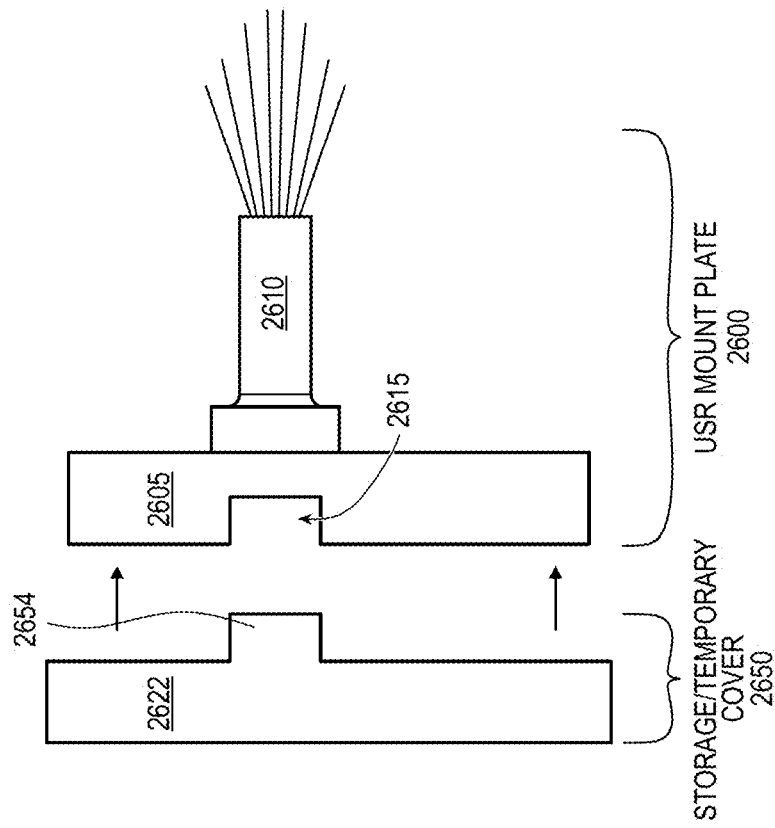
FIGS. 26A-26B illustrate schematic views of one embodiment of a mount plate to be used with an underwater LED light assembly.
Figure 26B:
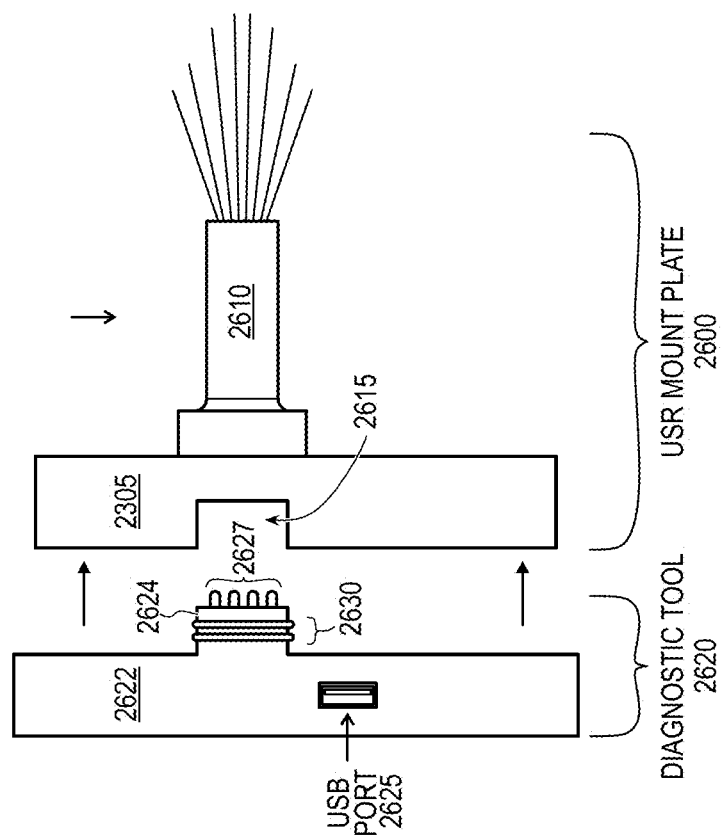

FIGS. 26A-26B illustrate schematic views of one embodiment of a mount plate to be used with an underwater LED light assembly. In some embodiments, the mount plate 2600 is the same mounting plate 1450 described with respect to FIG. 14.

The mount plate 2600 can be an Upgrade, Service, Repair (USR) mount plate. The mount plate 2600 includes a base plate 2605, a wiring harness 2610, and a cavity 2615 within the base plate 2605. The wiring harness may house a plurality of cables or wires. The cavity 2615 is configured to receive an LED light assembly, a cover such as cover 2650, and/or a diagnostic tool 2620. The cavity 2615 is in electrical communication with the wiring harness 2610 such that the LED light assembly or diagnostic tool 2620 received by the cavity 2615 may also be in electrical communication with the wiring harness 2610. The mount plate 2600 is configured to be permanently installed on a boat or other vehicle, while the LED light assembly can be easily removed and replaced.

Beneficially, the mount plate 2600 allows the LED light assembly to be easily and quickly upgraded (e.g., to a newer, better, more efficient, etc. assembly); to be serviced (e.g., cleaned, maintained, etc.); and/or repaired (e.g., fix damaged lenses, housings, circuits, etc.). Because the LED light assembly is easily removable, it makes the process of upgrading, servicing, and repairing easier. The mount plate 2600 also creates a point of demarcation. As such, the LED light assembly can be easily replaced with a diagnostic tool (see FIGS. 26A and 31) which can be used to assess the performance of the elements of the overall lighting system that reside in the boat itself. For example, a troubleshooting question that often arises is: "if the light doesn't turn on, is there a problem with the light itself or is the problem with the wiring or something else in the boat?" Having a clean point of demarcation allows a technician/user to easily diagnose the LED light assembly separate from the boat or other vehicle, and to diagnose the boat separate from the LED light assembly.

FIG. 26A illustrates the mount plate 2600 in use with a diagnostic tool 2620. The diagnostic tool 2620 may enable monitoring of the electrical connection to and/or electrical power delivered from the wiring harness 2610. The diagnostic tool 2620 includes at least one USB port 2625, a tool plate 2622, and tab 2624. The tab 2624 includes spring contacts 2627 and at least one O-ring 2630; as illustrated, there are two O-rings 2630. O-rings 2630 enable a sealed connection between the tab 2624 and the cavity 2615. Though O-rings 2630 are illustrated as facilitating the sealed connection, any type of seal will work as long as a watertight seal is afforded the connection. The spring contacts 2627 enable monitoring and detection of the electrical connection to and/or electrical power delivered from the wiring harness 2610. The USB port 2625 may facilitate the transfer of information relating to the monitoring and detection of the electrical connection to and/or electrical power delivered from the wiring harness 2610. For example, the USB port 2625 may facilitate the transfer of information to an external hard drive. In some embodiments, the USB port 2625 can be connected to a computer that performs real-time diagnostics. The USB port 2625 may also be configured to write a log-file to a memory/storage device, such as a hard drive or USB memory stick.

A cover 2650 may be attached to the mount plate 2600 when no LED light assembly or diagnostic tool 2620 is connected to the mount plate 2600. The cover 2650 includes a tab 2654 to be received by the cavity 2615.

Figure 27:
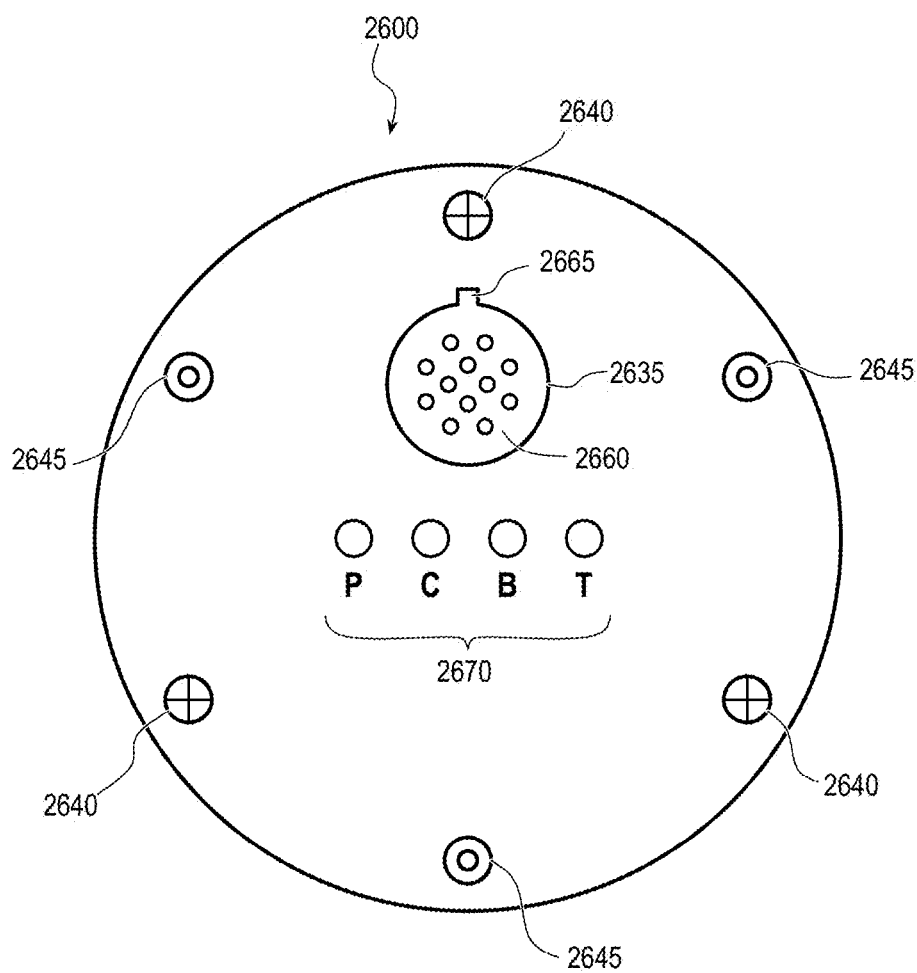
FIG. 27 illustrates a schematic front view of the mount plate illustrated in FIGS. 26A-26B.

FIG. 27 illustrates a schematic front view of the mount plate illustrated in FIGS. 26A-26B. The mount plate 2600 includes a plurality of mounting screws 2640, a plurality of mounting holes 2645, a plurality of LEDs 2670 and a connector 2660. The plurality of LEDs 2670 may include a power LED (p); a color LED (c); a CAN BUS LED (b); and a termination LED (t). More LEDs may be included to meet the particular needs of the mount plate 2600, an underwater LED light assembly and/or diagnostic purposes.

The connector 2660 includes a keyed feature 2665 and enables a water-tight seal 2635. In some embodiments, the keyed feature 2665 ensure that the mating connector 2660 is inserted into the cavity 2615 with the correct orientation and/or rotation. In some embodiments, the connector 2660 facilitates and/or permits electrical connection to wires disposed in the wiring harness 2610.

Figure 28:
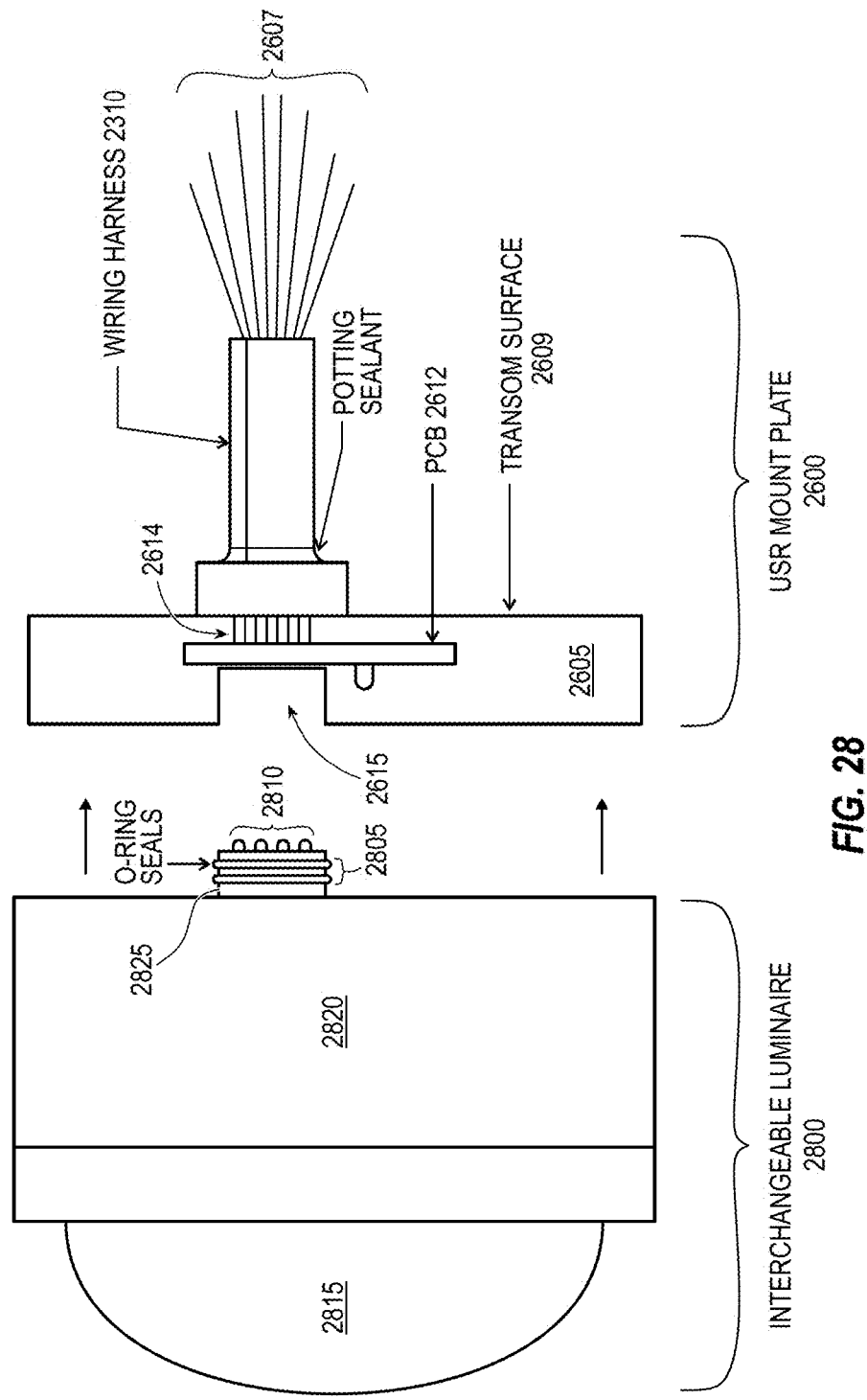
FIG. 28 illustrates a schematic view of an underwater LED light assembly connecting to the mount plate illustrated in FIGS. 26A-27.

FIG. 28 illustrates a schematic view of an underwater LED light assembly connecting to the mount plate illustrated in FIGS. 26A-27. FIG. 18 illustrates a cross-sectional view of the mount plate 2600. As illustrated, an interchangeable luminaire 2800 is connecting to the mount plate 2600. The interchangeable luminaire 2800 may be the underwater LED light assembly of FIGS. 3-6, 11, 13-14, and 24A-25B.

The interchangeable luminaire 2800 includes a lens 2815, a housing or base 2820, and a tab 2825. The tab 2825 is configured to be received by the cavity 2615 of the mount plate 2600. The tab 2825 includes at least one O-ring 2805 and spring contacts 2810. As illustrated, the tab 2815 includes two O-rings 2805; the O-rings 2805 enable a water-tight seal between the interchangeable luminaire 2800 and the mount plate 2600. Though O-rings 2805 are illustrated, as facilitating the sealed connection, any type of seal will work as long as a watertight seal is afforded the connection. Spring contacts 2810 enable electrical connection and communication between the interchangeable luminaire 2800 and the mount plate 2600.

The mount plate 2600 includes the base plate 2605, the wiring harness 2610 and the cavity 2615. A printed circuit board (PCB) 2612 is internally disposed within the base plate 2605, and is disposed between the cavity 2615 and the wiring harness 2610. Electrical connections 2614 may enable electrical connection and communication between the PCB 2612 and the wiring 2607 contained inside the wiring harness 2610. The wiring 2607 may provide power to the PCB 2612. Potting sealant or another adhesive may be utilized to secure the wiring harness 2610 to a transom surface 2609 of the base plate 2605. When the mount plate 2600 is attached and mounted to a boat, the transom surface 2609 abuts the boat.

Figure 29:
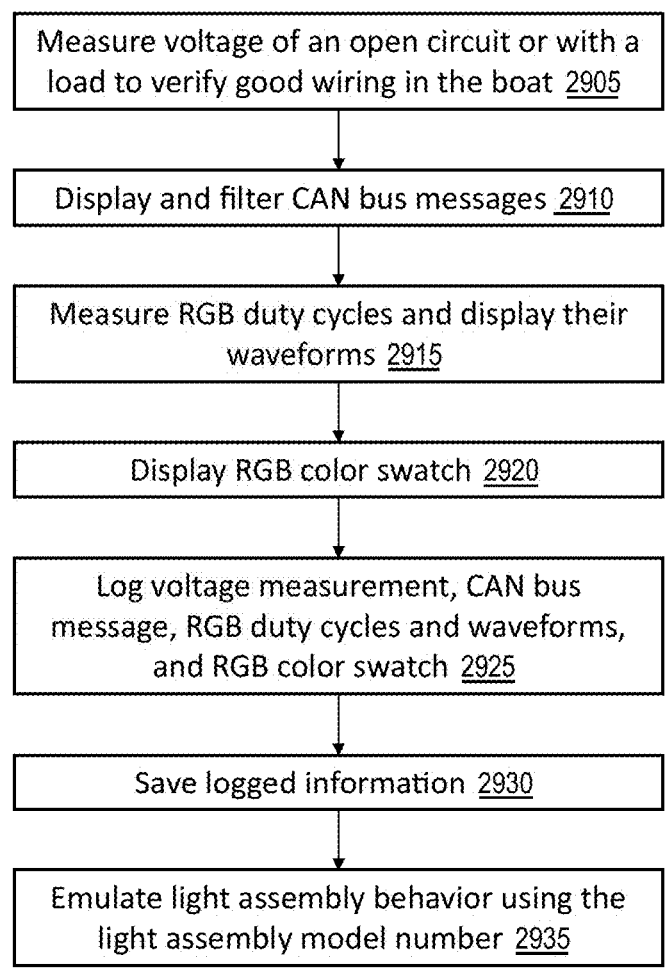
FIG. 29 illustrates a flowchart of an example of a method for diagnosing an anomaly of wiring in either an underwater LED light assembly or a boat upon which the underwater LED light assembly is mounted.

FIG. 29 illustrates a flowchart of an example of a method for diagnosing an anomaly of wiring in either an underwater LED light assembly or a boat upon which the underwater LED light assembly is mounted. The method 2900 may be executed using the diagnostic tool 2620 illustrated in FIG. 26A. The method 2900 includes measuring the voltage of an open circuit, or a circuit with a load, to verify good wiring in the boat (step 2905). The method 2900 also includes displaying and filtering CAN BUS messages (step 2910). The method 2900 further includes measuring duty cycles and displaying their waveforms (step 2915), and displaying an RGB color swatch (step 2920).

The method 2900 additionally includes logging the voltage measurements, CAN BUS messages, RGB duty cycles and their waveforms, and the RGB color swatch (step 2925). The method 2900 includes saving the logged information from step 2925 (step 2930). The method may also include emulating a light assembly (e.g., an underwater LED lighting assembly of the present disclosure) behavior using the light assembly model number (step 2935). Though the method 2900 is described as having a particular order, the method 2900 can proceed in any order and may omit one or more steps.

Figure 30B:
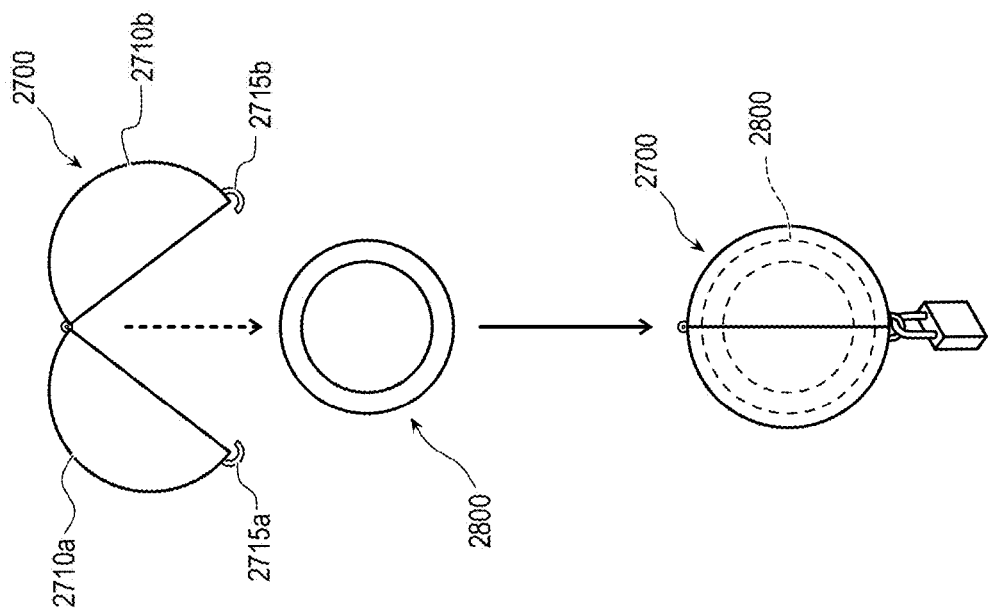
FIGS. 30A-30B illustrate schematic views of one embodiment of a cover to be used with an underwater LED light assembly of the present disclosure.
Figure 30A:
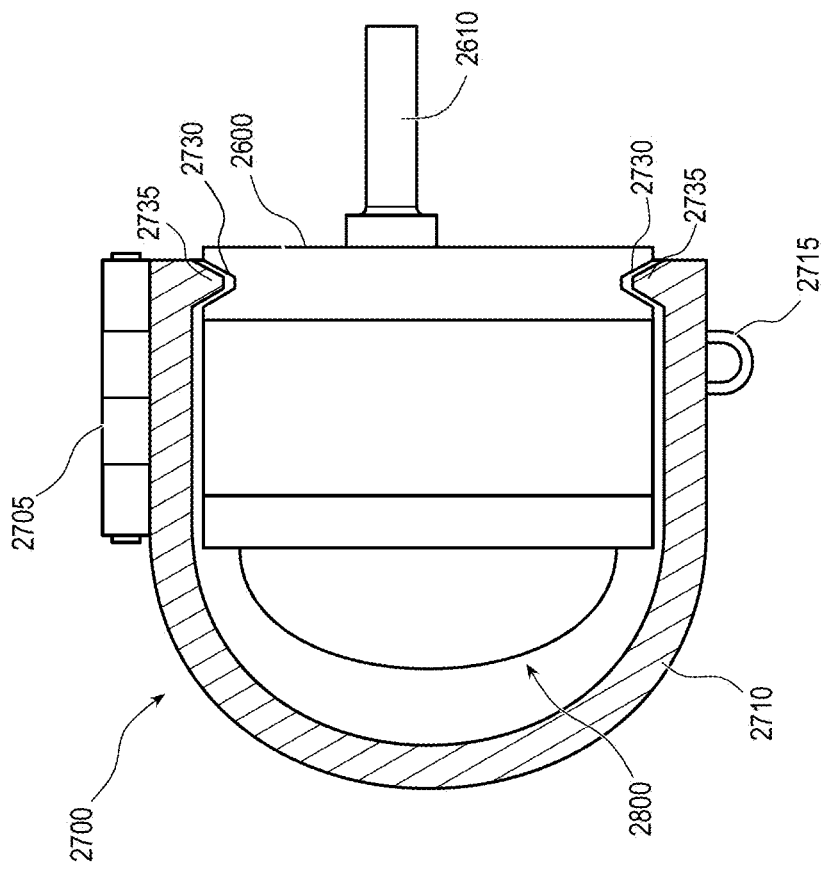

FIGS. 30A-30B illustrate schematic views of one embodiment of a cover to be used with an underwater LED light assembly of the present disclosure. The cover 2700 includes a case body 2710, a hinge 2705 and a clasp 2715. As shown in FIG. 30B, the case body 2710 includes two halves 2710a, 2710b which are connected together at the hinge 2705. Each half of the case body 2710a, 2710b has a portion of the clasp 2715a, 2715b. When the two halves 2710a and 2710b are closed, the portions of the clasp 2715a and 2715b join together to form clasp 2715. Clasp 2715 may be configured to receive a lock, thereby locking the cover 2700 around an interchangeable luminaire 2800.

The case 2710, when closed, may be essentially hollow and sized to accommodate the interchangeable luminaire 2800. As illustrated, the interchangeable luminaire 2800 is connected to the mount plate 2600, which has wiring harness 2610. In some embodiments, the mount plate 2600 includes notches 2730 configured to receive protrusion 2735 of the case 2710. The protrusions 2735 enable the case 2710 to stay secured to and around the interchangeable luminaire 2800 and the mount plate 2600. The cover 2700 may protect the interchangeable luminaire 2800 from damage while the interchangeable luminaire 2800 is not in use. The case 2710 additionally discourages theft of the interchangeable luminaire 2800.

Figure 31:
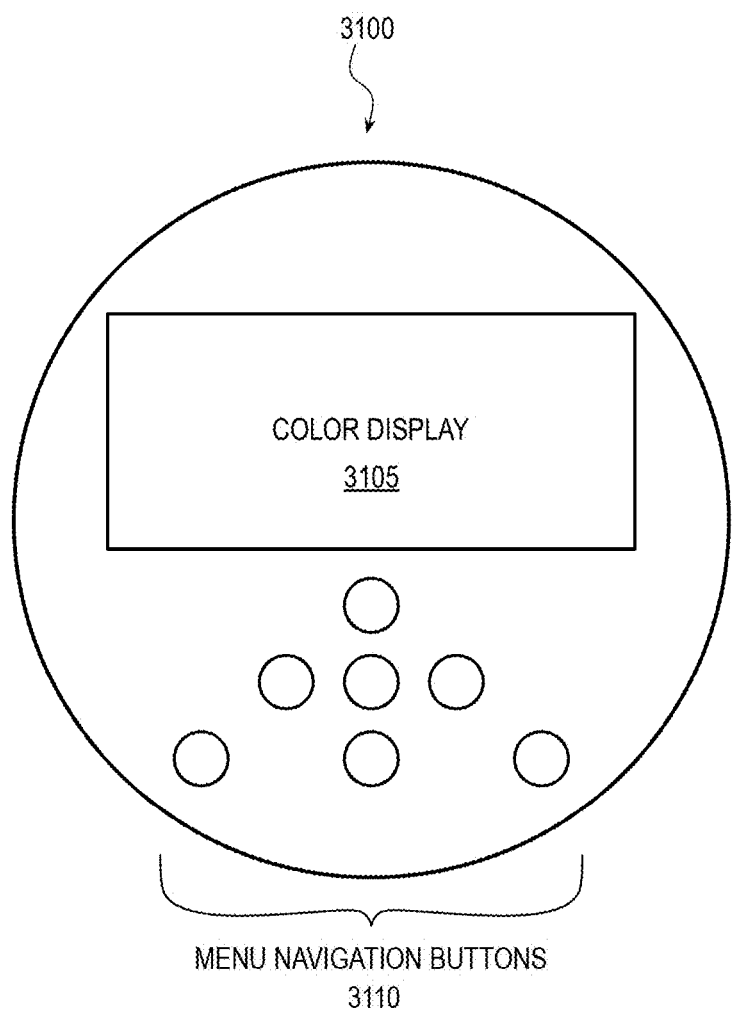
FIG. 31 illustrates a schematic view of one embodiment of a display.

FIG. 31 illustrates a schematic view of one embodiment of a diagnostic tool. The diagnostic tool 3100 includes a screen 3105, which may be a color display or LCD screen, and a plurality of navigation buttons 3110. The plurality of navigation 3110 buttons may enable a user to perform various functionalities, such as the method of diagnosing an anomaly of wiring in either an underwater LED light assembly or a boat described in relation to FIG. 29.

In some embodiments, the diagnostic tool 3100 is configured to monitor voltages, both in an open circuit and when the circuit is under load. Additionally, the diagnostic tool 3100 allows for the assessment of a wiring condition. The diagnostic tool 3100 is also configured to display and filter CAN bus messages; measure RGB duty cycles and display waveforms; and display RGB color swatches. In some embodiments, the diagnostic tool 3100 is configured for disk utilities, such as displaying files on or from a USB drive; save, view, and delete files; copy local log-files to a USB. The diagnostic tool 3100 may be further configured to store local log-files; emulate a luminaire behavior based on a model number; address management; provide a battery or other power source state of charge; provide intermittent wire connection tone tool; measure "hum" noise on power bus connections; among other things.

II. Systems for Monitoring and Optimizing the Quality of Electrical Power

Also disclosed are systems and methods for monitoring, measuring, detecting, altering, optimizing, and/or modifying electrical power delivered to a load device. The load device can be a boat light, other marine vessel lights, and/or other power consuming devices. For example, disclosed systems and methods can be used for monitoring, measuring, detecting, altering, optimizing, and/or modifying electrical power delivered to home appliances such as toasters, microwaves, coffee makers, speakers, fans, etc. In other words, the disclosed systems and methods are configured for monitoring, measuring, detecting, altering, optimizing, and/or modifying electrical power delivered to any device that consumes electrical power. In some embodiments, the systems and methods enable detection and adjustment of the electrical power delivered to the load device, in order to ensure a sufficient amount and quality of electrical power is being delivered. Some embodiments of the present disclosure enable modification of one or more power characteristics across the system to ensure delivery of high-quality electrical power. In some embodiments, a system employs methods to: a) monitor the quality of electrical power delivered to a load device; b) adjust and/or modify the operation of the power source and/or interconnections and/or the load device to optimize the quality of electrical power delivered to the load device.

In some embodiments, a system for monitoring the quality of electrical power delivered to a load device includes a power source, an interconnection system, and a power consuming/load device. The power source may be a single power source or may be a plurality of single power sources. The interconnection system may include a plurality of sub-systems that enable monitoring, measurement, detection, and/or alteration of the electrical power being supplied to and/or received by the load device.

In some embodiments, the system optionally includes a central director/coordinator/processor and a user interface. The user interface may enable and facilitate manipulation of and/or interaction with the electrical system by a user. The user interface may allow a user to provide a user input to the electrical system. For example, the user interface may allow a user to alter the power consumption of the load device. The user may alter the power consumption of the load device in order to achieve a desired quality of electricity delivered. Additionally, and/or alternatively, the user may alter the power consumption of the load device in response to a determination, by the electrical system, that the quality of electrical power delivered to the load device is poor.

In some embodiments, the system issues an alert in response to a determination that the quality of electrical power delivered fails to satisfy a threshold value. In response to the alert, the system may alter one or more of (i) a power consumption of the load device; (ii) a source voltage; (iii) a source current; (iv) a load voltage; (v) a load current draw; (vi) a flow of power; (vii) one or more inter-block communications; and/or (viii) an output of one or more system components. The one or more system components may include the load device, the power source, the interconnection system, the optional user interface, and/or the optional central director/coordinator/processor.

Also disclosed are methods for monitoring, measuring, detecting, and/or altering the quality of electrical power delivered to a load device. In some embodiments, a method includes monitoring and measuring a voltage and current of a power source. The method also includes monitoring and measuring a voltage and current received by a load device. The source voltage and current, and the load voltage and current, together comprise monitor data. The method further includes using the acquired monitor data to ascertain or calculate the quality of electrical power delivered from the power source to the load device.

In some embodiments, a plurality of voltages and currents from a plurality of power sources may be monitored. In some embodiments, a plurality of voltages and currents received by a plurality of load devices may be monitored.

In alternative embodiments, a method for monitoring, measuring, detecting, and/or altering the quality of electrical power delivered to a load device includes monitoring and measuring a voltage and current of a load device (i.e., voltage/current received by a load device). The method also includes altering an amount of power consumed by the load device. In response to altering the amount of power consumed, the method again includes monitoring the voltage and current of the load device. The monitored voltages and currents are aggregated together as monitor data. The method further includes using the monitor data to ascertain/calculate an equivalent electrical resistance of, for example, an interconnection system of an electrical system. In response to calculating the equivalent electrical resistance, the method again includes monitoring the voltage and current of the load device. The equivalent electrical resistance, and subsequently monitored load voltage and current, are incorporated into the monitor data. The method includes using the monitor data (i.e., all monitored load voltages and currents and the calculated equivalent electrical resistance) to ascertain the quality of electrical power delivered.

Terms and Definitions

"Quality of electrical power delivered" can have a multitude of definitions. The definitions below are some examples of various ways in which "quality of electrical power" may be defined.

In some embodiments, the quality of electrical power delivered may be defined as "power delivery efficiency." "Power delivery efficiency" may be defined as $P_{load}/P_{source}$ (in ratio form) where 1.0 is the best or highest quality of power, and 0.0 is the worst or lowest quality of power. $P_{load}$ is the electrical power delivered to, or received by, the load device. $P_{source}$ is the electrical power supplied by the power source. $P_{source}$ may be the electrical power supplied by one power source or may be the aggregate electrical power supplied by a plurality of power sources.

In some embodiments, the quality of electrical power delivered may be inversely proportional to a quantity of electrical power lost in the sum total of parts or sub-systems of a disclosed electrical system or architecture. For example, the power losses may be across the sum total of parts or sub-systems of an interconnection system that is incorporated into an electrical system. The power lost may be the sum total of losses across each part and/or across each sub-system. In some embodiments, any element of the disclosed electrical systems that can exhibit $I^2R$ and/or $V^2/R$ losses are incorporated into the interconnection system. Such elements may include electrodes inside the battery source, wire windings of an alternator, and entry points onto/into the power consuming device(s), among others. Thus, all electrical power losses that decrease the quality of electrical power fall within the interconnection system.

In some embodiments, electrical power lost is measured in Joules per second (J/s) or Watts (W). In some embodiments, electrical power lost may manifest itself as an emission in Watts or a time accumulation of energy (i.e., Joules) with at least one possibility of such accumulation manifested as a temperature rise.

In some embodiments, electrical power lost in the sum total of parts or sub-systems included in the interconnection system may be uniformly distributed across each of the constituent parts or sub-systems. In some embodiments, the electrical power lost is not uniformly distributed across each of the constituent parts or sub-systems. That is, in some embodiments, there may be "hot spots" in the electrical system due to a bad connection, bad relay contacts, undersized wire segments, etc.

In some embodiments, the quality of electrical power delivered may be defined as a result of computation or extrapolation of measured parameters. The measured parameters may include (i) a temperature rise at specific parts or sub-systems within the interconnection system; (ii) a temperature rise within the entirety of the interconnection system; (iii) a voltage drop across specific parts or sub-systems within the interconnection system; (iv) a voltage drop across the entirety of the interconnection system; (v) current flow through specific parts or sub-systems within the interconnection system; (vi) current flow through the entirety of the interconnection system; (vii) electrical resistance within specific parts or sub-systems within the interconnection system; (viii) electrical resistance within the entirety of the interconnection system; (ix) power interconnections or wiring; and/or any combination(s) thereof. In some embodiments, the measured parameters may be associated with a fixed upper limit or ratio.

Architectures and Systems

Figure 32:
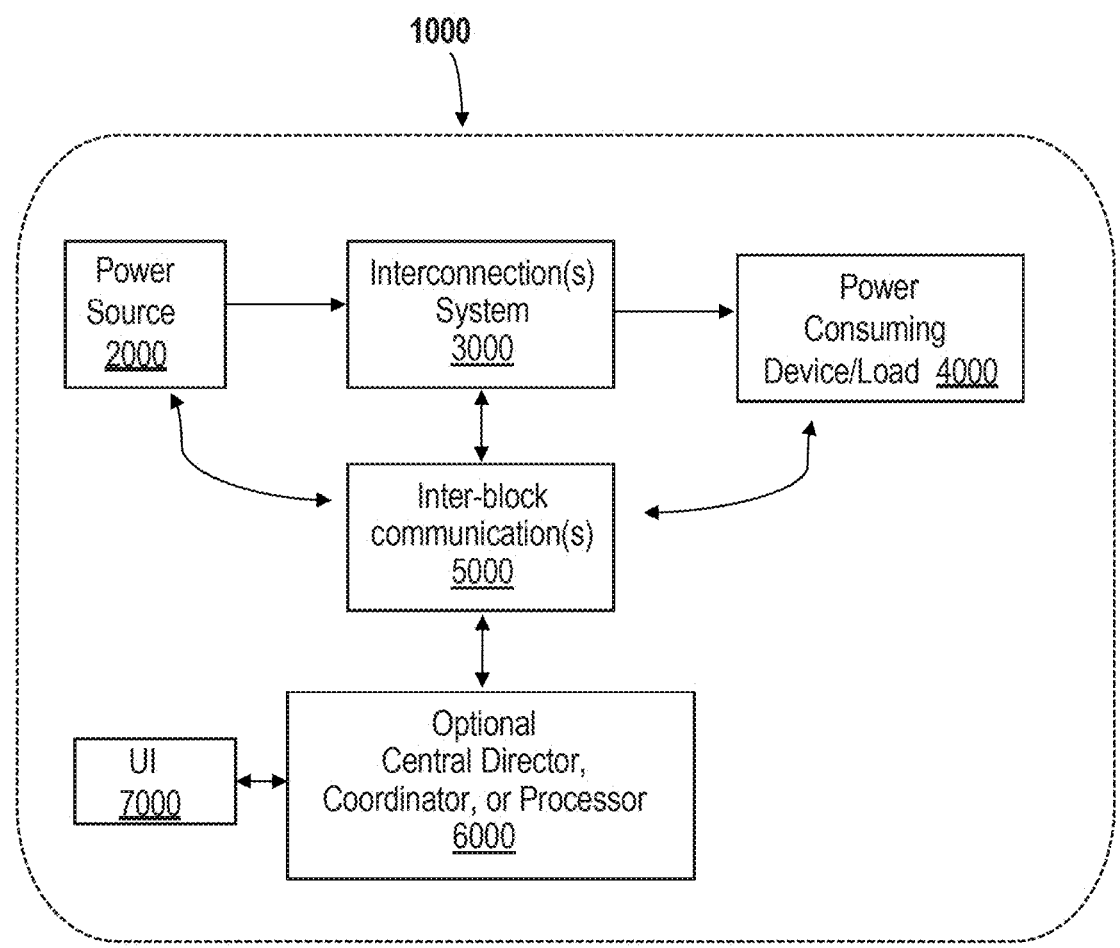
FIG. 32 schematically illustrates an example architecture of an electrical monitoring system.

FIG. 32 schematically illustrates an example architecture of an electrical monitoring system. FIGS. 33-42 schematically illustrate example sub-architectures of the electrical monitoring system. FIGS. 43-46 illustrate flowcharts of example methods for monitoring electrical power delivered to a load. Other examples of architectures and systems are disclosed in U.S. Provisional Application No. 63/251,134 filed Oct. 1, 2021, the entire contents of which are incorporated herein by reference.

FIG. 32 schematically illustrates an electrical system 1000 having an electrical power source 2000, a block containing an interconnecting system 3000, a power consuming device (i.e., a load device) 4000, and some means of inter-block communications (represented by block 5000). In some embodiments, the means of inter-block communications include the physical connections connecting the load device 4000 to, for example, the power source 2000. For example, the means of inter-block communications may include wires, switches, bus connections, etc. Some means of inter-block communications are described with relation to FIG. 37 below. A user interface 7000 may also be included in the electrical system 1000. An optional central director/coordinator/processor 6000 may also be included in the electrical system 1000. The power source 2000 is in communication (e.g., electrical) with the interconnection system 3000. The power source 2000 provides power to various blocks of the electrical system 1000, enabling inter-block communications 5000.

The interconnection system 3000 receives outputs from the power source 2000. The interconnection system 3000 provides outputs to at least one power consuming device/load 4000. For example, the interconnection system 3000 may receive power from the power source 2000 and facilitate the transfer of that power to the load device 4000. Inter-block communications 5000 may be passed or communicated between the power source 2000, interconnection system 3000, the load device 4000, and, optionally, the central processor/coordinator/director 6000. The optional central processor/coordinator/director 6000 may relay messages and/or other communications to the user interface 7000.

In some embodiments, all physical implementations of interconnections fall or are incorporated into the interconnection system 3000. In some embodiments, the interconnection system 3000 includes at least one printed circuit board (PCB) that may receive at least a portion of the physical connections. In some embodiments, the interconnection system 3000 includes components that allow for and facilitate communications between various blocks of the system 1000.

Figure 33:
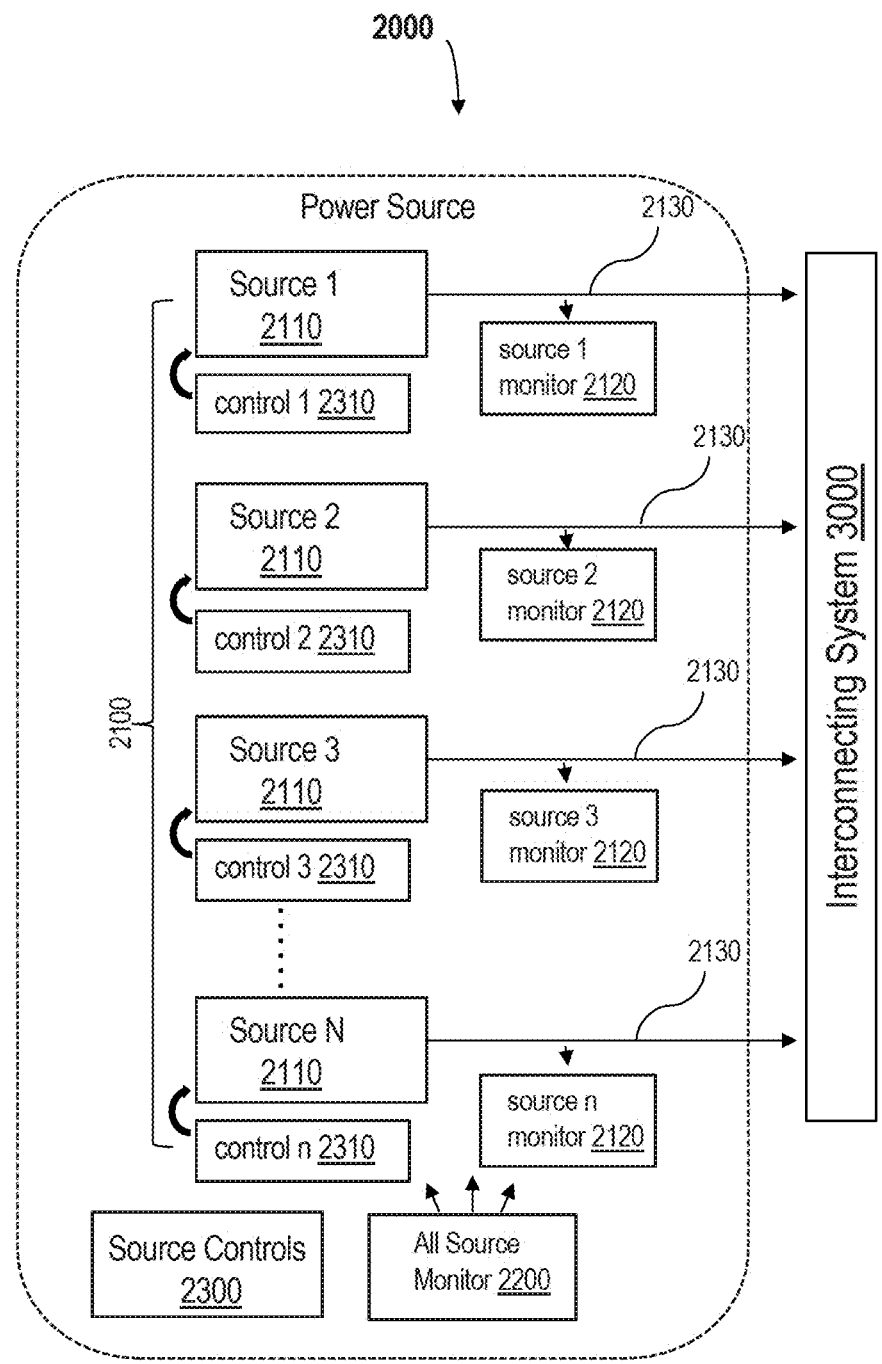
FIGS. 33-42 schematically illustrate example sub-architectures of the electrical monitoring system.

FIG. 33 schematically illustrates the power source 2000. The power source 2000 includes a group 2100 of 'n' singular sources 2110, where 'n' is the total number of singular sources 2210. In some embodiments, a battery, a number of solar panels, and an engine alternator would be three (3) singular sources of power 2110, with 'n' equal to 3. Each of the singular source(s) 2110 have their own output 2130 which proceeds or connects to the interconnection system 3000. Power source 2000 may incorporate, for each singular source 2110, a monitor 2120, and source control 2130. Further, the collection of singular sources 2110 can be treated as a group 2100 and have group source controls 2300 and a group source monitor 2200. The monitor(s) 2120 (within power source 2000) may monitor current, voltage, temperature, resistance and/or impedance into or out of each singular source 2110 or of the group 2100.

Power source 2000 can optionally incorporate individual, singular controls 2310 to alter the behavior or nature of the power sourced from singular source(s) 2110 and/or any other number of controls and sources or permutations thereof 2300, or none at all. In some embodiments, the power source 2000 includes or incorporates a monitor 2200 that monitors all single sources 2110, whether an individual single source 2110 or a plurality of single sources 2100. The power source 2000 is in electrical communication with, and is configured to provide power to, the interconnection system 3000. The power source 2000 is configured to provide one or more outputs 2130 to, for example, the interconnection system 3000.

Figure 34:
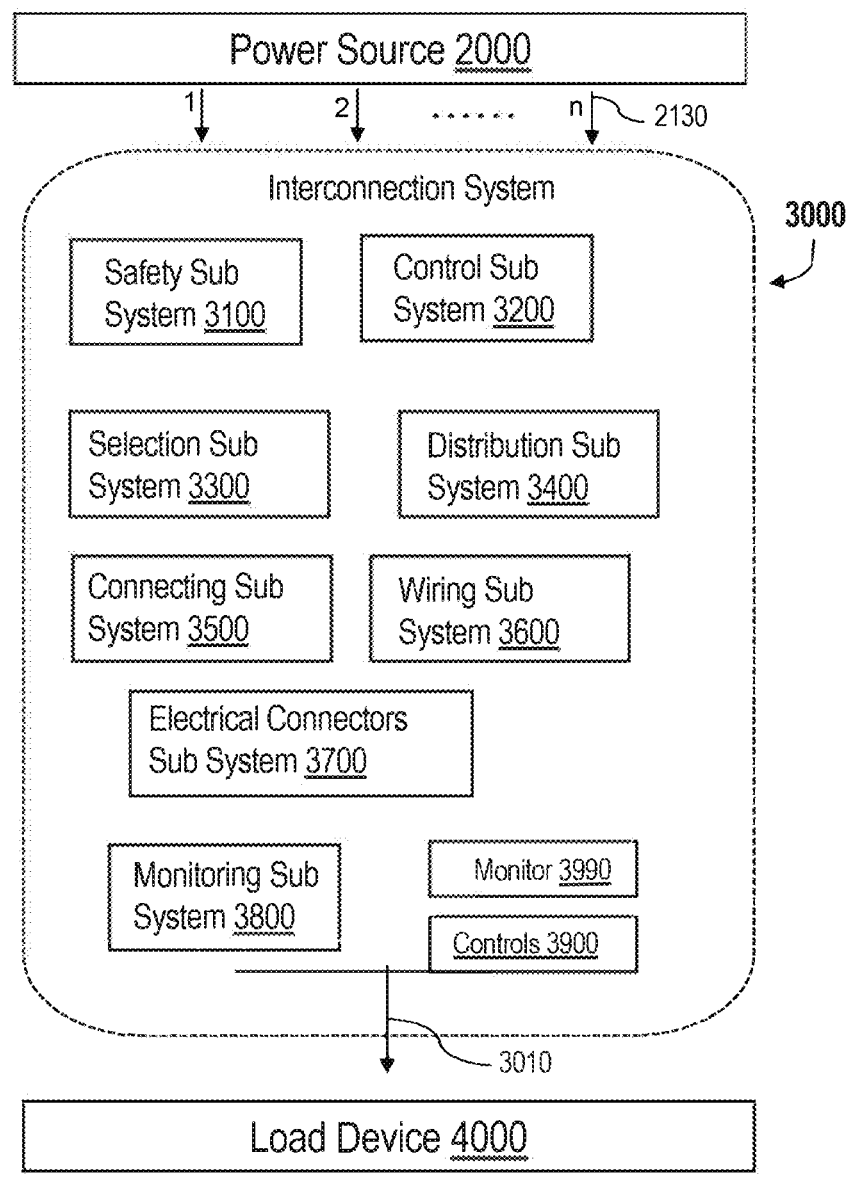

FIG. 34 schematically illustrates the interconnection system 3000. The interconnection system 3000, as illustrated, is accepting one or more outputs 2130 from the power source 2000 (either a single source 2110 or a plurality of single sources 2100). FIG. 3 also schematically illustrates the interconnection system 3000 supplying at least one output 3010 to the power consuming/load device 4000. The output 3010 may be electricity or power.

The interconnection system 3000 may include one or more sub-systems, wires, connectors, and/or other sundry elements or parts designed to protect, connect, switch, distribute, and/or supply electrical power from the power source 2000 to one or more load devices 4000 via one or more outputs 3010. The interconnection system 3000 may contain, by way of non-limiting example, one or more of a safety sub-system 3100, control sub-system 3200, selection sub-system 3300, distribution sub-system 3400, connecting sub-system 3500, wiring sub-system 3600, and/or electrical connectors sub-system 3700. Optionally, a monitoring sub-system 3800 could be incorporated and implemented into the interconnection system 3000. The optional monitoring sub-system 3800 may be incorporated to observe some or all behaviors, states, natures, connectedness, and/or characteristics of the other subsequent sub-systems (e.g., sub-systems 3100 through 3700). The interconnection system 3000 may also optionally incorporate various controls 3900 to alter the behavior, states, nature, characteristics, and/or connectedness of power source(s) 2110, power source outputs 2130, and/or output(s) 3010.

Figure 35:
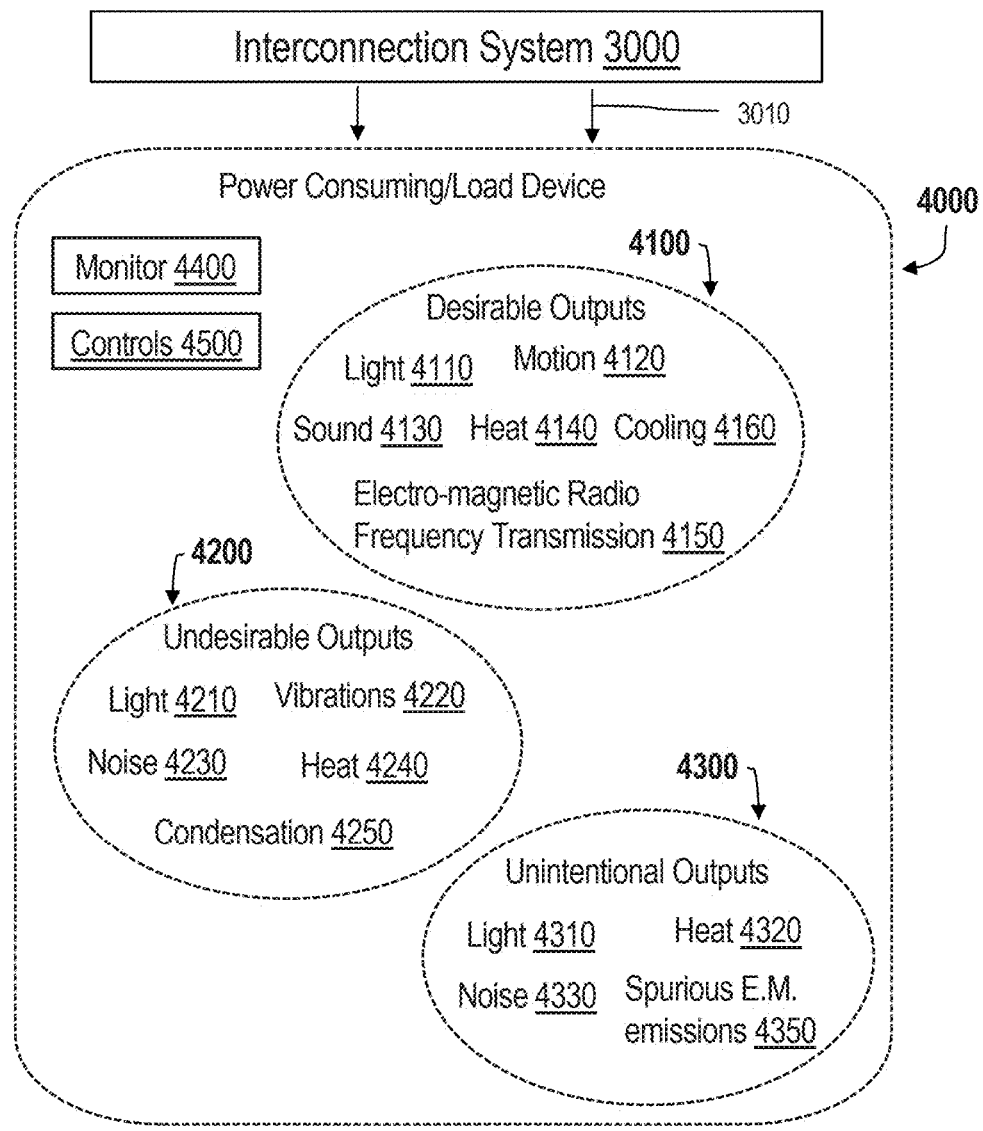

FIG. 35 depicts the power consuming/load device 4000 accepting an output 3010 from the interconnection system 3000 (i.e., receiving an input) and producing one or more outputs 4100, 4200, 4300. The received output 3010 may be electrical power. The one or more outputs of the load device include desirable outputs 4100, undesirable outputs 4200, and unintentional outputs 4300. The outputs 4100, 4200, 4300 may be energetic outputs and can be of any form, type, number, and/or variety. The various outputs (desirable 4100, undesirable 4200, and/or unintentional 4300) are all contained within and produced by the same load device 4000. FIG. 35 illustrates some examples of various outputs, such as: desirable outputs of light 4110, which can include motion 4120, sound 4130, heat 4140, electromagnetic radio frequency emissions or transmissions 4150, and cooling 4160; undesirable outputs of light 4210, which can include motional vibrations 4220, audible noise 4230, heat 4240, condensation 4250; and unintentional outputs of light 4310, which can include heat 4320, audible noise 4330, electromagnetic emissions 4340, and so forth.

Optionally, a monitor 4400 can, but need not, be incorporated to monitor some or all behavior(s), states, natures, and/or characteristics of the inputs, operations, and forms of outputs of the load device 4000. Operations of the load device 4000 may include, for example, the translation of input energy to the various outputs (e.g., send all energy to LEDs to produce light). Similarly, various controls 4500 can optionally be included to alter the behavior of the load device 4000.

Figure 36:
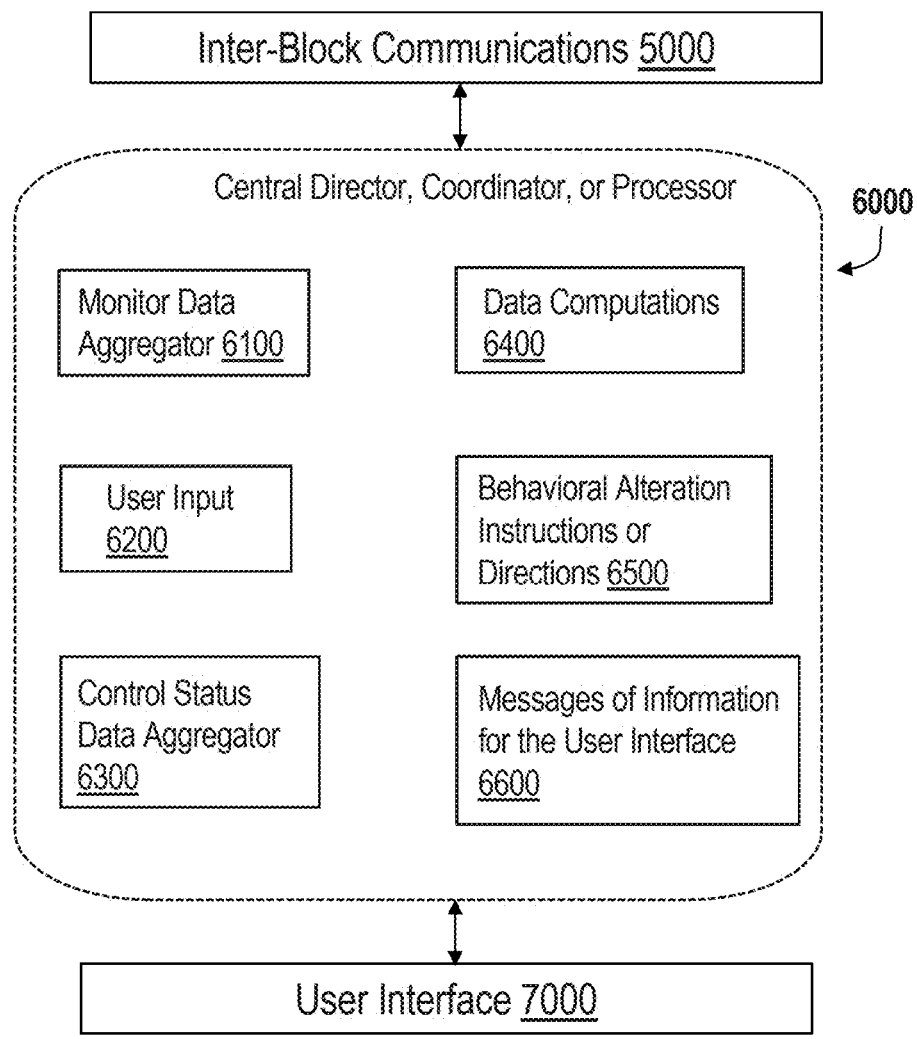

FIG. 36 depicts an optional central director/coordinator/processing block 6000, which may exist in the electrical system 1000 as a separate block and/or incorporated in varying degrees into the other system blocks. For example, the central director/coordinator/processor may be incorporated into the power source 2000, the interconnection system 3000, and/or load device 4000. Any number of sub-system (s) may be incorporated into and implemented with the optional central director/coordinator/processing block 6000. A few non-limiting examples of sub-systems of the central director/coordinator/processor 6000 have been depicted, such as a monitor data aggregator 6100, one or more user inputs 6200, control status data aggregator 6300, data computations 6400, behavioral alteration instructions or directions 6500, and messages or information for user or user interface 6600. User inputs 6200 may be received by the central director/coordinator/processor 6000 via a user interface 7000.

In some embodiments, individual processing units are configured to carry out the functions of each sub-system of the central director/coordinator/processor 6000. In some embodiments, one processing unit is configured to carry out the functions of each sub-system. In some embodiments, the processing unit(s) may be multi-core processors, analog computations, discrete digital circuitry, etc. In some embodiments, the central director/coordinator/processor 6000 is configured to analyze and/or manipulate incoming data from other sub-systems of system 1000 and/or make decisions about what the system 1000 can do.

Optionally, the central director/coordinator/processing block 6000 can communicate with other blocks in the electrical system 1000 via the inter-block communications 5000, and/or user interfaces 7000. In some embodiments, the central director/coordinator/processor 6000 is physically located within the same housing or location as the other blocks in the system 1000. In some embodiments, the central director/coordinator/processor 6000 is not physically located within the same housing or location as the other blocks in the system 1000.

Figure 37:
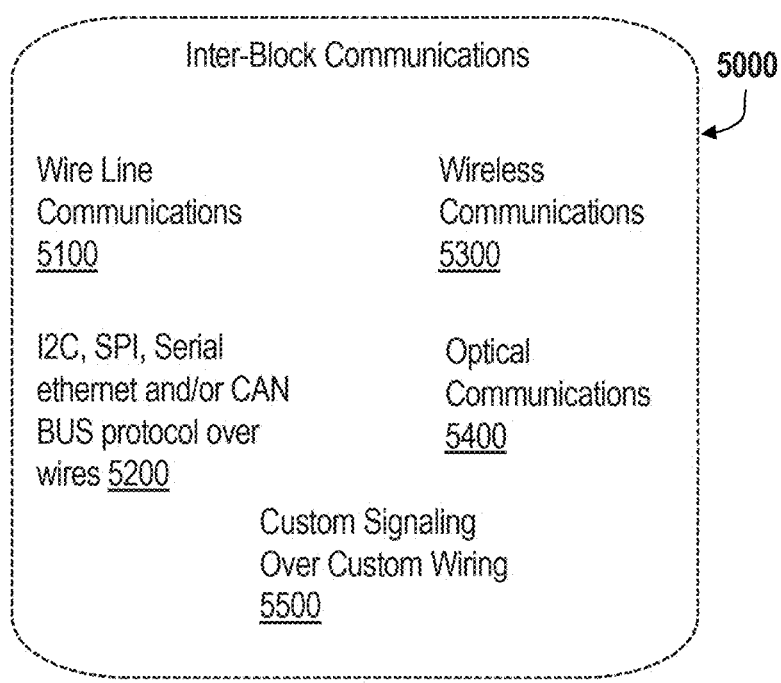

FIG. 37 depicts a few of the many different forms, mixtures, and/or permutations of inter-block communications 5000 between one or more blocks in the electrical system 1000. Some specific forms of communication are: communication via power conducting wires and/or wires used for other purposes, generally referred to as wire line communications 5100; communications via existing standards (e.g., I2C, SPI, Serial, Ethernet, CAN bus, among others) over wiring specified by and for the various standards, generally referred to as standards communications 5200; wireless communications 5300, such as, but not limited to, Bluetooth, Wi-Fi, IEEE standards, near-field communications standards, customized signaling, etc.; optical communications 5400; and/or custom signaling over customized wiring 5500. One or more of these communications 5000 may be routed and/or delivered to one or more blocks of the electrical system 1000.

Figure 38:
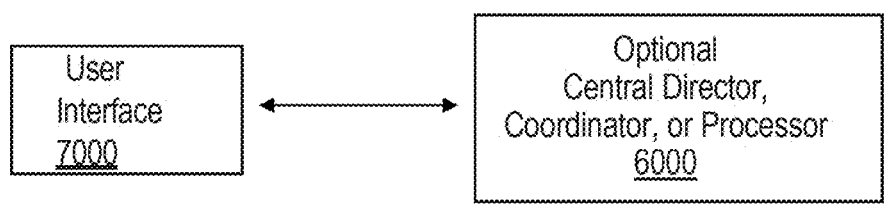

FIG. 38 schematically depicts an optional user interface 7000 that is configured to interface and engage with the optional central director/coordinator/processor 6000. The central director/coordinator/processor 6000 may deliver, or facilitate delivery of, one or more types of communications to the user interface 7000. For example, the central director/coordinator/processor 6000 may deliver an alert to the user interface 7000. Delivery of one or more types of communications to the user interface 7000 enables a user to be aware of, monitor, and/or manipulate the operations of a load device 4000, the electrical system 1000, and/or various sub-components or sub-systems of the electrical system 1000. For example, a user may be apprised of any faulty operations or faulty delivery of electrical power to a load device 4000 via one or more communications (e.g., messages) received at the user interface 7000. In some embodiments, the user interface 7000 includes a display upon which one or more communications may be presented to the user. In some embodiments, the user may be prompted to provide an input in response to an issued alert. In some embodiments, the electrical system 1000 triggers an alert, responds to the alert by changing one or more power characteristics of the electrical system, and communicates the alert, subsequent actions, and the outcome to the user.

Figure 39:
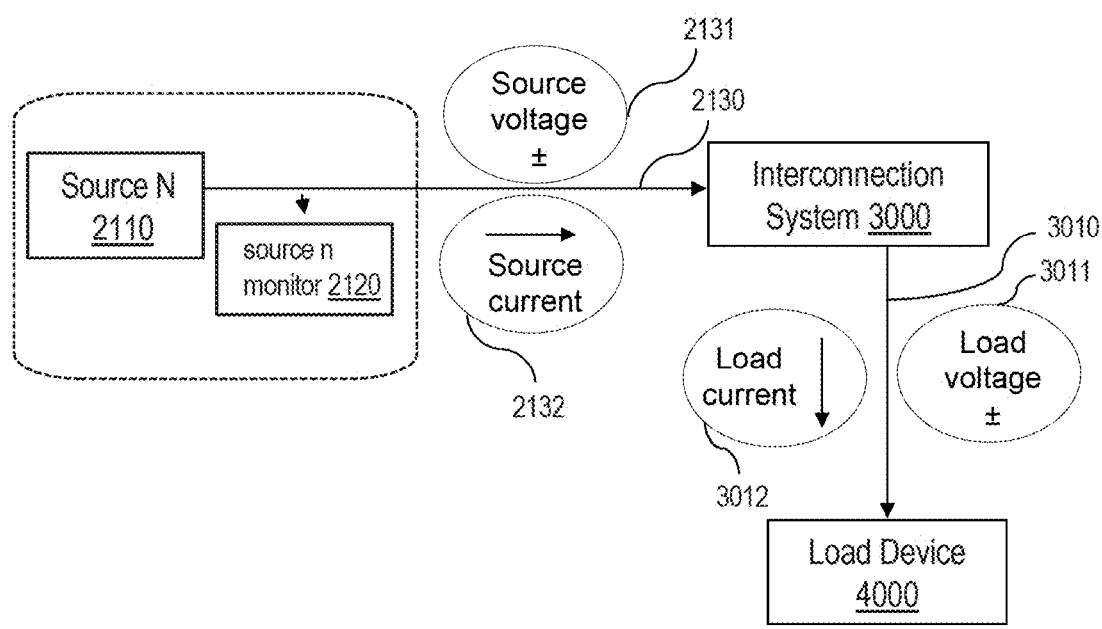

FIG. 39 schematically illustrates a power source 2110 (e.g., a singular power source 2110) configured to source power to the interconnection system 3000, which facilitates connection of the power source 2110 to a load device 4000. In some embodiments, the interconnection system 3000 may be treated in its entirety as a block rather than individual sub-components or sub-systems (see FIG. 34). The power source 2110 may be a single source 2110 or may be a plurality of single sources 2100 (where 'N' and 'n' represent the number of single sources 2110 in the plurality 2100). The power source 2110 includes a source monitor 2120. The source monitor 2120 may monitor, measure, and/or detect one or more outputs 2130, such as one or more of a source voltage 2131 and a source current 2132. The source monitor 2120 may additionally monitor, measure, and/or detect one or more outputs 3010, such as a load voltage 3011 and/or a load current 3012, among other things.

Additionally, and/or alternatively, the interconnection system 3000 may have its own monitor (such as monitor 3990 in FIG. 34) to monitor, measure, and/or detect one or more outputs 3010, such as a load voltage 3011 and/or a load current 3012. The monitors 2120, 3990 may collect and store this monitor data (i.e., outputs 2130, 3010, source/load voltages 2131, 3011, and source/load currents 2132, 3012). Additionally, and/or alternatively, the monitors 2120, 3990 may collect this monitor data and, optionally, transfer the monitor data to the optional central director 6000, a sub-system of the interconnection system 3000, the load device 4000, and/or the optional user interface 7000. In some embodiments, the monitors 2120, 3990 collect and transfer the monitor data to a storage device, which may optionally be incorporated into the electrical system 1000. The monitor data may be used to ascertain the quality of electrical power delivered by the power source 2110 to the load device 4000.

Figure 40:
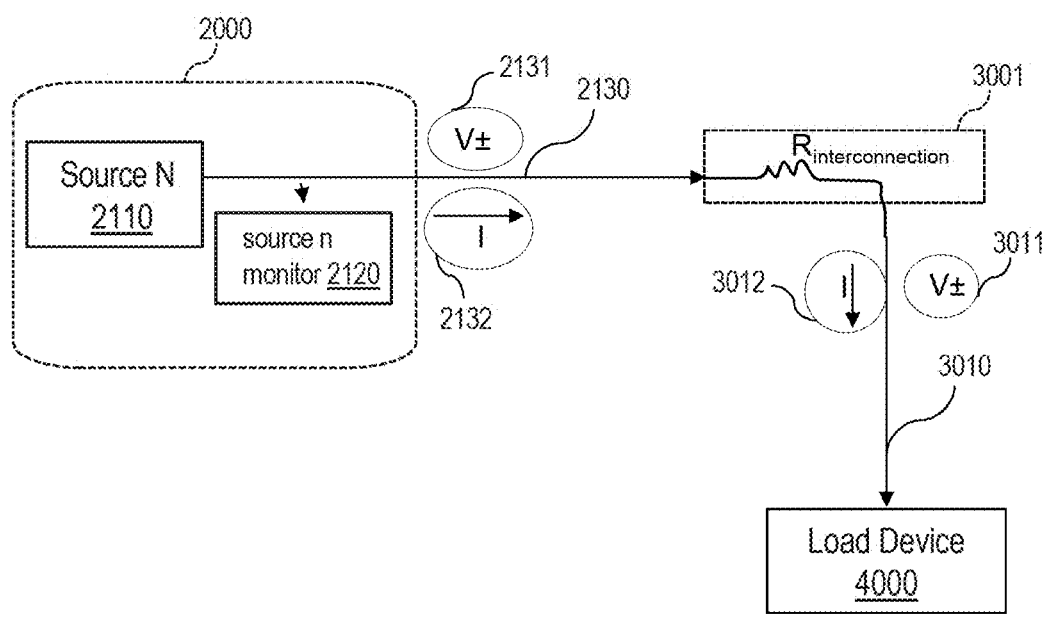

FIG. 40 schematically illustrates a power source 2110 (e.g., a singular power source 2110) configured to source power to the interconnection system 3000, which facilitates connection of the power source 2110 to a load device 4000. Similar to the architecture illustrated in FIGS. 39 and 41, the power source 2110 may be a single source 2110 or may be a plurality of single sources 2100 (where 'N' and 'n' represent the number of single sources 2110 in the plurality 2100). The power source 2110 includes a source monitor 2120. The source monitor 2120 may monitor, measure, and/or detect one or more outputs 2130, such as one or more of a source voltage 2131 and a source current 2132. The source monitor 2120 may additionally monitor, measure, and/or detect one or more outputs 3010, such as a load voltage 3011 and/or a load current 3012, among other things.

In some embodiments, the interconnection system 3000 may be treated in its entirety as electrical resistance/impedance 3001, rather than individual sub-components or sub-systems (see FIG. 34). The interconnection system 3000 is treated as "an equivalent electrical resistance/impedance," meaning electrical resistance/impedance 3001 is an accumulation or aggregation of all resistances/impedances of all sub-systems present in interconnection system 3001 (see FIG. 34). In some embodiments, the equivalent electrical resistance/impedance 3001 is calculated or computed using measurements 2131, 2132, 3011, 3012. In addition to monitoring the source current and voltage, and the load current and voltage, the resistance 3001 of the interconnection system 3000 may also be monitored. The electrical resistance 3001 may be incorporated into the collected monitor data. Thus, monitor data may include one or more detections and/or measurements of outputs 2130, 3010, source/load voltages 2131, 3011, source/load currents 2132, 3012, and electrical resistance 3001.

The monitor 2120 may collect and store the monitor data (i.e., outputs 2130, 3010, source/load voltages 2131, 3011, source/load currents 2132, 3012, and electrical resistance 3001). Additionally, and/or alternatively, the monitor 2120 may collect and, optionally, transfer the monitor data to the optional central director 6000, a sub-system of the interconnection system 3000, the load device 4000, and/or the optional user interface 7000. In some embodiments, the monitor 2120 collects and transfers the monitor data to a storage device, which may optionally be incorporated into the electrical system 1000. The monitor data may be used to ascertain the quality of electrical power delivered by the power source 2110 to the load device 4000.

Figure 41:
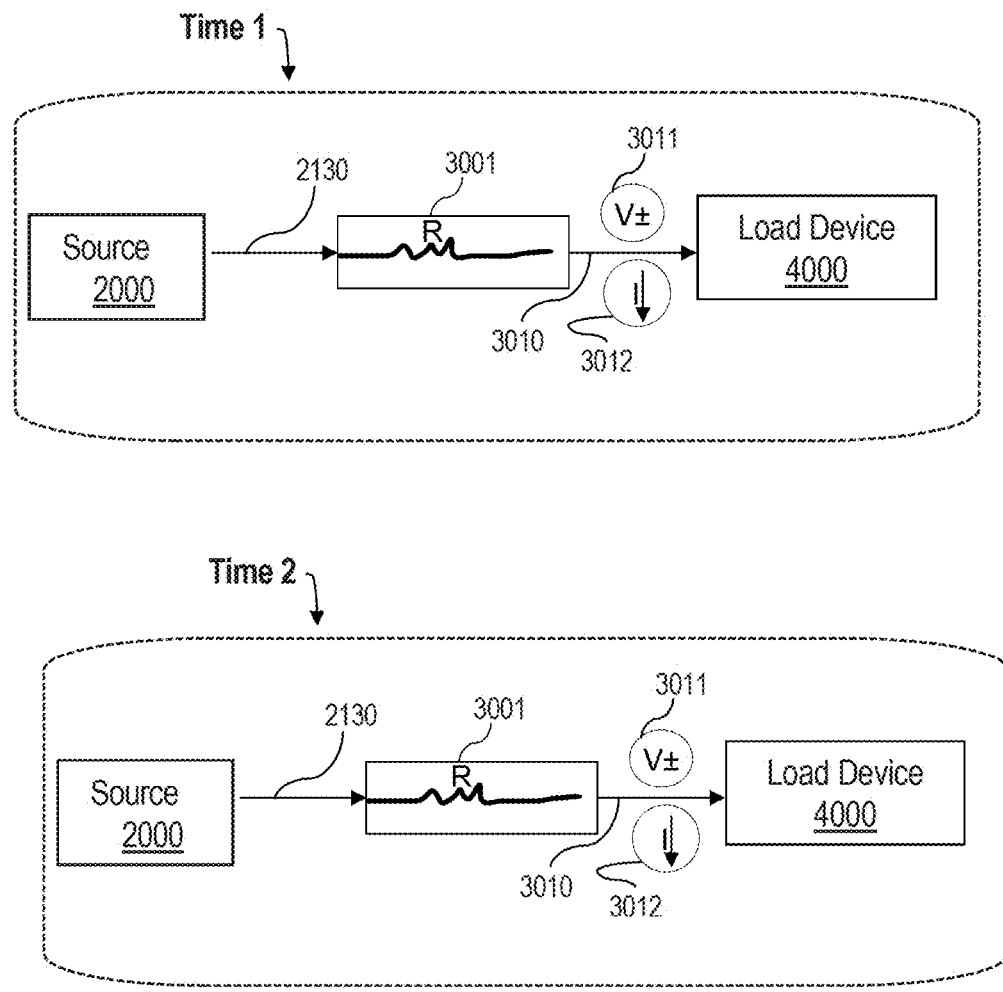

FIG. 41 schematically illustrates the architecture of FIG. 40 where the interconnection system 3000 is being treated as electrical resistance 3001. In the architecture illustrated in FIG. 10, the load voltage and current 3011, 3012 are being monitored at Time 1 and at Time 2, where Time 2 is after Time 1. Between Time 1 and Time 2, the amount of power consumed by the load device 4000 is altered. The power consumption of the load device 4000 may be altered via the user interface 7000 and/or the central director/coordinator/processor 6000. In some embodiments, the power consumption of the load device 4000 may be altered by a resistor that changes the power consumption based on a temperature. Additionally, and/or alternatively, the power consumption can be altered by the interconnection system 3000.

The load voltage and current 3011, 3012 will be monitored and measured at Time 2, after/in response to the altered power consumption of the load device 4000. The monitor data (i.e., outputs 2130, 3010, source/load voltages 2131, 3011 at Time 1, source/load currents 2132, 3012 at Time 2, and electrical resistance 3001) may be collected, stored, and, optionally, transferred to another system or component of the electrical system 1000. The monitor data may include Time 1 monitor data, Time 2 monitor data, and combinations thereof. The monitor data may be used to ascertain a quality of electrical power delivered to the load device 4000. The quality of electrical power delivered may be ascertained/calculated at Time 1, Time 2 and/or anytime thereafter. Information regarding the quality of electrical power calculated and/or delivered may be incorporated into the monitor data. The monitor data (including the quality of electrical power) may be stored, for example, in a log for future use.

Figure 42:
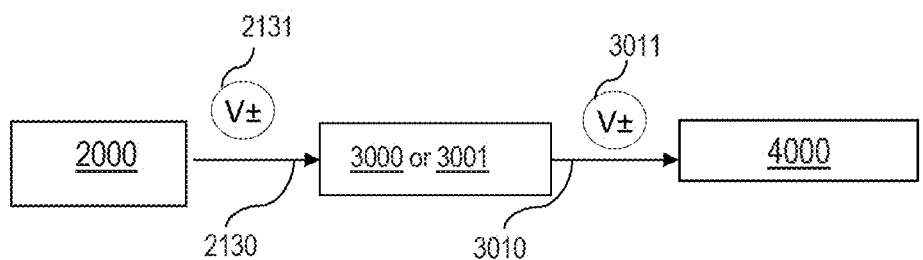

FIG. 42 schematically illustrates a power source 2000 configured to source power to the interconnection system 3000, which facilitates connection of the power source 2110 to a load device 4000, similar to FIG. 40. The interconnection system 3000 may be treated in its entirety as a block (similar to FIG. 39) or may be treated as an unknown equivalent electrical resistance (similar to FIGS. 40-41). Similar to FIG. 41, the load voltage and current 3011, 3012 may be monitored and measured, for example, at Time 1. The power consumption of the load device 4000 may be altered after Time 1 and before Time 2, when the load voltage and current 3011, 3012 are again monitored and measured. Alteration of the load device's 4000 power consumption may be of a similar fashion to the alterations described with respect to FIG. 40 (e.g., via central director/coordinator/processor 6000). The monitor data of the load voltage and current 3011, 3012 at Time 1 and Time 2 may be used to ascertain and calculate the electrical resistance 3001. After Time 2, the load voltage and current 3011, 3012 are again monitored and measured. The monitor data together with the ascertained/calculated the electrical resistance 3001 may be used to ascertain and/or compute the quality of electrical power delivered to the load device 4000.

Methods

Figure 43:
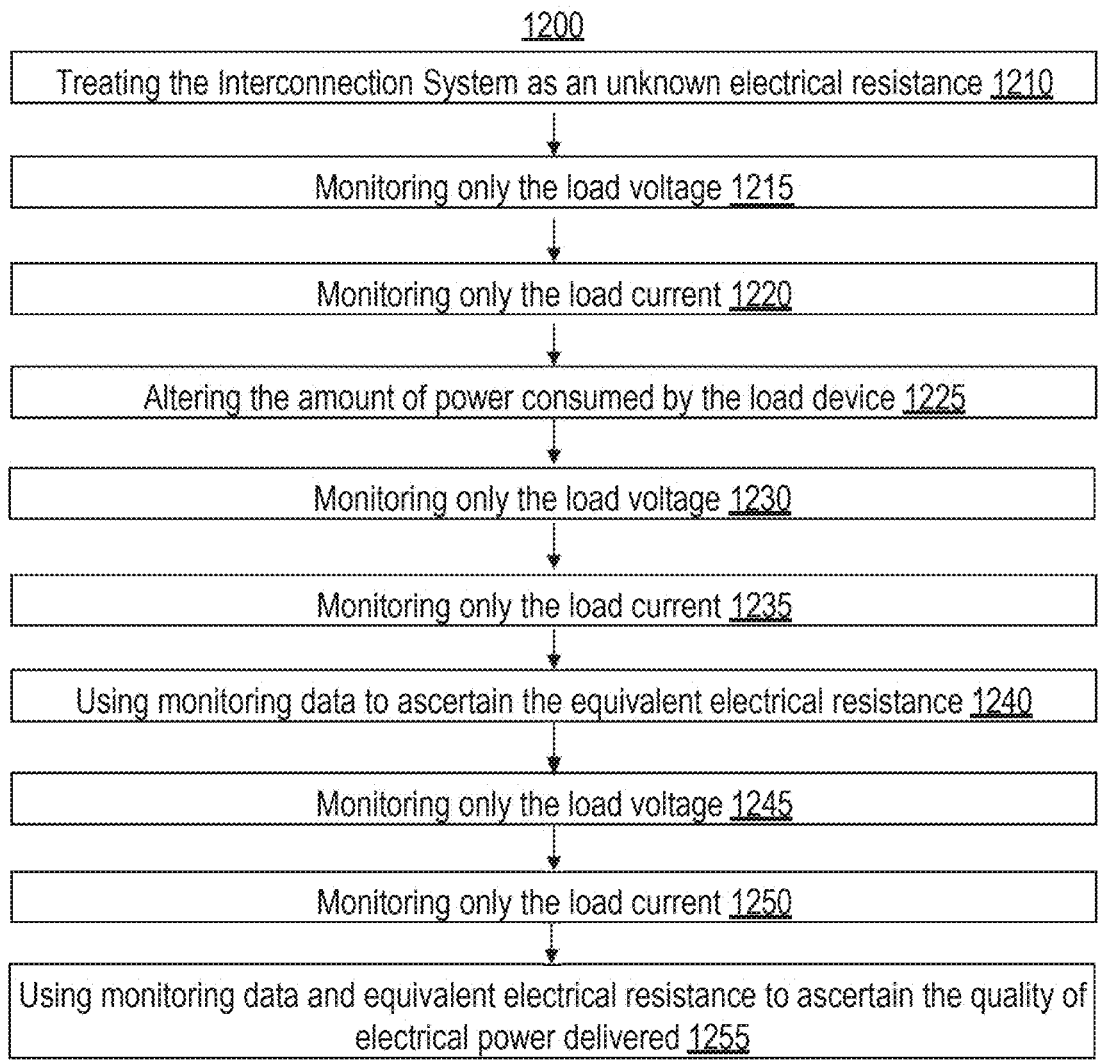
FIGS. 43-46 illustrate flowcharts of example methods for monitoring electrical power delivered to a load.

FIG. 43 is a flow chart that illustrates a method 1200 for ascertaining the quality of electrical power delivered to a load device. The load device can be any electrical power consuming device, such as lights, speakers, fans, toasters, batteries, chargers, microwaves, etc. As an overview, the method 1200 may include determining voltages and currents, and comparing the determined voltages and currents. In some embodiments, the quality of electrical power delivered to the load device is determined via a fixed upper-limit ratio (defined as a minimum-quality limit). Voltages, such as voltages 2131, 3011 in FIG. 42, are compared. First, a comparison ratio is acquired using the following formula:

$$(\text{Voltage } 2131 - \text{Voltage } 3011)/\text{Voltage } 2131.$$

This ratio must be less than or equal to a fixed value for all time in which electrical system 1000 operates. The ratio being less than or equal to a fixed value for all operational time represents a lower limit of the quality of electrical power delivered to a load device. In some embodiments, the fixed value/fixed upper-limit ratio may be less than or equal to 0.1, which would reflect a 10% voltage drop between voltages 2131 and 3011. In some embodiments, the fixed upper-limit ratio ranges from 0.05 to 0.99, such as 0.2, 0.3, 0.4, 0.5, 0.55, 0.6, 0.7, 0.8, 0.85, 0.95, or a range defined by any two of the foregoing values.

In some embodiments, the method 1200 includes treating the interconnection system (e.g., interconnection system 3000) as an unknown electrical resistance (step 1210). The method 1200 also includes monitoring only the load voltage and monitoring only the load current (steps 1215 and 1220). The method 1200 further includes altering the amount of power consumed by the load device (e.g., load device 4000) (step 1225). Upon altering the power consumption of the load device, the method 1200 again includes monitoring only the load voltage and monitoring only the load current (steps 1230 and 1235). The data collected from the monitoring steps is aggregated together as "monitor data" or "monitoring data."

The method 1200 additionally includes using the monitor data to ascertain the equivalent electrical resistance (step 1240). For example, the monitoring data may be used to ascertain the equivalent electrical resistance of the interconnection system 3000 (See FIGS. 32 and 41). After the equivalent electrical resistance has been ascertained, only the load voltage and load current are monitored again (steps 1245 and 1250). Using the monitoring data and the ascertained equivalent electrical resistance, the quality of electrical power delivered is ascertained (step 1255).

In some embodiments, a load device (e.g., load device 4000) is configured to monitor the load voltages and currents, and calculate the equivalent electrical resistance (e.g., electrical resistance 3001). The load device may be configured to ascertain if the load current is sufficient to meet the minimum level of quality of electrical power delivered. This monitoring capability may be carried out by incorporating monitors within the load device. Additionally, controls can be arranged such that, if computations with values from the load voltage, current and resistance result in a low quality of electrical power, the load characteristics of the load device can be altered. Such alterations of the load characteristics will reduce current draw of the load device.

In some embodiments, measurement information (e.g., measurements of source/load voltage and current) can be conveyed to any block within the electrical system 1000. The measurement information may be used by any optional control blocks, any sub-blocks and/or the inter-block communications system (e.g., inter-block communications 5000).

In some embodiments, the load device (e.g., load device 4000) can work in conjunction with source control(s). Using available measurement information, the source control(s) can initiate an increase of source voltage in order to increase the quality of electrical power delivered. In some embodiments, the measurement information is the same as the monitor data. In some embodiments, the measurement information is incorporated into the monitor data.

In some embodiments, the load device (e.g., load device 4000) can work in conjunction with source control(s) to interrupt the power flow from the power source. This may happen in cases where the quality of electrical power delivered cannot be improved.

In some embodiments, the optional central coordinator/director/processor may alter the source voltage and/or the current draw of the load device. The optional central coordinator/director/processor may alter the power interconnections, via controls or inter-block communications, to improve the quality of electrical power delivered.

Figure 44:
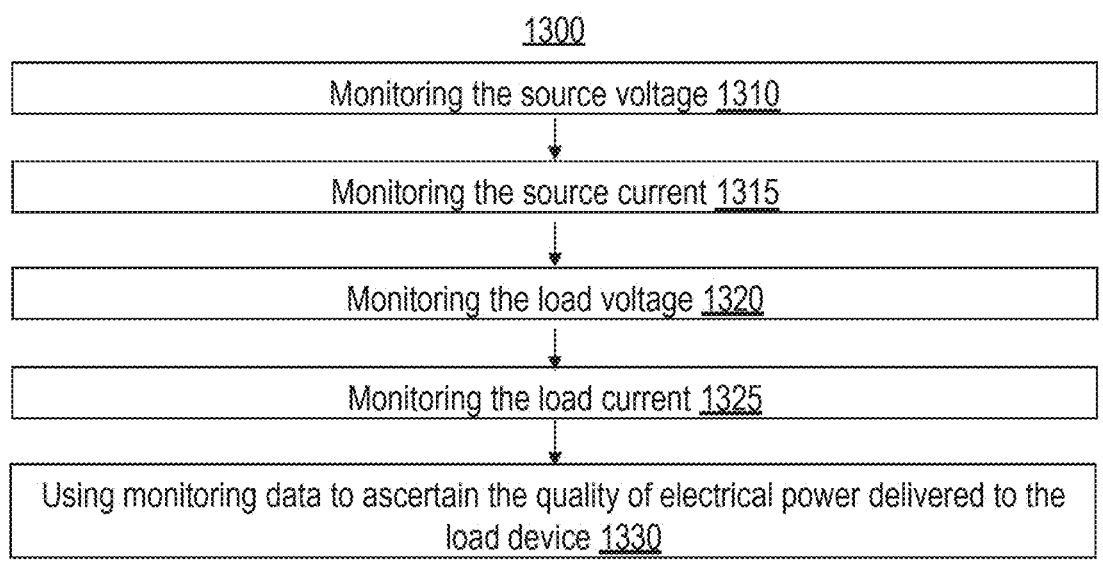

FIG. 44 illustrates a flowchart of another embodiment of a method 1300 for monitoring, detecting, measuring, and/or altering the quality of electrical power delivered to a load device. In some embodiments, the method 1300 includes monitoring the source voltage and the source current (steps 1310 and 1315). The method 1300 further includes monitoring the load voltage and the load current (steps 1320 and 1325). The data collected from the monitoring steps is aggregated together as "monitor data" or "monitoring data." The method 1300 additionally includes using the monitoring data to ascertain the quality of electrical power delivered (step 1330).

Figure 45:
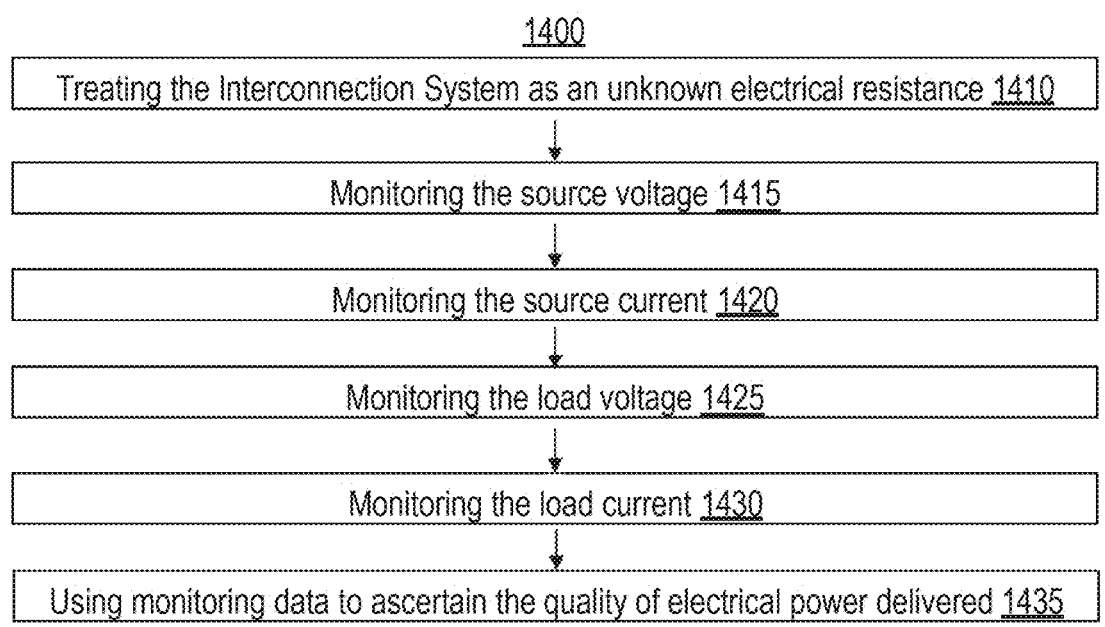

FIG. 45 illustrates a flowchart of another embodiment of a method 1400 for monitoring, detecting, measuring, and/or altering the quality of electrical power delivered to a load device. In some embodiments, the method 1400 includes treating an interconnection system (e.g., interconnection system 3000) as an unknown electrical resistance (step 1410). The method 1400 also includes monitoring the source voltage and the source current (steps 1415 and 1420). The method 1400 further includes monitoring the load voltage and the load current (steps 1425 and 1430). The data collected from the monitoring steps is aggregated together as "monitor data" or "monitoring data." The method 1400 additionally includes using the monitoring data to calculate the quality of electrical power delivered (step 1435).

Figure 46:
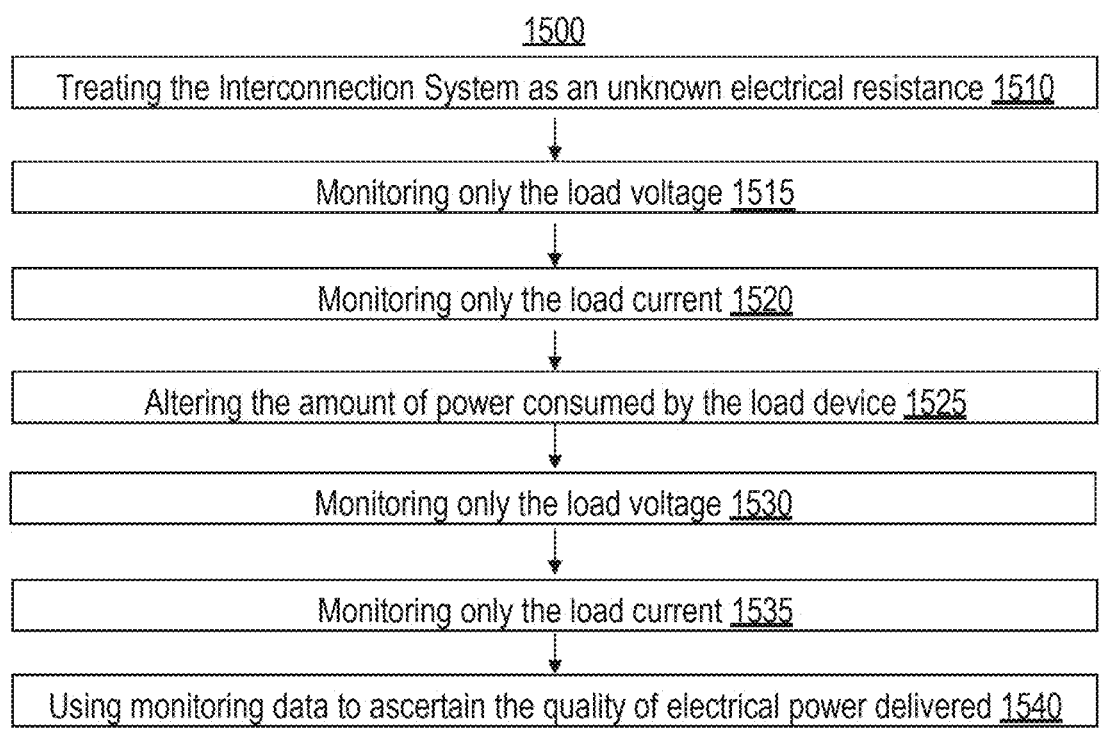

FIG. 46 illustrates a flowchart of another embodiment of a method 1500 for monitoring, detecting, measuring, and/or altering the quality of electrical power delivered to a load device. In some embodiments, the method 1500 includes treating the interconnection system (e.g., interconnection system 3000) as an unknown electrical resistance (step 1510). The method 1500 also includes monitoring the load voltage and the load current (steps 1515 and 1520). The method 1500 includes altering an amount of power consumed by a load device (step 1525). In response to altering the amount of power consumed, the method 1500 includes monitoring the load voltage and the load current (steps 1530 and 1535). The data collected from the monitoring steps is aggregated together as "monitor data" or "monitoring data." The method 1500 additionally includes using the monitoring data to ascertain the quality of electrical power delivered (step 1540).

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A light assembly configured to be connected to a power source comprising:
   an array of a plurality of light emitting diode (LED) lights, the plurality of LED lights comprising a first plurality of red LED lights, a second plurality of green LED lights, and a third plurality of blue LED lights, wherein:
      the plurality of LED lights comprises a plurality of light strings, each of which includes a plurality of same colored LED lights connected in series; and
      the plurality of light strings is connected to each other in parallel;
   a single driver configured to intermittently supply power received from the power source to each of the first plurality of red LED lights, the second plurality of green LED lights, and the third plurality of blue LED lights, wherein the driver is a pulse width modulation (PWM) driver configured to adjust a first duty cycle of the first plurality of red LED lights, a second duty cycle of the second plurality of green LED lights, or a third duty cycle of the third plurality of blue LED lights;
   a user interface configured to receive a user input, selecting one of a plurality of more than three colors; and
   a controller configured to control the single driver based on the user input, causing the plurality of LED lights to appear as one of the plurality of more than three colors selected by the user input, wherein the controller is configured to compute each of the first duty cycle, the second duty cycle, or the third duty cycle based on one of the plurality of more than three colors selected by the user input,
   wherein the power source is a rechargeable battery and, when the plurality of LED lights is turned on, the controller is further configured to:
      monitor a level of the rechargeable battery or detect a drop of voltage at the rechargeable battery greater than a voltage drop threshold; and
      control brightness of the plurality of LED lights based on the level of the rechargeable battery or the detected drop of voltage at the rechargeable battery greater than the voltage drop threshold.

2. The light assembly of claim 1, wherein the LED lights include surface mount device (SMD) LEDs.

3. The light assembly of claim 1, wherein a plurality of same colored LED lights comprises:
one or more first strings of red LED lights;
one or more second strings of green LED lights; and
one or more third strings of blue LED lights.

4. The light assembly of claim 3, wherein:
each of the one or more first strings of red LED lights includes a first number of red LED lights;
each of the one or more second strings of green LED lights includes a second number of green LED lights;
each of the one or more third strings of green LED lights includes a third number of blue LED lights; and
the first number, the second number, and the third number are different.

5. The light assembly of claim 4, wherein the first number, the second number, and the third number are selected based on forward voltage drop of different colored string of LED lights, such that a first forward voltage drop of each first string, a second forward voltage drop of each second string, and a third forward voltage drop of each third string is substantially same.

6. The light assembly of claim 3, wherein:
the one or more first strings consist of a first number of first strings;
the one or more second strings consist of a second number of strings;
the one or more third strings consist of a third number of strings; and
the first number, the second number, and the third number are different.

7. The light assembly of claim 6, wherein the first number, the second number, and the third number are selected based on full brightness of each colored LED light such that full brightness of the first plurality of red LED lights, full brightness of the second plurality of green LED lights, and full brightness of the third plurality of blue LED lights are perceived, by human eyes, to be substantially same.

8. The light assembly of claim 1, wherein when the plurality of LED lights is turned on, the controller controls the PWM driver, causing the PWM driver to gradually increase each of the first duty cycle, the second duty cycle, or the third duty cycle, which in turn causes brightness of the plurality of LED lights to increase gradually to full brightness over a period of more than 1 second.

9. The light assembly of claim 1, wherein detecting abnormalities of wiring comprising:
monitoring a drop of a voltage at the rechargeable battery around a time when the plurality of LED lights is turned on; and
when the drop of the voltage is greater than a voltage drop threshold,
determining that an abnormality of wiring is present; and
causing the plurality of LED lights to blink at a predetermined pattern as a warning.

10. The light assembly of claim 9, wherein when the drop of the voltage is greater than the voltage drop threshold, causing the PWM driver to reduce a duty cycle, which in turn causes brightness of the plurality of LED lights to reduce brightness.

11. The light assembly of claim 1, wherein monitoring a level of the rechargeable battery comprises:

when the voltage at the rechargeable battery is dropped to a first low voltage threshold, causing the PWM driver to reduce a duty cycle, which in turn causes brightness of the plurality of LED lights to be reduced.

12. The light assembly of claim 11, monitoring a level of the rechargeable battery further comprising:
when the voltage at the rechargeable battery is dropped to a second low voltage threshold that is lower than the first low voltage threshold, turning off the plurality of LED lights.

13. The light assembly of claim 12, wherein monitoring a level of the rechargeable battery further comprises:
when the voltage at the rechargeable battery is increased to a first operating voltage threshold that is greater than the first low voltage threshold due to charging,
causing the plurality of LED lights to be turned back on; and
setting each of the first duty cycle, the second duty cycle, or the third duty cycle of the PWM driver to be at a particular level, causing the plurality of LED lights not to be at full brightness.

14. The light assembly of claim 13, wherein monitoring a level of the rechargeable battery further comprises:
when the voltage at the plurality of light string is increased to a second operating voltage threshold that is greater than the first operating voltage threshold due to continuous charging, increasing the first duty cycle, each of the second duty cycle, or the third duty cycle of the PWM driver, causing the plurality of LED lights to be at full brightness.

15. A method for controlling an LED light assembly comprising at least one LED light powered by a rechargeable battery via a pulse width modulation (PWM) driver configured to adjust a first duty cycle of a first plurality of red LED lights, a second duty cycle of a second plurality of green LED lights, or a third duty cycle of a third plurality of blue LED lights, the method comprising:
when the at least one LED light is turned on, causing the PWM driver to gradually increase a duty cycle, which in turn causes brightness of the LED light assembly to increase gradually to full brightness over a period of more than 1 second; and
when the LED light assembly is turned on,
monitoring a level of the rechargeable battery or detecting a drop of voltage at the rechargeable battery greater than a voltage drop threshold; and
controlling brightness of the at least one LED light based on the level of the rechargeable battery or a detected drop of voltage at the rechargeable battery greater than a voltage drop threshold,
wherein monitoring the level of the rechargeable battery comprises monitoring a voltage at the at least one LED light for detecting abnormalities of wiring.

16. The method of claim 15, detecting abnormalities of wiring comprising:
monitoring a drop of a voltage at the at least one LED light around a time when the at least one LED light is turned on; and
when the drop of the voltage is greater than a voltage drop threshold,
determining that an abnormality of wiring is present; and
causing the at least one LED light to blink at a predetermined pattern as a warning.

17. The method of claim 16, detecting abnormalities of wiring further comprising:

when the drop of the voltage is greater than the voltage drop threshold, causing the PWM driver to reduce the duty cycle, which in turn causes the at least one LED light to reduce brightness.

18. The method of claim 15, monitoring a level of the rechargeable battery comprising:
when the voltage at the at least one LED light is dropped to a first low voltage threshold, causing the PWM driver to reduce the duty cycle, which in turn causes brightness of the at least one LED light to be reduced.

19. The method of claim 18, monitoring a level of the rechargeable battery further comprising:
when the voltage at the at least one LED light is dropped to a second low voltage threshold that is lower than the first low voltage threshold, turning off the at least one LED light.

20. The method of claim 19, monitoring a level of the rechargeable battery further comprising:
when the voltage at the at least one LED light is increased to a first operating voltage threshold that is greater than the first low voltage threshold due to charging,
causing the at least one LED light to be turned back on; and
setting the duty cycle of the PWM driver at a level, causing the at least one LED light to be not at full brightness.

21. The method of claim 20, monitoring a level of the rechargeable battery further comprising:
when the voltage at the at least one LED light is increased to a second operating voltage threshold that is greater than the first operating voltage due to continuous charging, increasing the duty cycle of the PWM driver, such that the at least one LED light is at full brightness.

22. A submersible light comprising:
a housing configured to receive one or more light assemblies as in claim 1; and
one or more light assemblies as in claim 1 received in the housing;
wherein the housing comprises one or more pockets disposed on opposing lateral sides of the housing, where each pocket is configured to receive a corresponding light assembly, and
wherein the housing is configured to be mounted to at least a portion of a keel of a watercraft.

23. The submersible light of claim 22, wherein each pocket of the one or more pockets comprises at least one pocket recess having a plurality of pocket recess holes, wherein the at least one pocket recess is sized and shaped to receive a corresponding light assembly.

24. The submersible light of claim 22, wherein the submersible light includes a plurality of the light assemblies, which are sealed off from one another.

25. The submersible light of claim 22, wherein the housing further comprises a printed circuit board (PCB) chamber.

26. The submersible light of claim 22, wherein the housing houses electrical components of the one or more light assemblies.

27. The submersible light of claim 26, wherein the electrical components of the one or more light assemblies includes at least one of a voltage converter, controller, alternator, power supply, or switch.

28. A light assembly configured to be connected to a power source comprising:
an array of a plurality of light emitting diode (LED) lights, the plurality of LED lights comprising a first plurality of red LED lights, a second plurality of green LED lights, and a third plurality of blue LED lights;
a driver configured to intermittently supply power received from the power source to the first plurality of red LED lights, the second plurality of green LED lights, and the third plurality of blue LED lights;
a user interface configured to receive a user input, selecting one of a plurality of more than three colors; and
a controller configured to control the driver based on the user input, causing the plurality of LED lights to appear as one of the plurality of more than three colors selected by the user input,
wherein the plurality of LED lights comprises a plurality of light strings, each of which includes a plurality of same colored LED lights connected in series and the plurality of light strings is connected to each other in parallel,
wherein the power supply is a rechargeable battery, and when the plurality of LED lights is turned on, the controller is further configured to monitor a level of the rechargeable battery and control brightness of the plurality of LED lights based on the level of the rechargeable battery,
wherein monitoring a level of the rechargeable battery further comprises:
when the voltage at the rechargeable battery is increased to a first operating voltage threshold that is greater than the first low voltage threshold due to charging, causing the plurality of LED lights to be turned back on; and
setting each of the first duty cycle, the second duty cycle, or the third duty cycle of the PWM driver to be at a particular level, causing the plurality of LED lights not to be at full brightness.

29. The light assembly of claim 28, wherein monitoring a level of the rechargeable battery further comprises:
when the voltage at the plurality of light string is increased to a second operating voltage threshold that is greater than the first operating voltage threshold due to continuous charging, increasing the first duty cycle, each of the second duty cycle, or the third duty cycle of the PWM driver, causing the plurality of LED lights to be at full brightness.

* * * * *